(12) United States Patent
Long, II

(10) Patent No.: US 10,489,868 B2
(45) Date of Patent: Nov. 26, 2019

(54) INTELLIGENT BEVERAGE KIOSK APPARATUS AND SYSTEM

(71) Applicant: Bruce Alexander Long, II, Murrieta, CA (US)

(72) Inventor: Bruce Alexander Long, II, Murrieta, CA (US)

(*) Notice: Subject to any disclaimer, the term of this patent is extended or adjusted under 35 U.S.C. 154(b) by 546 days.

(21) Appl. No.: 15/092,508

(22) Filed: Apr. 6, 2016

(65) Prior Publication Data

US 2017/0293983 A1    Oct. 12, 2017

(51) Int. Cl.
| | |
|---|---|
| G06Q 50/12 | (2012.01) |
| G06Q 30/06 | (2012.01) |
| B67D 1/00 | (2006.01) |
| B67D 1/06 | (2006.01) |
| B67D 1/08 | (2006.01) |
| F25C 5/20 | (2018.01) |
| G06Q 20/18 | (2012.01) |
| G07F 13/10 | (2006.01) |
| B67D 1/07 | (2006.01) |
| B67D 1/12 | (2006.01) |

(52) U.S. Cl.
CPC ........... *G06Q 50/12* (2013.01); *B67D 1/0019* (2013.01); *B67D 1/06* (2013.01); *B67D 1/0884* (2013.01); *B67D 1/0888* (2013.01); *F25C 5/20* (2018.01); *G06Q 20/18* (2013.01); *G06Q 30/0621* (2013.01); *G07F 13/10* (2013.01); *B67D 1/0046* (2013.01); *B67D 1/07* (2013.01); *B67D 1/1236* (2013.01); *B67D 2001/075* (2013.01); *B67D 2210/00015* (2013.01); *B67D 2210/00076* (2013.01)

(58) Field of Classification Search
None
See application file for complete search history.

(56) References Cited

U.S. PATENT DOCUMENTS

| | | | | |
|---|---|---|---|---|
| 4,735,289 A * | 4/1988 | Kenyon | .................. | E05G 7/008 109/19 |
| 6,943,323 B2 * | 9/2005 | Iannucci | ............... | A47J 41/005 219/387 |
| 7,845,375 B2 * | 12/2010 | Dorney | .............. | A47G 19/2227 141/104 |
| 8,863,649 B1 * | 10/2014 | Rao | ......................... | A47J 31/00 700/15 |
| 9,647,777 B2 * | 5/2017 | Wang | ...................... | B67C 3/007 |
| 2016/0090288 A1 * | 3/2016 | Givens, Jr. | ........... | B67D 1/0041 700/283 |

* cited by examiner

*Primary Examiner* — Paul Danneman
(74) *Attorney, Agent, or Firm* — Edmond A. DeFrank

(57) ABSTRACT

The embodiments disclose a method of an intelligent beverage kiosk system for customized beverage preparation including preparing customized beverage selections for meeting a consumer's taste, recording a member's customized beverage selection for reducing member beverage delivery wait time, creating a member smart beverage cup with layered component compartment modules for downloading and ordering a member customized beverage selection, ordering member customized beverage selections using a wireless intelligent beverage kiosk application for reducing ordering time for a customized beverage selection and adjusting intelligent beverage kiosk window height for facilitating beverage delivery for drive-thru vehicle pickup.

20 Claims, 39 Drawing Sheets

FIG. 24

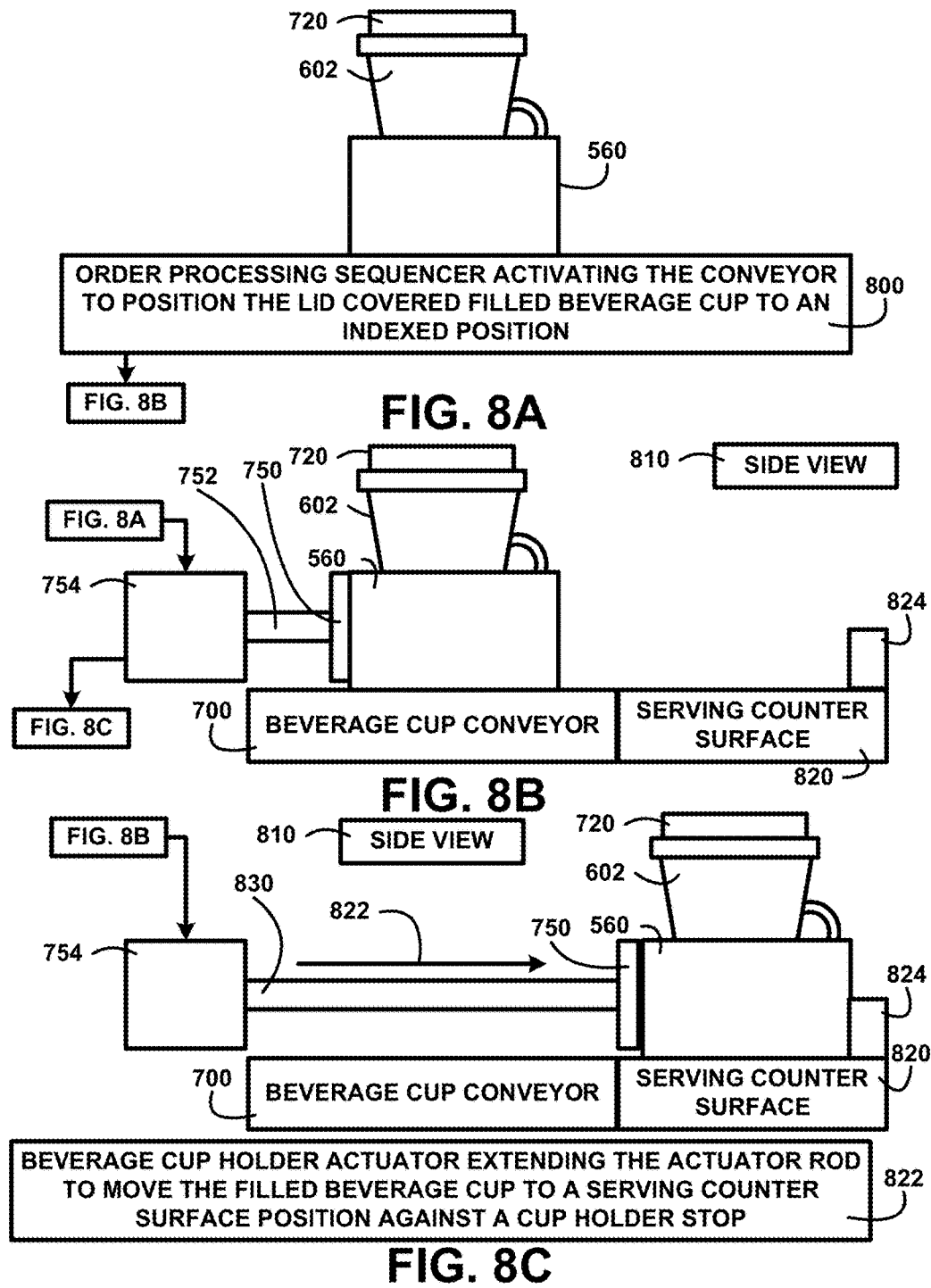

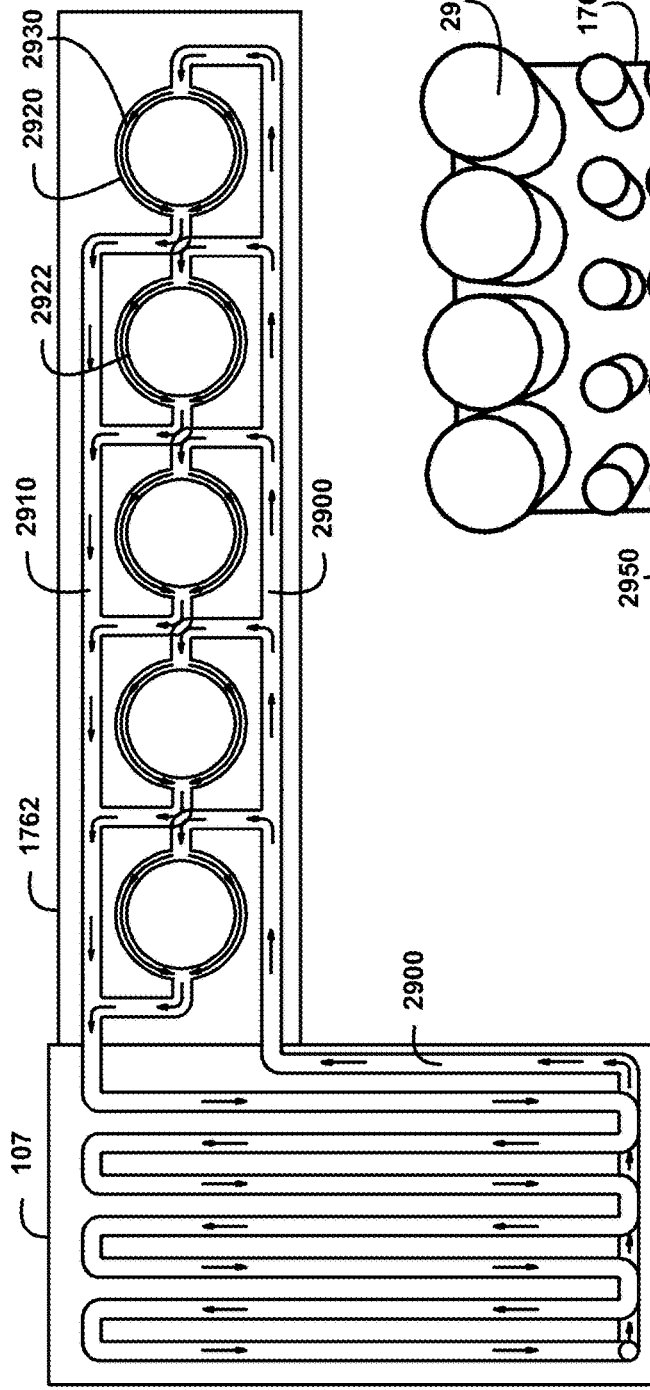
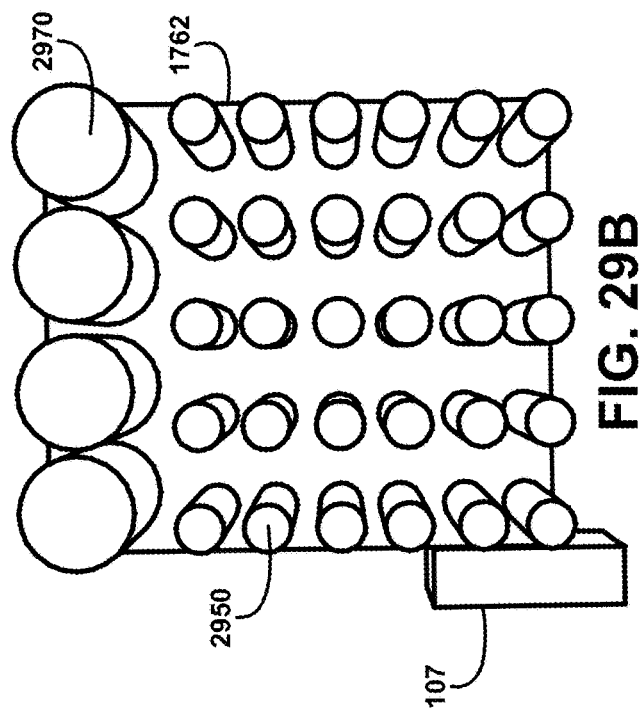
FIG. 29A
FIG. 29B

INTELLIGENT BEVERAGE KIOSK APPARATUS AND SYSTEM

BACKGROUND

The popularity of coffee and other beverages has grown in recent years. The consumer has become more discerning in their choices of blended beverage flavors and other characteristics. The difficulty has developed wherein the consumer is stuck with set and limited blends that are offered at various establishments. This coupled with waiting in line and then having to repeat their desired blend to the same or a different employee cost the consumer time and frustration in addition to the high cost charged for a beverage by the brick and mortar establishments. The supply of in-home brewing devices is convenient when the consumer is home, however most consumers spend a great deal of their time driving, at work or traveling. The in-home brewing devices are not available to them during these hours.

BRIEF DESCRIPTION OF THE DRAWINGS

FIG. 8A shows for illustrative purposes only an example of beverage cup serving positioning of one embodiment.

FIG. 8B shows for illustrative purposes only an example of beverage cup serving positioning side view of one embodiment.

FIG. 8C shows for illustrative purposes only an example of beverage cup moved into serving position of one embodiment.

FIG. 29A shows for illustrative purposes only an example of refrigerated ingredient container module of one embodiment.

FIG. 29B shows for illustrative purposes only an example of ingredient container sizing of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of the intelligent beverage kiosk apparatus and system is described for illustrative purposes and the underlying system can apply to any number and multiple types of beverages. In one embodiment, the intelligent beverage kiosk apparatus and system can be configured to include hot and/or cold beverage selections and can be configured to include apparatus enabling a consumer the convenience of designing a customized type of beverage by controlling portions of selectable flavors, drinking temperatures, and volumes of beverage. In one embodiment, the intelligent beverage kiosk apparatus and system can be configured to enable a consumer to create custom blended beverage selections and record those selections in a member profile for repeatable automated ordering. The intelligent beverage kiosk apparatus and system can be configured to include standalone devices in drive through lane layouts and can be configured to include standalone devices located within new or existing buildings using the present invention.

Figure 1:
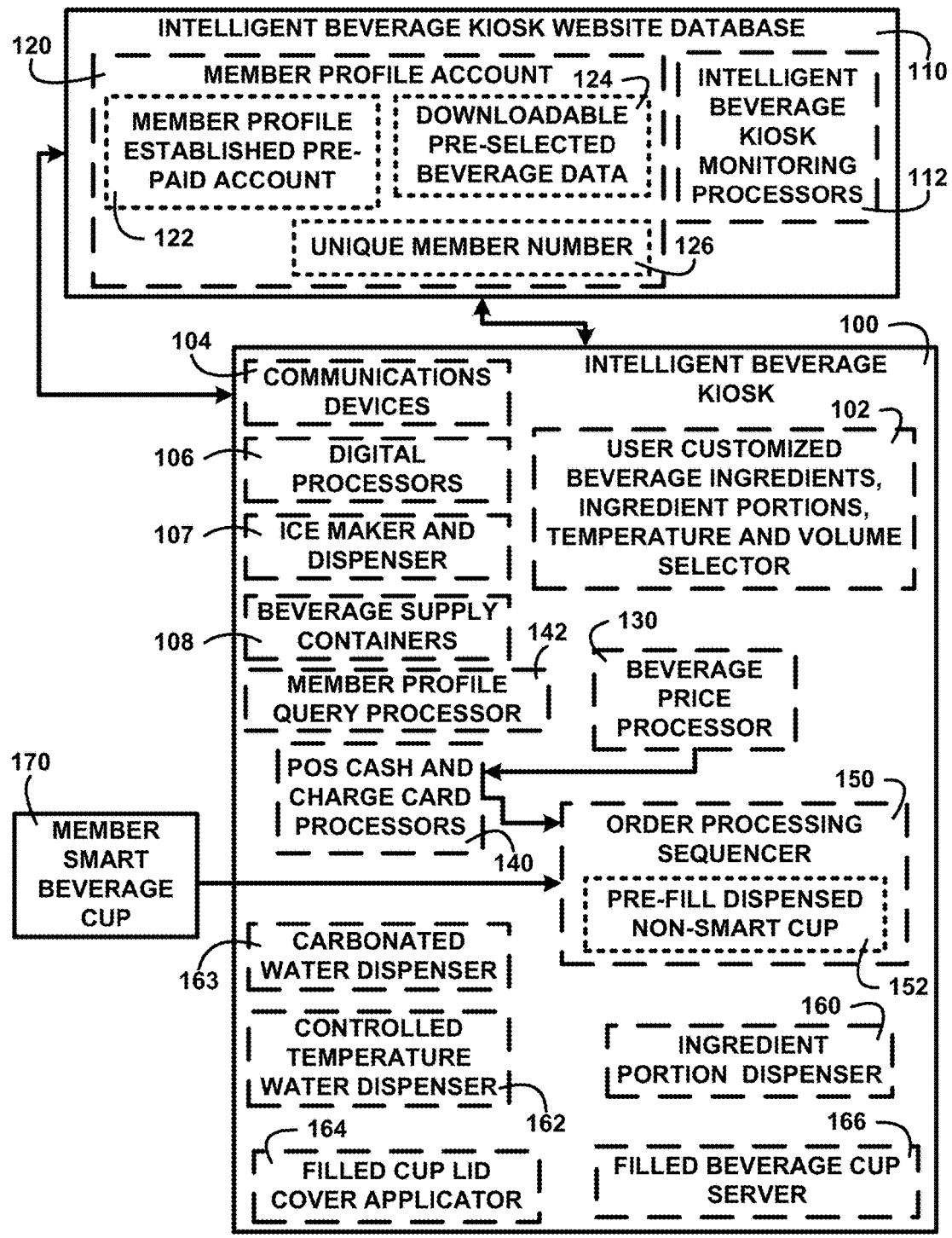
FIG. 1 shows a block diagram of an overview of intelligent beverage kiosk apparatus and system of one embodiment.

FIG. 1 shows a block diagram of an overview of intelligent beverage kiosk apparatus and system of one embodiment. FIG. 1 shows an intelligent beverage kiosk 100 for preparing user customized beverage ingredients, ingredient portions, temperatures and volumes selector 102 to create a unique beverage. The intelligent beverage kiosk 100 may include communications devices 104, digital processors 106, beverage price processor 130, and POS cash and charge card processors 140 and a member profile query processor 142 to interact with a consumer including a member. A consumer may become a member by creating a member profile account 120 on an intelligent beverage kiosk website database 110. The member profile account 120 may include downloadable pre-selected beverage data 124 and a member profile established pre-paid account 122. The intelligent beverage kiosk website database 110 automatically assigns a unique member number 126 to each member profile account 120. The member may communicate with the intelligent beverage kiosk website database 110 using a member smart device with an intelligent beverage kiosk application installed for example a smart cell phone, a smart tablet, a computer and other smart devices of one embodiment.

The intelligent beverage kiosk 100 may include connections to an intelligent beverage kiosk website database 110. The intelligent beverage kiosk website database 110 may include intelligent beverage kiosk monitoring processors 112, member profile account 120 data, and other processing features. The intelligent beverage kiosk 100 may include a kiosk processing panel for interactive commands to an order processing sequencer 150. The order processing sequencer 150 coordinates processing of elements including dispensing a pre-fill dispensed non-smart cup 152, beverage supply containers 108 with ingredients, ingredient portion dispenser 160, controlled temperature water dispenser 162, ice maker and dispenser 107, carbonated water dispenser 163, filled cup lid cover applicator 164, and a beverage filled cup server 166. The order processing sequencer 150 coordinates processing of data communications between the intelligent beverage kiosk 100, intelligent beverage kiosk website database 110, a member smart beverage cup 170 and an intelligent beverage kiosk application of one embodiment.

DETAILED DESCRIPTION

Figure 2:
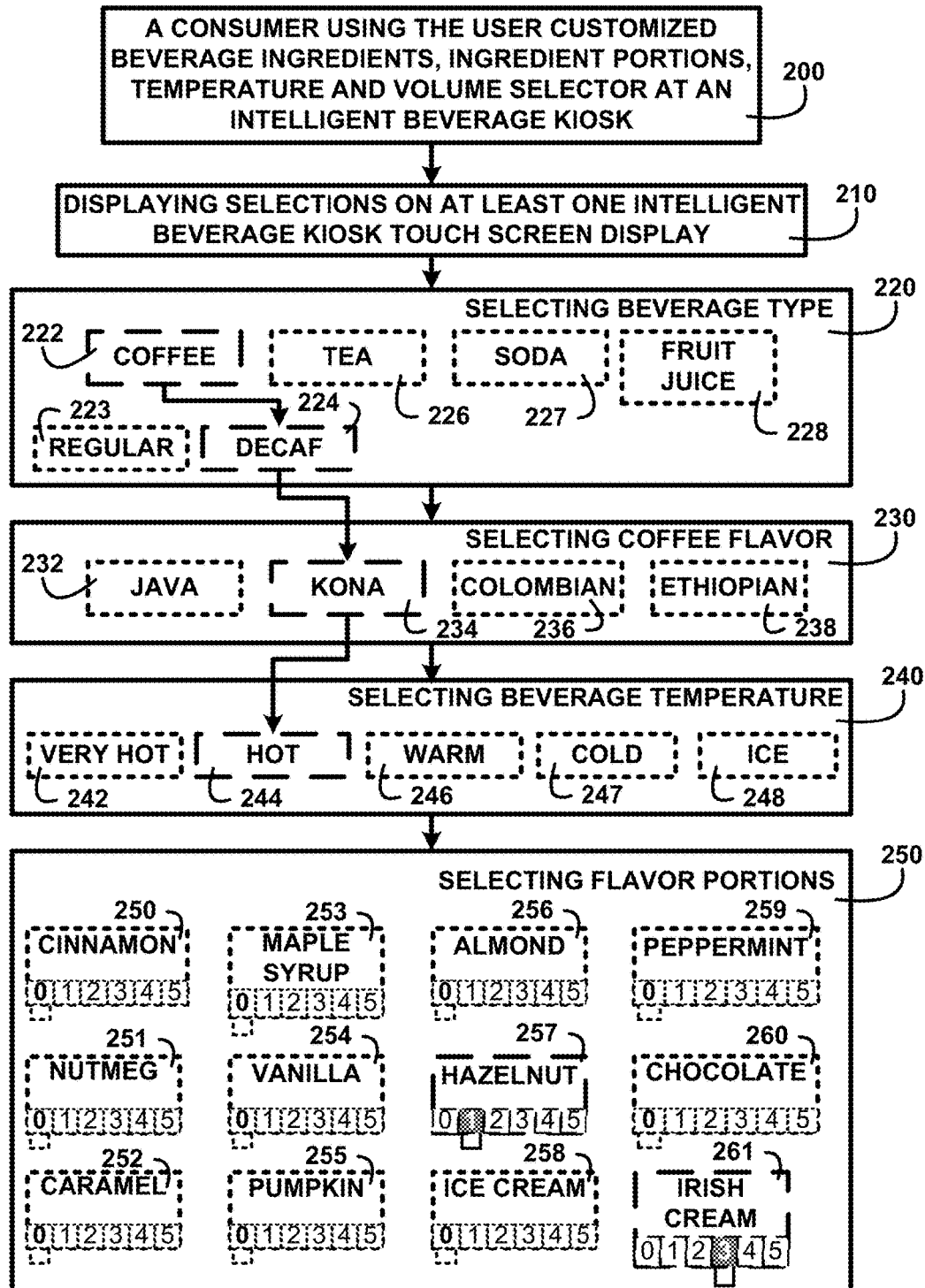
FIG. 2 shows a block diagram of an overview flow chart of intelligent beverage kiosk apparatus and system of one embodiment.

FIG. 2 shows a block diagram of an overview flow chart of intelligent beverage kiosk apparatus and system of one embodiment. FIG. 2 shows a consumer using the user customized beverage ingredients, ingredient portions, temperature, and volume selector at an intelligent beverage kiosk 200. The intelligent beverage kiosk 100 of FIG. 1 is displaying selections on at least one intelligent beverage kiosk touch screen display 210 of one embodiment.

The consumer uses a touch screen display for selecting beverage type 220, for example coffee 222, tea 226, soda 227, and fruit juice 228. In this example the consumer has selected coffee 222 which prompts a display of selections including regular 223 and decaf 224. In this example the consumer selected decaf 224 and the display transitions to selecting coffee flavor 230 including for example java 232, Kona 234, Colombian 236, and Ethiopian 238. In this example the consumer selects Kona 234. The touch screen display shows in this example a screen for selecting beverage temperature 240 including very hot 242, hot 244, warm 246, cold 247, and ice 248. In this example the consumer has selected hot 244 of one embodiment.

The subsequent touch screen display is used for selecting flavor portions 250 including in this example flavors wherein the consumer may select a number of portions ranging from 0 to 5 by touching the portion selection scale for each of the flavors they wish to select. In this example flavors may include cinnamon 012345 250, nutmeg 012345 251, caramel 012345 252, maple syrup 012345 253, vanilla 012345 254, pumpkin 012345 255, almond 012345 256, hazelnut 012345 257, ice cream 012345 258, peppermint 012345 259, chocolate 012345 260, and Irish cream 012345 261. In this example the consumer has selected 2 portions of hazelnut 012345 257 and 3 portions of Irish cream 012345 261 of one embodiment. The continuation of the consumer selection process is described in FIG. 3.

Figure 3:
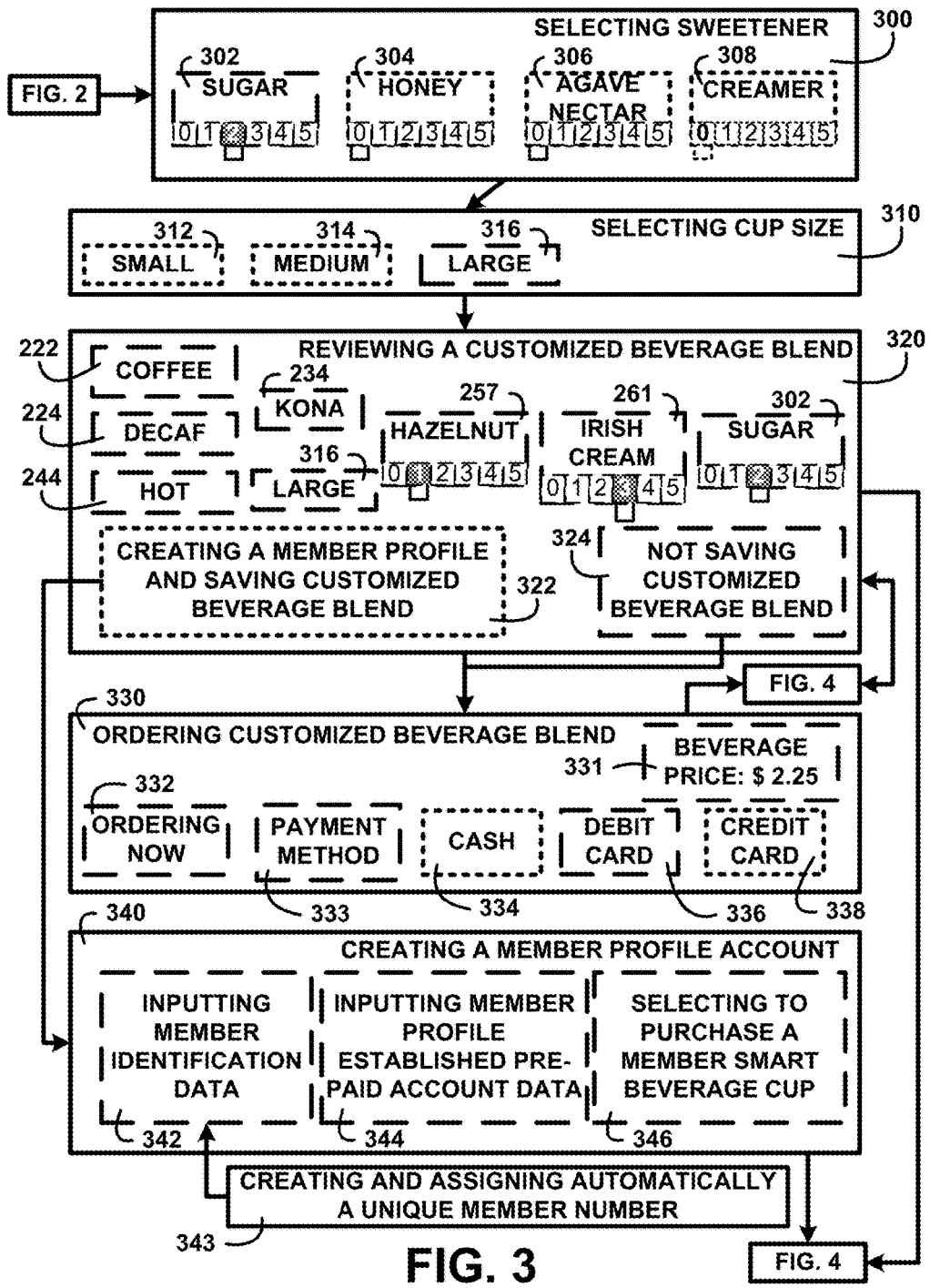
FIG. 3 shows a block diagram of an overview flow chart of displaying selection touch screens of one embodiment.

Displaying Selection Touch Screens:

FIG. 3 shows a block diagram of an overview flow chart of displaying selection touch screens of one embodiment. FIG. 3 shows continuing from FIG. 2 a consumer a selecting sweetener 300 selector touch screen display. The selecting sweetener 300 selector may for example include sugar 012345 302, honey 012345 304, agave nectar 012345 306, and creamer 012345 308. The consumer is this example has selected 2 portions of sugar 012345 302. The next selection touch screen display is used for a volume selector wherein the consumer is selecting cup size 310, from cup sizes including for example small 312, medium 314, large 316. In this example the consumer is selecting a large 316 cup size.

Upon completing the selection processes a display is used for reviewing a customized beverage blend 320. The consumer is shown the selected customized beverage blend including in this example coffee 222, decaf 224, hot 244, Kona 234, large 316, hazelnut 012345 257 1 portion, Irish cream 012345 261 3 portions and sugar 012345 302 2 portions. The consumer may select not saving customized beverage blend 324 for future ordering and may select creating a member profile and saving customized beverage blend 322 of one embodiment. The process may continue as described in FIG. 4.

A touch screen display is shown for ordering customized beverage blend 330. The consumer is shown in this example a beverage price: $2.25 331 and selections for ordering now 332, a payment method 333 including cash 334, debit card 336 and credit card 338. Where the consumer has selected creating a member profile and saving customized beverage blend 322 a touch screen display for creating a member profile account 340 is shown. The consumer is asked for inputting member identification data 342, inputting member profile established pre-paid account data 344 and whether the consumer is selecting to purchase a member smart beverage cup 346. Concurrent with the creation of a new member profile account the intelligent beverage kiosk website database 110 of FIG. 1 uses digital processors for creating and assigning automatically a unique member number 343 to each new member profile account of one embodiment. The processing continues as described in FIG. 4.

Figure 4:
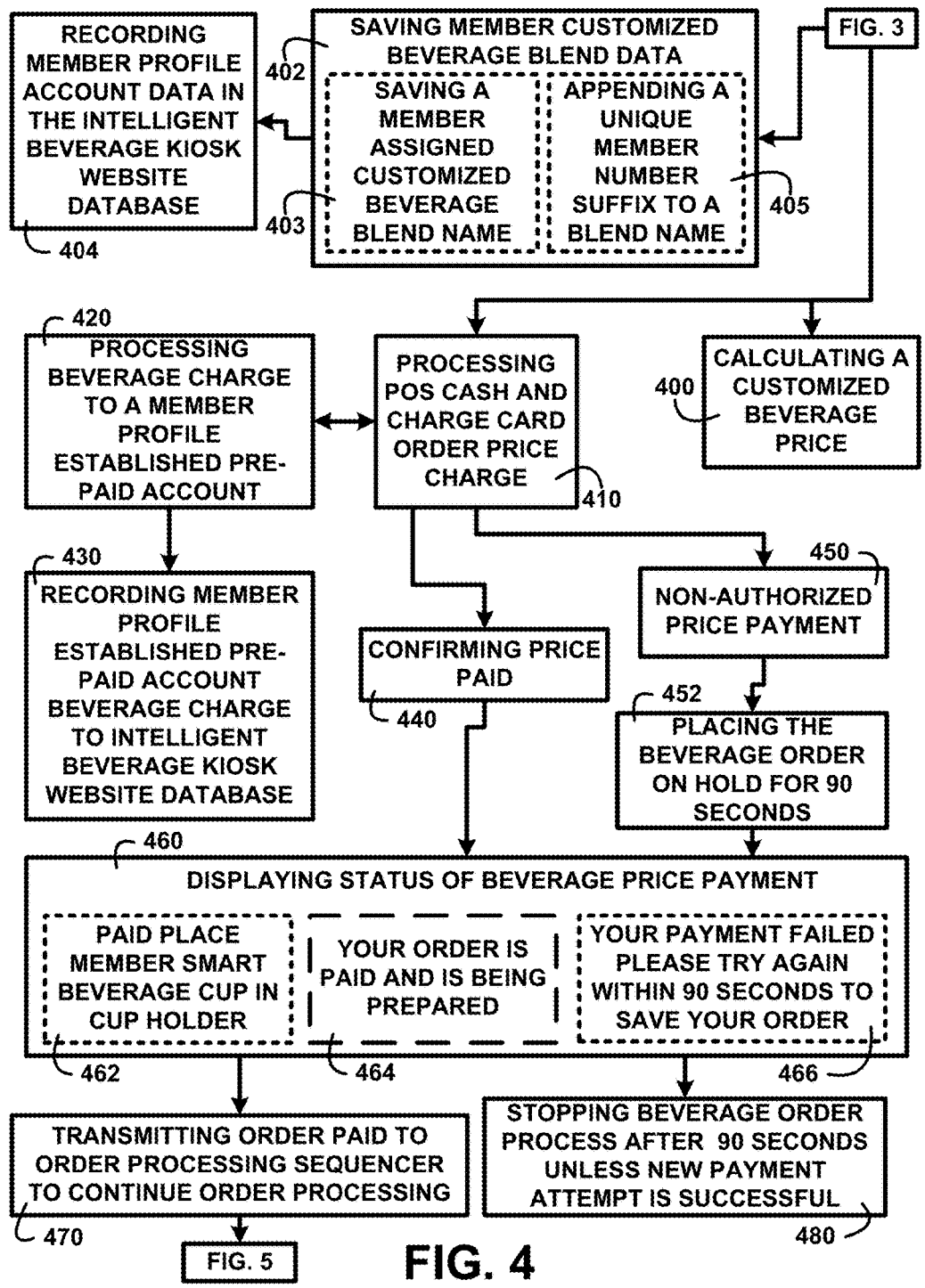
FIG. 4 shows a block diagram of an overview flow chart of member profile accounting of one embodiment.

Member Profile Accounting:

FIG. 4 shows a block diagram of an overview flow chart of member profile accounting of one embodiment. FIG. 4 shows processes continuing from FIG. 3 including saving member customized beverage blend data 402 including saving a member assigned customized beverage blend name 403 and appending a unique member number suffix to a blend name 405. Processing includes recording member profile account data in the intelligent beverage kiosk website database 404. The intelligent beverage kiosk website database 110 of FIG. 1 performs calculating a customized beverage price 400 and displaying the price to the consumer of one embodiment.

The intelligent beverage kiosk website database 110 of FIG. 1 performs processing POS cash and charge card order price charge 410. The intelligent beverage kiosk website database 110 of FIG. 1 performs processing beverage charge to a member profile established pre-paid account 420 and recording member profile established pre-paid account beverage charge to intelligent beverage kiosk website database 430. Should the consumer order payment fail a message is displayed indicating a non-authorized price payment 450 and placing the beverage order on hold for 90 seconds 452 of one embodiment.

The intelligent beverage kiosk website database 110 of FIG. 1 will transmit a message confirming price paid 440 when displaying status of beverage price payment 460. Displaying status of beverage price payment 460 may include messages including paid place member smart beverage cup in cup holder 462, your order is paid and is being prepared 464, and your payment failed please try again within 90 seconds to save your order 466. The intelligent beverage kiosk website database 110 of FIG. 1 processes stopping beverage order process after 90 seconds unless new payment attempt is successful 480. The intelligent beverage kiosk website database 110 of FIG. 1 after confirming price paid 440 will continue processing by transmitting order paid to order processing sequencer to continue order processing 470 of one embodiment. Processing continues as described in FIG. 5.

Figure 5:
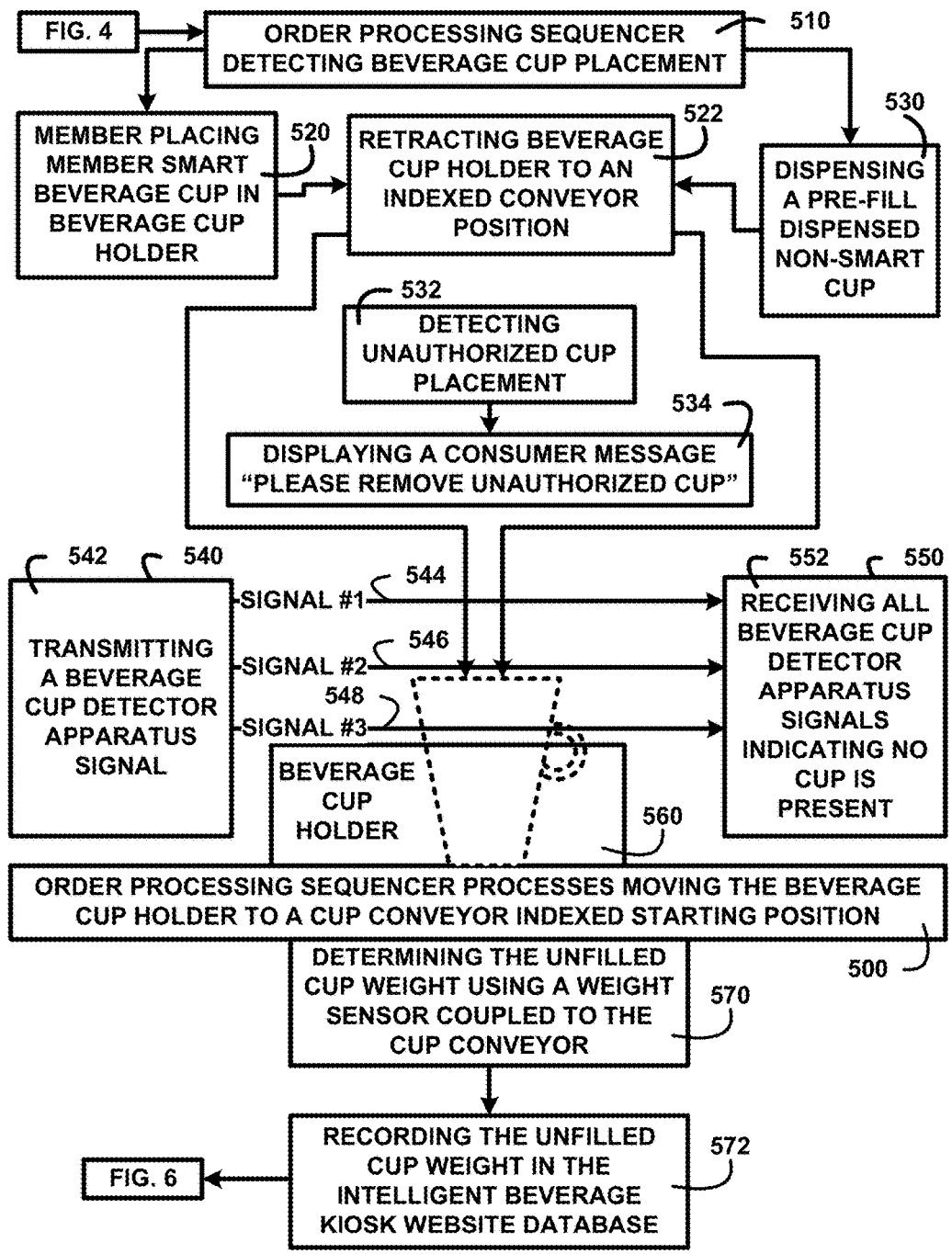
FIG. 5 shows a block diagram of an overview flow chart of order processing sequencing of one embodiment.

Order Processing Sequencing:

FIG. 5 shows a block diagram of an overview flow chart of order processing sequencing of one embodiment. FIG. 5 shows a continuation from FIG. 4 with a process of the order processing sequencer detecting beverage cup placement 510. In one embodiment detection includes a member placing member smart beverage cup in the beverage cup holder 520. In another embodiment detection includes dispensing a pre-fill dispensed non-smart cup 530. Detecting of a cup other than a dispensed or member smart beverage cup stops the process 532 and displaying a consumer message "please remove unauthorized cup" 534 of one embodiment.

A beverage cup detector apparatus signal transmitter 540 is used for transmitting a beverage cup detector apparatus signal 542 including for example a signal #1 544, a signal #2 546 and a signal #3 548. The transmitted signals are configured to be received using a beverage cup detector apparatus signal receiver 550. Receiving all beverage cup detector apparatus signals indicating no cup is present 552 in a beverage cup holder 560. Not receiving all of the beverage cup detector apparatus signals indicates that a cup is present in the beverage cup holder 560 of one embodiment.

Upon detection that a cup is present in the beverage cup holder 560 the order processing sequencer processes moving the beverage cup holder to a cup conveyor indexed starting position 500. In the indexed starting position a process is performed for determining the unfilled cup weight using a weight sensor coupled to the cup conveyor 570 and recording the unfilled cup weight in the intelligent beverage kiosk website database 572 of one embodiment. Processing continues as described in FIG. 6.

Figure 6:
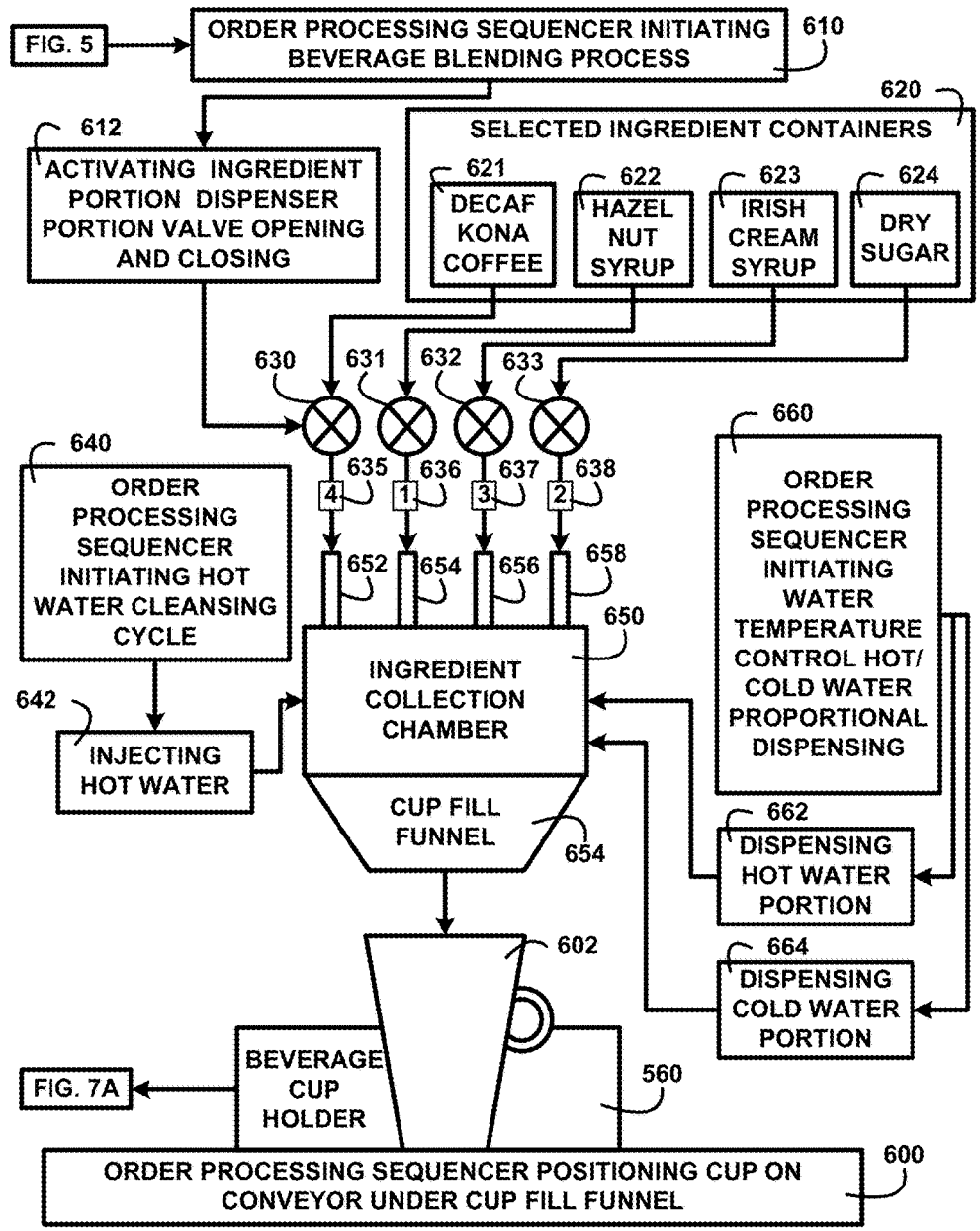
FIG. 6 shows a block diagram of an overview flow chart of beverage blending processing of one embodiment.

Beverage Blending Processing:

FIG. 6 shows a block diagram of an overview flow chart of beverage blending processing of one embodiment. FIG. 6 shows continuing from FIG. 5 with the order processing sequencer positioning cup on conveyor under cup fill funnel 600. The processing continues with the order processing sequencer initiating beverage blending process 610 by activating ingredient portion dispenser portion valve opening and closing 612 of selected ingredient containers 620 including in this example decaf Kona coffee 621, hazelnut syrup 622, Irish cream syrup 623 and dry sugar 624. The portion valve opening and closing activation includes a first ingredient container dispensing valve 630, a second ingredient container dispensing valve 631, a third ingredient container dispensing valve 632 and a fourth ingredient container dispensing valve 633.

Dispensing selected ingredients includes a first ingredient container dispensing valve dispensing 4 portions 635 through a first ingredient injection tube 652, a second ingredient container dispensing valve dispensing 1 portion 636 through a second ingredient injection tube 654, a third ingredient container dispensing valve dispensing 3 portions 637 through a third ingredient injection tube 656 and a fourth ingredient container dispensing valve dispensing 2 portions 638 through a fourth ingredient injection tube 658 into an ingredient collection chamber 650.

Figure 7A:
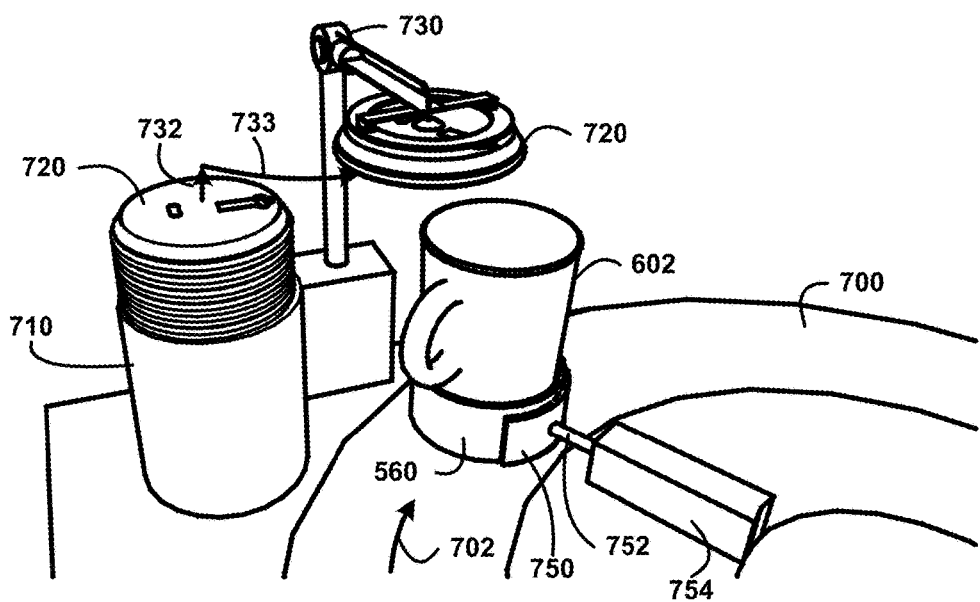
FIG. 7A shows for illustrative purposes only an example of lid positioning of one embodiment.

Processing includes an order processing sequencer initiating hot water cleansing cycle 640 wherein injecting hot water 642 into the ingredient collection chamber 650 starts a mixing process of the selected ingredients and cleans the dispensed ingredients from the ingredient collection chamber 650 surface to prevent affecting the flavor of a next customized beverage blend. A thorough mixing and cleansing is performed with an order processing sequencer initiating water temperature control hot/cold water proportional dispensing 660. Proportional dispensing of water includes dispensing hot water portion 662 and dispensing cold water portion 664 into the ingredient collection chamber 650 to complete mixing and dispensing the mixed beverage liquid through a cup fill funnel 654 into a beverage cup 602 positioned in the beverage cup holder 560 of one embodiment. FIG. 7A shows a description of the continuing processes.

Lid Positioning:

FIG. 7A shows for illustrative purposes only an example of lid positioning of one embodiment. FIG. 7A shows processes continuing from FIG. 6 including a cup holder conveyor 700 used to move a beverage cup 602 to beverage preparation stations in the course of processing. A cup holder conveyor rotates beverage cup holder to lid applicator position 702. A filled cup lid cover applicator 730 is used to cover the beverage cup 602 in the beverage cup holder 560 with a snap on lid. The beverage cup holder 560 is attached to a beverage cup holder coupling 750 coupled to a beverage cup holder actuator 754 with an actuator rod 752 of one embodiment.

A beverage cup lid dispenser 710 holds a supply of at least one beverage cup lid 720. A filled cup lid cover applicator lifts a beverage cup lid 732 from the beverage cup lid dispenser 710 using a suction cup coupled to a vacuum tube. A filled cup lid cover applicator rotates the lifted beverage cup lid over the filled beverage cup 733 of one embodiment. The process continues as described in FIG. 7B.

Figure 7B:
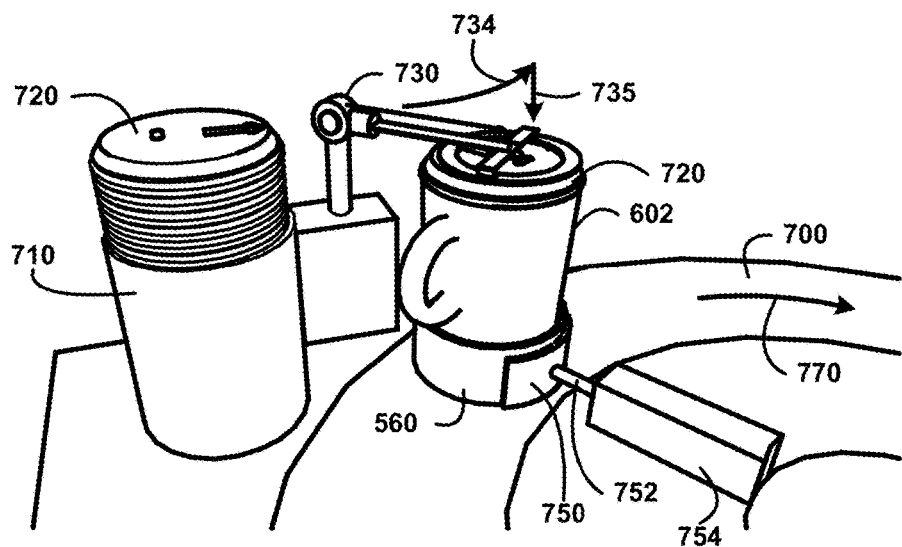
FIG. 7B shows for illustrative purposes only an example of lid coupling of one embodiment.

Lid Coupling:

FIG. 7B shows for illustrative purposes only an example of lid coupling of one embodiment. FIG. 7B shows the cup holder conveyor 700, filled cup lid cover applicator 730, beverage cup 602, beverage cup holder 560, beverage cup lid dispenser 710, and the beverage cup lid 720. A filled cup lid cover applicator confirms lid position over beverage cup 734 using indexing of the cup holder conveyor 700 and corresponding indexed positions of the filled cup lid cover applicator 730 of FIG. 7A. A filled cup lid cover applicator lowers the beverage cup lid onto filled beverage cup 735. The filled cup lid cover applicator 730 of FIG. 7A applies a downward force to snap the beverage cup lid 720 onto the beverage cup and a cup holder conveyor rotates beverage cup holder to an indexed server position 770 of one embodiment. Process continuation is described on FIG. 8A.

Beverage Cup Serving Positioning:

FIG. 8A shows for illustrative purposes only an example of beverage cup serving positioning of one embodiment. FIG. 8A shows the beverage cup 602 in the beverage cup holder 560 with the beverage cup lid 720 secured to the beverage cup 602. An order processing sequencer activating the conveyor to position the lid covered filled beverage cup to an indexed position 800 of one embodiment. Continuation of processing is described in FIG. 8B.

Beverage Cup Serving Positioning Side View:

FIG. 8B shows for illustrative purposes only an example of beverage cup serving positioning side view of one embodiment. FIG. 8B shows continuing processes from FIG. 8A and the beverage cup 602, beverage cup holder 560, cup holder actuator 754, actuator rod 752, beverage cup holder coupling 750 and beverage cup lid 720 in a side view 810. The beverage cup conveyor 700 moved the beverage cup holder 560 to an indexed server position in proximity to a serving counter surface 820 and cup holder stop 824 of one embodiment. FIG. 8C describes a continuation of processing.

Beverage Cup Moved into Serving Position:

FIG. 8C shows for illustrative purposes only an example of beverage cup moved into serving position of one embodiment. FIG. 8C shows continuing from FIG. 8B the beverage cup 602 with secured beverage cup lid 720 in the beverage cup holder 560 in a side view 810. The beverage cup conveyor 700 indexed positioning from the filled cup lid cover applicator 730 of FIG. 7A initiated a process of activating the beverage cup holder actuator extending the actuator rod to move the filled beverage cup to a serving counter surface position against a cup holder stop 822. The beverage cup holder actuator 754 with actuator rod extended 830 applies pressure to the beverage cup holder coupling 750 to maintain the beverage cup holder 560 against the cup holder stop 824. The filled beverage cup positioning on the serving counter surface 820 makes the filled beverage cup ready for consumer pickup of one embodiment.

Figure 9A:
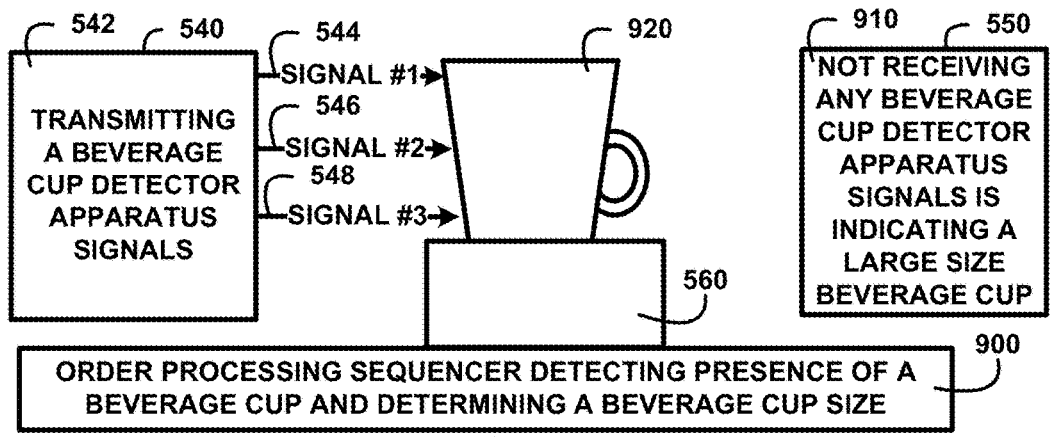
FIG. 9A shows for illustrative purposes only an example of large beverage cup detection of one embodiment.

Large Beverage Cup Detection:

FIG. 9A shows for illustrative purposes only an example of large beverage cup detection of one embodiment. FIG. 9A shows an order processing sequencer detecting presence of a beverage cup and determining a beverage cup size 900. The beverage cup detector apparatus signal transmitter 540 is transmitting a beverage cup detector apparatus signals 542 including for example signal #1 544, signal #2 546 and signal #3 548. Signal #1 544, signal #2 546 and signal #3 548 encounter a large size beverage cup 920 in the beverage cup holder 560. The signals are stopped from reaching the beverage cup detector apparatus signal receiver 550. The beverage cup detector apparatus signal receiver 550 not receiving any beverage cup detector apparatus signals is indicating a large size beverage cup 910 of one embodiment.

Figure 9B:
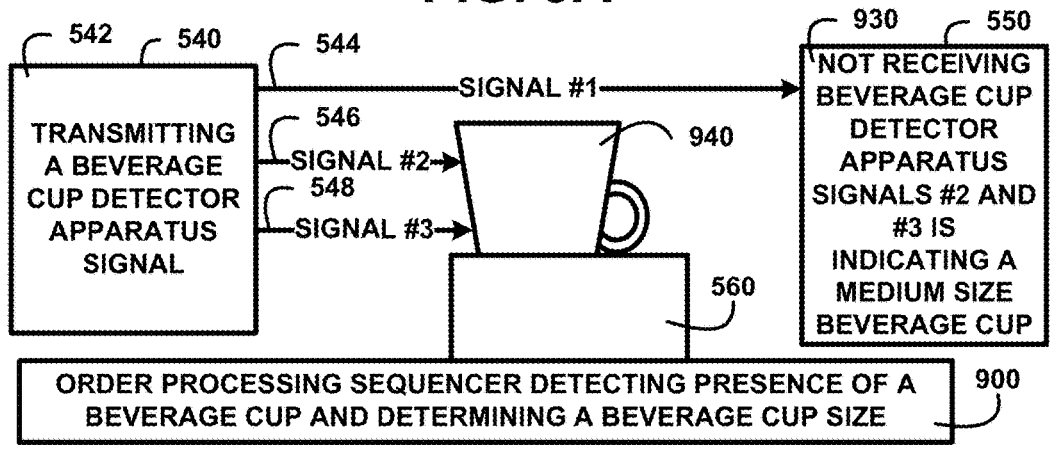
FIG. 9B shows for illustrative purposes only an example of medium beverage cup detection of one embodiment.

Medium Beverage Cup Detection:

FIG. 9B shows for illustrative purposes only an example of medium beverage cup detection of one embodiment. FIG. 9B shows the order processing sequencer detecting presence of a beverage cup and determining size of beverage cup 900.

The beverage cup detector apparatus signal transmitter 540 is transmitting a beverage cup detector apparatus signals 542 including signal #1 544, signal #2 546 and signal #3 548. A medium size beverage cup 940 in the beverage cup holder 560 interferes with signal reception by the beverage cup detector apparatus signal receiver 550. The beverage cup detector apparatus signal receiver 550 not receiving beverage cup detector apparatus signals #2 and #3 is indicating a medium size beverage cup 930 of one embodiment.

Figure 9C:
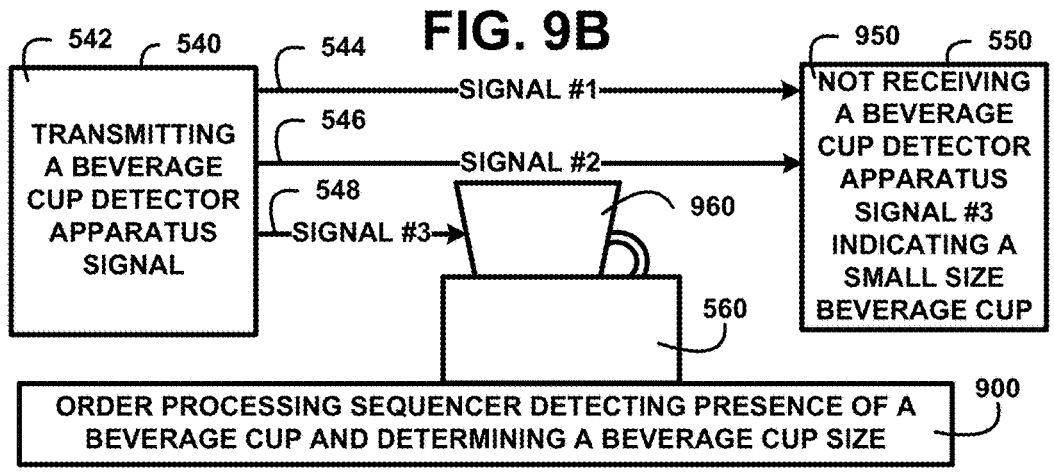
FIG. 9C shows for illustrative purposes only an example of small beverage cup detection of one embodiment.

Small Beverage Cup Detection:

FIG. 9C shows for illustrative purposes only an example of small beverage cup detection of one embodiment. FIG. 9C shows the order processing sequencer detecting presence of a beverage cup and determining a beverage cup size 900. The beverage cup detector apparatus signal transmitter 540 is transmitting a beverage cup detector apparatus signals 542 including signal #1 544, signal #2 546 and signal #3 548. A small size beverage cup 960 in the beverage cup holder 560 interferes with signal reception by the beverage cup detector apparatus signal receiver 550. The beverage cup detector apparatus signal receiver 550 not receiving beverage cup detector apparatus signal #3 is indicating a small size beverage cup 950.

Figure 10:
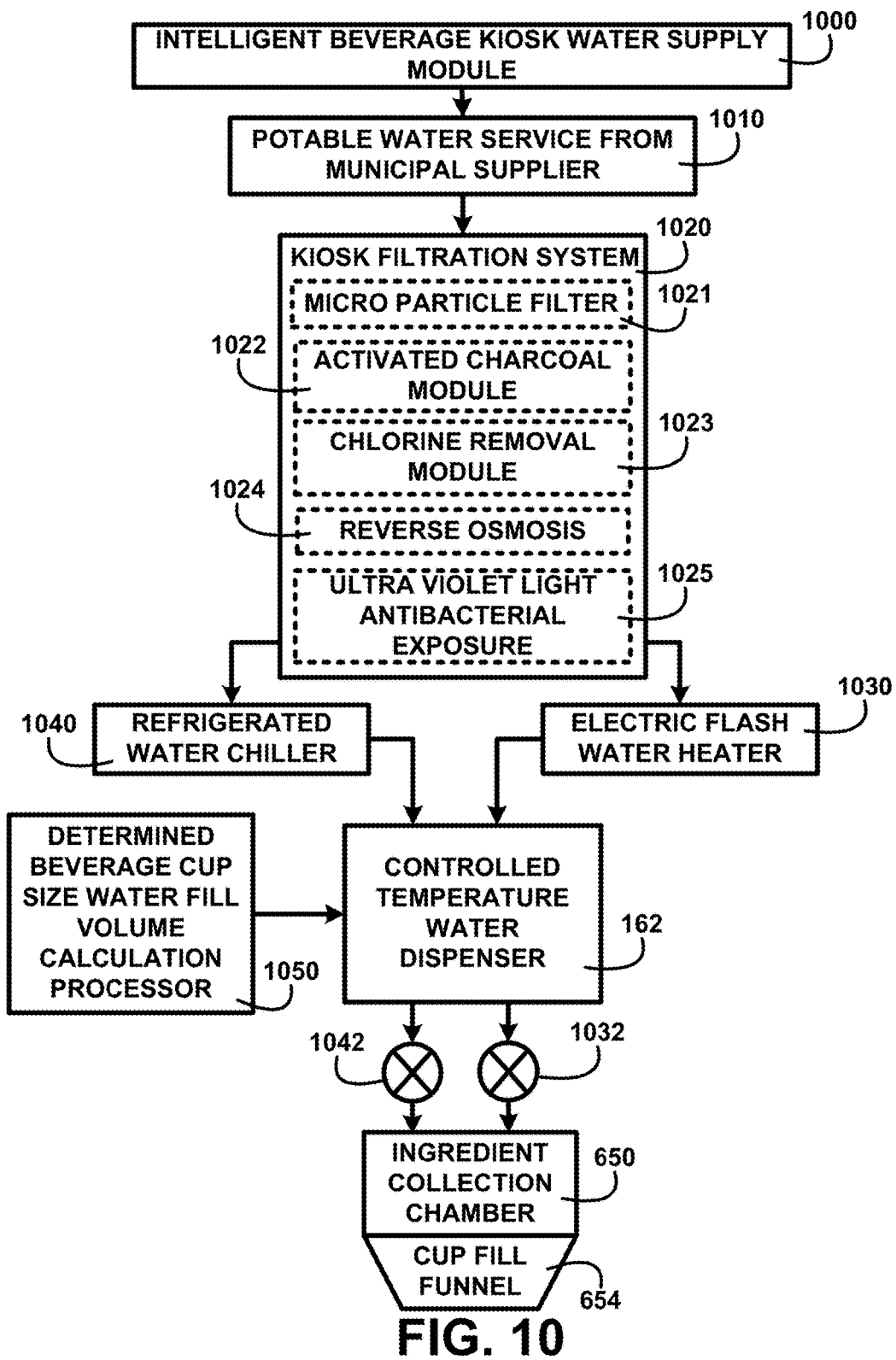
FIG. 10 shows a block diagram of an overview of smart cup kiosk water supply module of one embodiment.

Smart Cup Kiosk Water Supply Module:

FIG. 10 shows a block diagram of an overview of smart cup kiosk water supply module of one embodiment. FIG. 10 shows an intelligent beverage kiosk water supply module 1000. The intelligent beverage kiosk water supply module 1000 is coupled to a potable water service from municipal supplier 1010. The intelligent beverage kiosk water supply module 1000 includes a kiosk filtration system 1020. The kiosk filtration system 1020 is configured to include a micro particle filter 1021, activated charcoal module 1022, chlorine removal module 1023, reverse osmosis 1024 device, and an ultra violet light antibacterial exposure 1025 device.

Filtering and treating the municipal supplier potable water supply is to remove chlorine for taste and assure consumers of a safe water ingredient in customized beverages. The intelligent beverage kiosk water supply module 1000 includes a refrigerated water chiller 1040 and an electric flash water heater 1030. The refrigerated water chiller 1040 supplies a cold water supply and the electric flash water heater 1030 supplies a hot water supply.

A determined beverage cup size water fill volume calculation processor 1050 computes a total cup volume. The controlled temperature water dispenser 162 dispenses portions of cold and hot filtered water in proportions that total the total cup volume and in proportions of volumes of different temperature to blend the water temperature to a selected beverage temperature. The controlled temperature water dispenser 162 responds to the determined proportional volumes of different temperatures by opening and closing a chilled water dispensing valve 1042 and a hot water dispensing valve 1032 to supply the corresponding portions into the ingredient collection chamber 650 and dispensing the mixed volume through the cup fill funnel 654 of one embodiment.

Figure 11A:
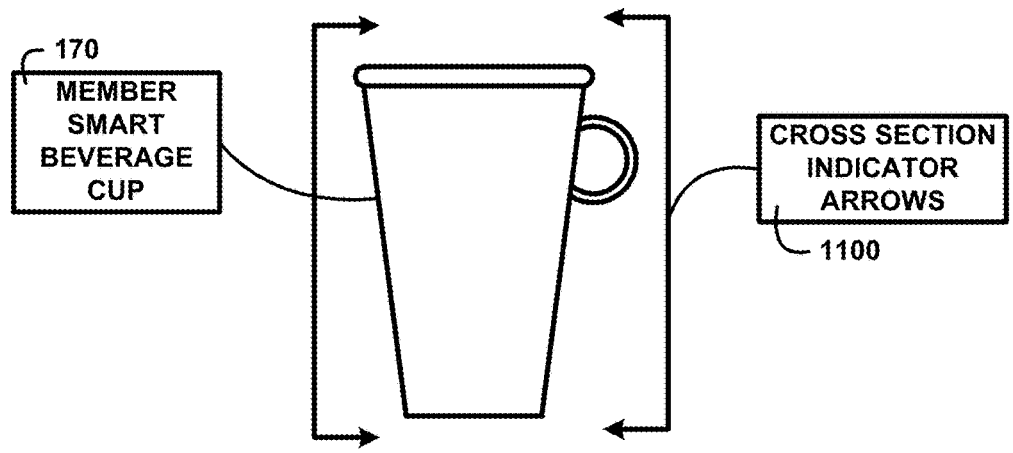
FIG. 11A shows for illustrative purposes only an example of smart cup profile of one embodiment.

Smart Cup Profile:

FIG. 11A shows for illustrative purposes only an example of smart cup profile of one embodiment. FIG. 11A shows the member smart beverage cup 170 and cross section indicator arrows 1100.

Figure 11B:
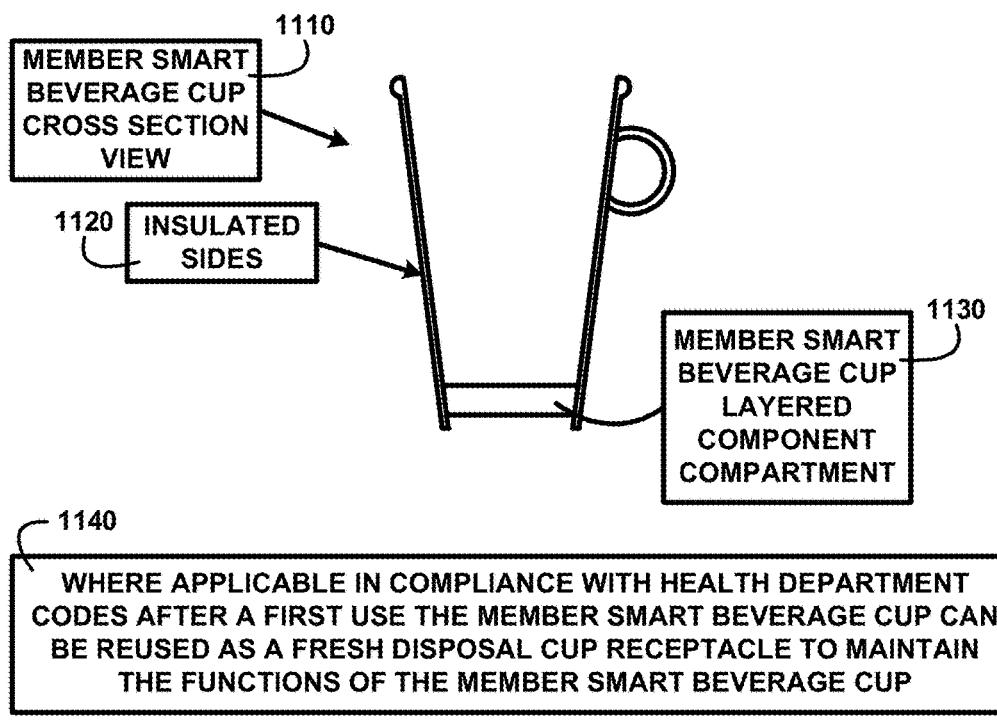
FIG. 11B shows for illustrative purposes only an example of smart cup cross section of one embodiment.

Smart Cup Cross Section:

FIG. 11B shows for illustrative purposes only an example of smart cup cross section of one embodiment. FIG. 11B shows a member smart beverage cup cross section view 1110 that includes views of insulated sides 1120. The member smart beverage cup 170 of FIG. 1 includes a member smart beverage cup layered component compartment 1130. Where applicable in compliance with health department codes after a first use the member smart beverage cup can be reused as a fresh disposal cup receptacle to maintain the functions of the member smart beverage cup 1140 of one embodiment.

Figure 11C:
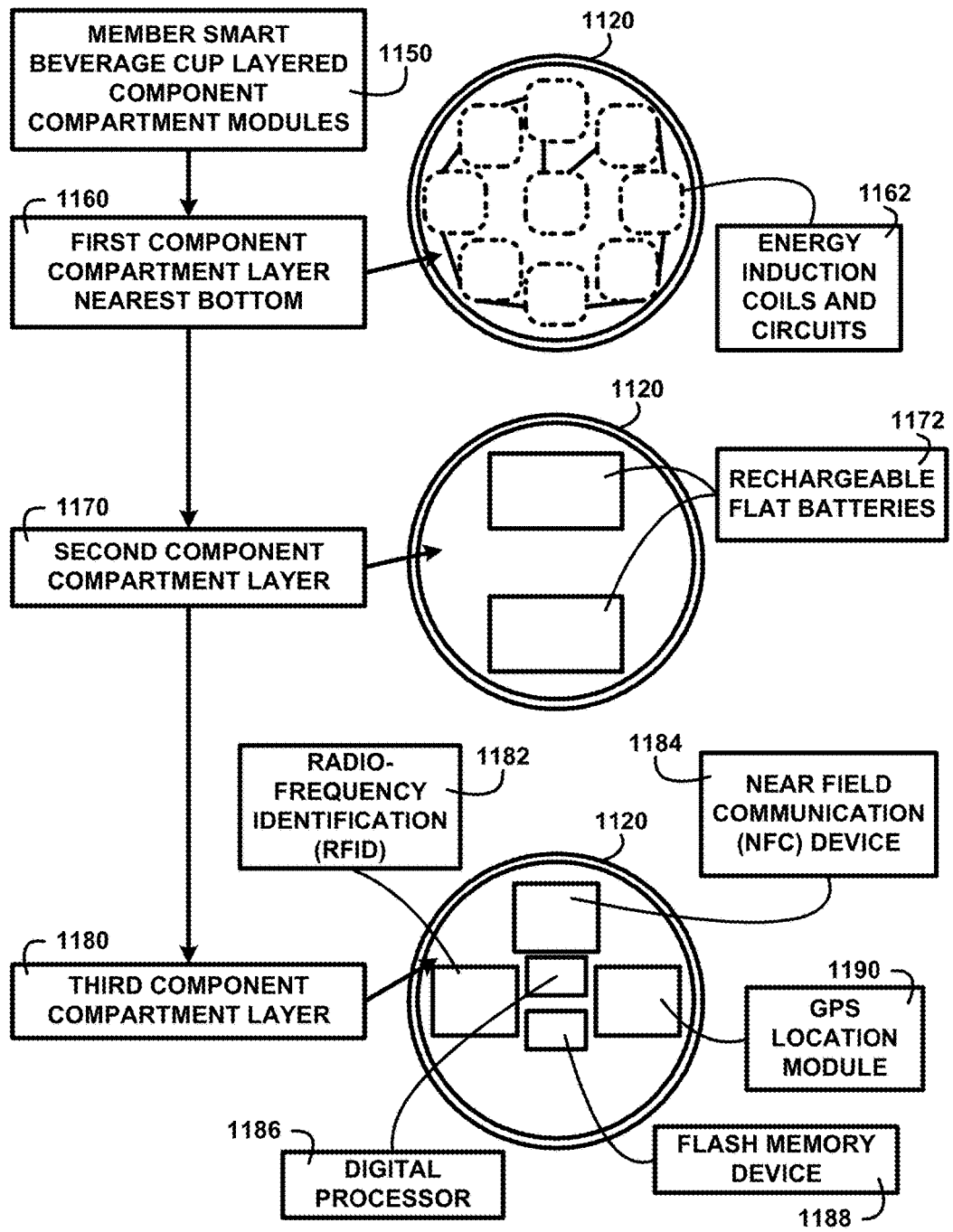
FIG. 11C shows for illustrative purposes only an example of member smart beverage cup layered component compartment modules of one embodiment.

Member Smart Beverage Cup Layered Component Compartment Modules:

FIG. 11C shows for illustrative purposes only an example of member smart beverage cup layered component compartment modules of one embodiment. FIG. 11C shows member smart beverage cup layered component compartment modules 1150 and insulated sides 1120 of the member smart beverage cup 170 of FIG. 1. A first component compartment layer nearest bottom 1160 includes energy induction coils and circuits 1162 for receiving induced electrical current for recharging a second component compartment layer 1170 rechargeable flat batteries 1172. A third component compartment layer 1180 includes a radio-frequency identification (RFID) 1182 device, a near field communication (NFC) device 1184, a GPS location module 1190, a flash memory device 1188 and a digital processor 1186 of one embodiment.

Figure 12:
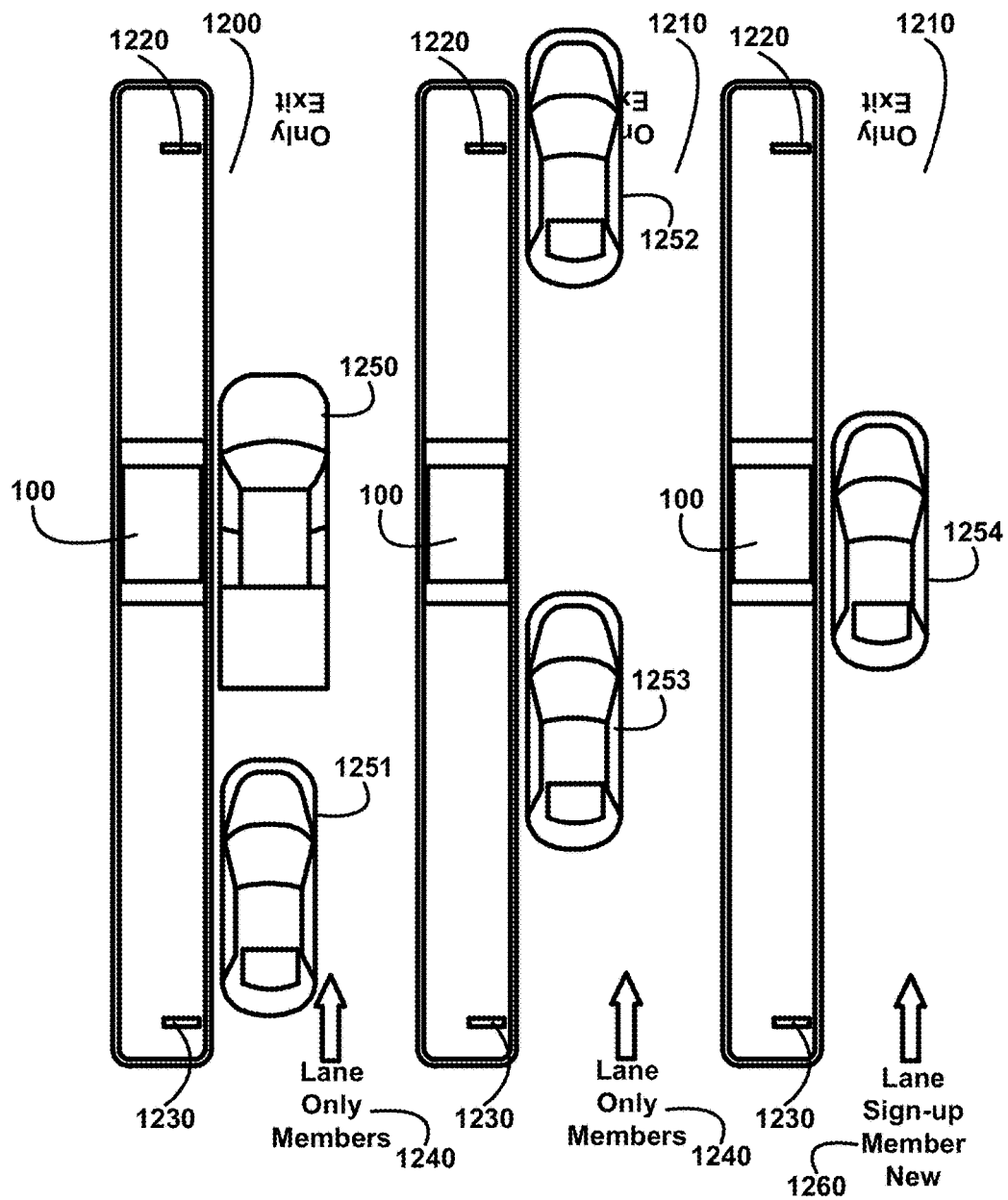
FIG. 12 shows for illustrative purposes only an example of intelligent beverage kiosk drive-thru layout of one embodiment.

Intelligent Beverage Kiosk Drive-Thru Layout:

FIG. 12 shows for illustrative purposes only an example of intelligent beverage kiosk drive-thru layout of one embodiment. FIG. 12 shows a plurality of intelligent beverage kiosk 100 positioned along driving lanes including members only lane 1240 designated. A lane entrance sign and WIFI module 1230 and an exit only sign and WIFI module 1220 are installed on each lane to receive data communications from member vehicle placing order via smart beverage cup WIFI communication 1251 and member vehicle placing order via intelligent beverage kiosk application smart device communication 1253.

Members only lane 1240 are designated to facilitate kiosk member drive thru access 1200 since member ordering may include placing orders with downloadable pre-selected beverage data 124 of FIG. 1 and paying for the order using the member profile established pre-paid account 122 of FIG. 1. Member vehicle picking up served beverage cup 1250 is accomplished with reduced wait times. The exit only sign and WIFI module 1220 is used when a member vehicle exiting drive-thru and order pick-up signal being recorded 1252 into the member profile account 120 of FIG. 1 on the intelligent beverage kiosk website database 110 of FIG. 1.

Kiosk non-member drive thru access 1210 is through a New Member Sign-up Lane 1260 where a non-member placing order using kiosk touch screen selector 1254 may take a longer period of time to place and pay for an order. A non-member may also take longer time when creating a member profile account 120 of FIG. 1 of one embodiment.

Figure 13:
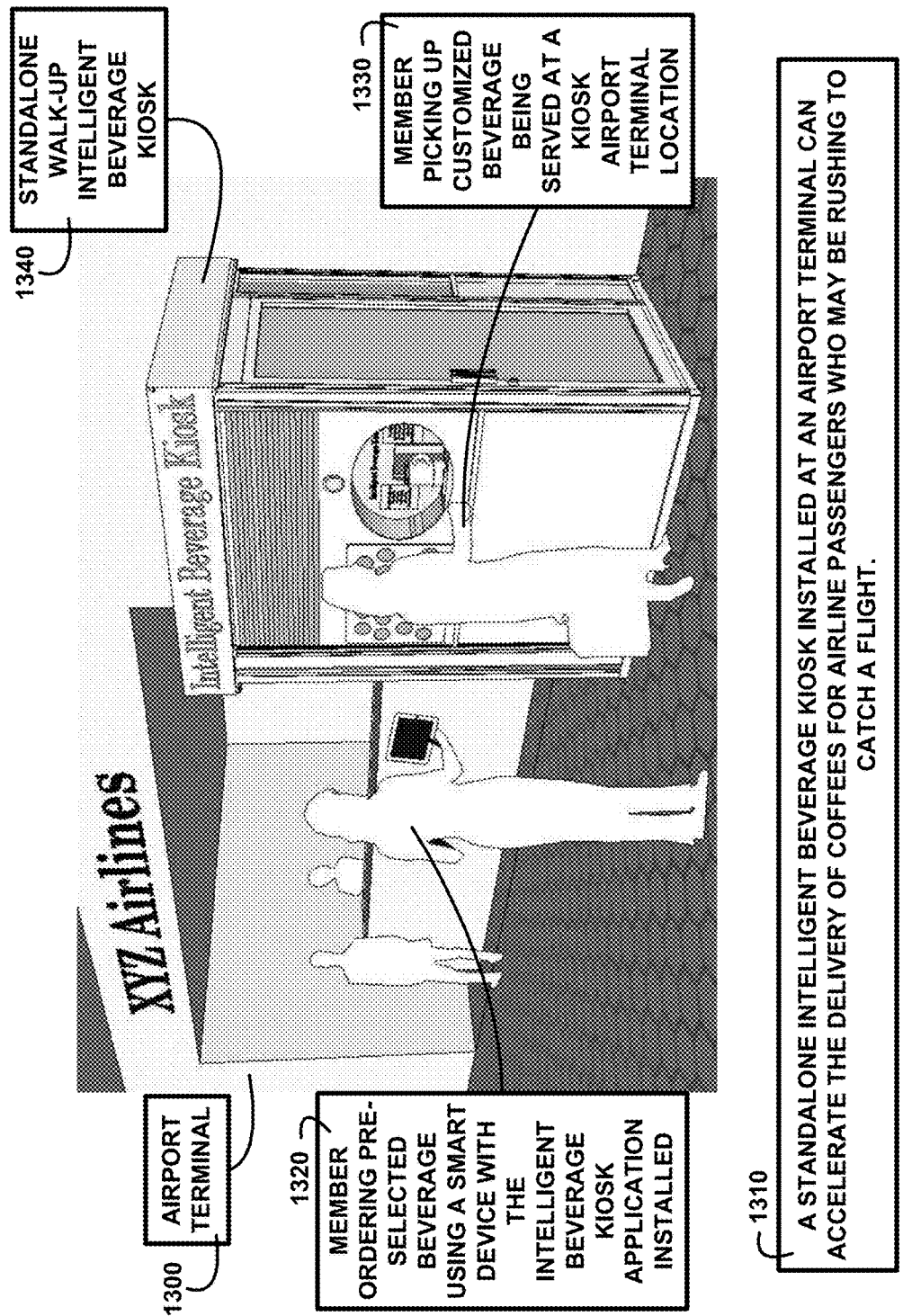
FIG. 13 shows for illustrative purposes only an example of intelligent beverage kiosk airport terminal location of one embodiment.

Intelligent Beverage Kiosk Airport Terminal Location:

FIG. 13 shows for illustrative purposes only an example of intelligent beverage kiosk airport terminal location of one embodiment. FIG. 13 shows a standalone walk-up intelligent beverage kiosk 1340 placed in an airport terminal 1300. FIG. 13 shows a member ordering pre-selected beverage using a smart device with the intelligent beverage kiosk application installed 1320. Also shown is a member picking up customized beverage being served at a kiosk airport terminal location 1330. A standalone intelligent beverage kiosk installed at an airport terminal can accelerate the delivery of coffees for airline passengers who may be rushing to catch a flight 1310 of one embodiment.

Figure 14:
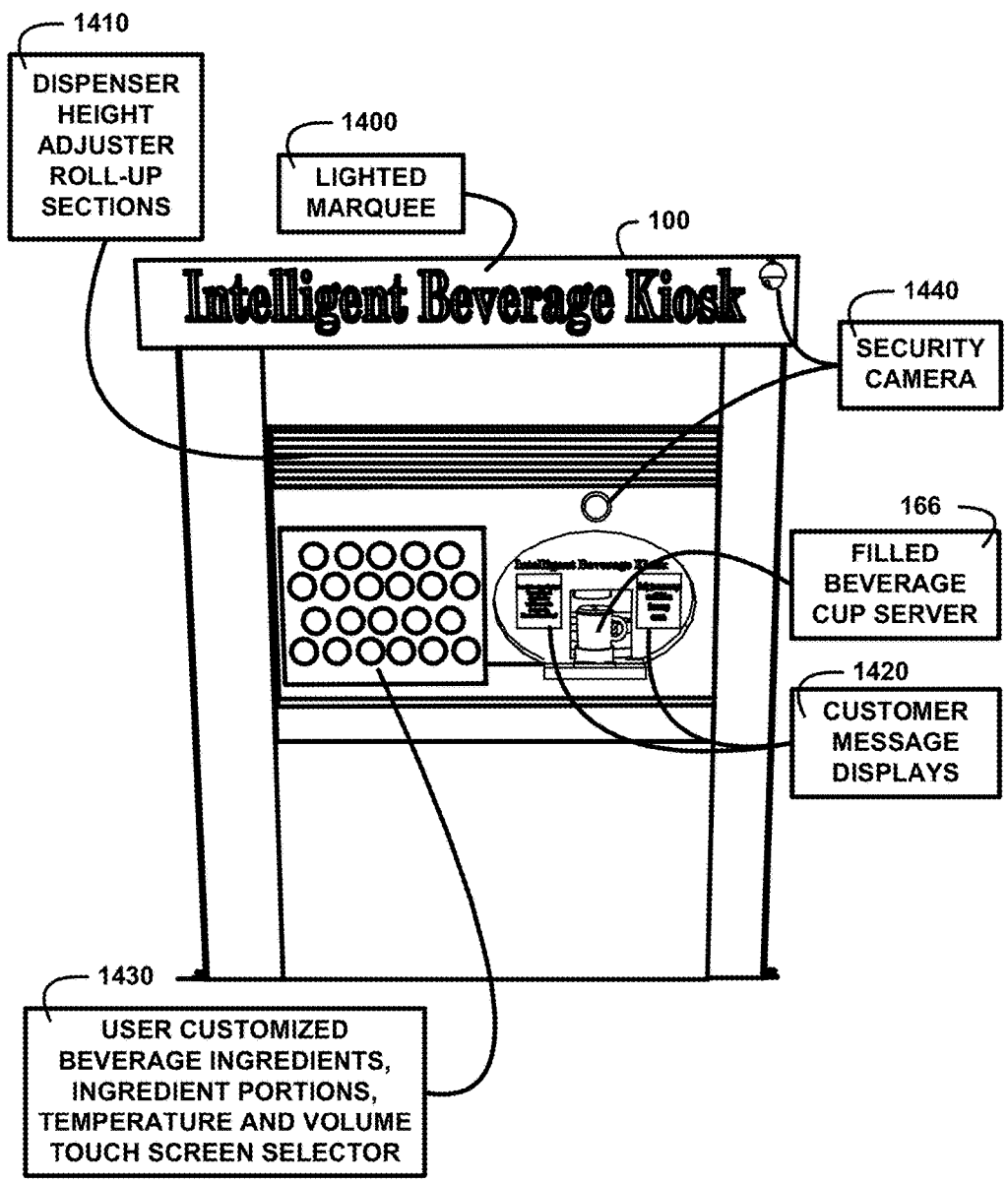
FIG. 14 shows for illustrative purposes only an example of standalone intelligent beverage kiosk of one embodiment.

Standalone Intelligent Beverage Kiosk:

FIG. 14 shows for illustrative purposes only an example of standalone intelligent beverage kiosk of one embodiment. FIG. 14 shows the intelligent beverage kiosk 100 including a lighted marquee 1400, a plurality of security camera 1440 devices, the filled beverage cup server 166, a plurality of customer message displays 1420, a user customized beverage ingredients, ingredient portions, temperature and volume touch screen selector 1430 display and a plurality of dispenser height adjuster roll-up sections 1410. The intelligent beverage kiosk 100 is configured to be a standalone installation that is unmanned and includes systems and apparatus to be fully operational of one embodiment.

Figure 15A:
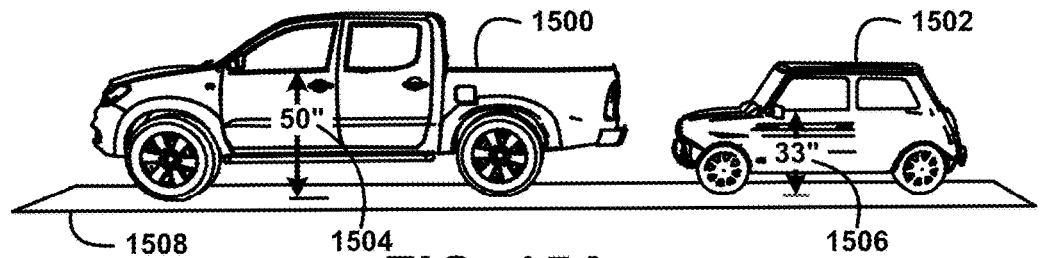
FIG. 15A shows for illustrative purposes only an example of vehicle window heights of one embodiment.

Vehicle Window Heights:

FIG. 15A shows for illustrative purposes only an example of vehicle window heights of one embodiment. FIG. 15A shows a pickup truck 1500 and a subcompact car 1502 on a driving surface 1508. The pickup truck 1500 has for example a 50" 1504 height to driver window from the driving surface 1508. The subcompact car 1502 has for example a 33" 1506 height to driver window from the driving surface 1508.

A 17" height difference making reaching and picking up a drive-thru beverage cup difficult from a conventional drive-thru service window height. For example a consumer picking up a hot cup of coffee while seated in the pickup truck 1500 would have to reach down a distance that may cause difficulties in retrieving the hot cup of coffee. In another example a consumer picking up a hot cup of coffee while seated in the subcompact car 1502 would have to reach upwards to retrieve the hot cup of coffee that may cause difficulties including spilling the hot coffee of one embodiment.

Figure 15B:
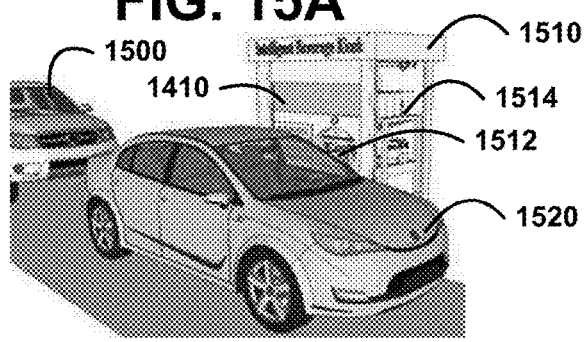
FIG. 15B shows for illustrative purposes only an example of sedan at drive-thru beverage cup service of one embodiment.

Sedan at Drive-Thru Beverage Cup Service:

FIG. 15B shows for illustrative purposes only an example of sedan at drive-thru beverage cup service of one embodiment. FIG. 15B shows the pickup truck 1500 behind a sedan automobile 1520. A drive-thru intelligent beverage kiosk with walls removed for illustration purposes 1510 will show the internal modules that are configured to be adjusted in height with the front serving section of the kiosk. The drive-thru intelligent beverage kiosk includes dispenser height adjuster roll-up sections 1410 and dispenser height adjuster interior modules 1514. In this example the consumer driver in the sedan automobile 1520 is picking up a customized beverage cup on serving counter surface at medium adjusted height 1512 of one embodiment.

Figure 15C:
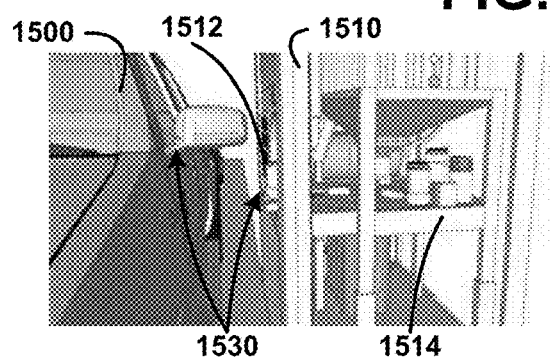
FIG. 15C shows for illustrative purposes only an example of pick-up truck at low drive-thru beverage cup service of one embodiment.

Pick-Up Truck at Low Drive-Thru Beverage Cup Service:

FIG. 15C shows for illustrative purposes only an example of pick-up truck at low drive-thru beverage cup service of one embodiment. FIG. 15C shows the pickup truck 1500 pulling up to pick-up a customized beverage cup on serving counter surface at medium adjusted height 1512. The drive-thru intelligent beverage kiosk with walls removed for illustration purposes 1510 shows dispenser height adjuster interior modules 1514. A first height difference from driver side window to beverage cup 1530 at the medium adjusted height poses an inconvenience to the driver consumer of one embodiment.

Figure 15D:
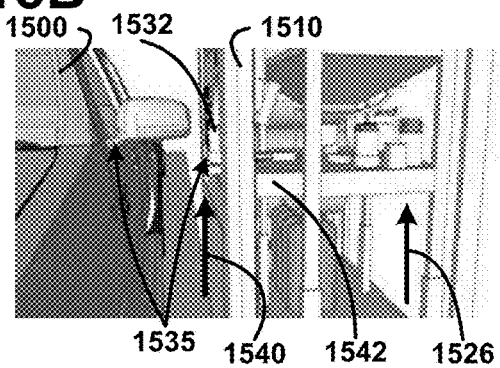
FIG. 15D shows for illustrative purposes only examples of dispenser height adjuster moved to a higher adjusted height of one embodiment.

Dispenser Height Adjuster Moved to a Higher Adjusted Height:

FIG. 15D shows for illustrative purposes only examples of dispenser height adjuster moved to a higher adjusted height of one embodiment. FIG. 15D shows the pickup truck 1500 picking up a customized beverage cup on serving counter surface at high adjusted height 1532 of the drive-thru intelligent beverage kiosk with walls removed for illustration purposes 1510. A third height difference from driver side window to beverage cup 1550 is minimized making it convenient for the driver consumer to retrieve the beverage cup. A customized beverage cup and serving counter surface moved to a higher adjusted height 1540 and dispenser height adjuster interior modules moved to a higher adjusted height 1526. The dispenser height adjuster interior modules at high adjusted height 1542 continue preparation processes for other customized beverage orders during the height adjustment movements of one embodiment.

Figure 15E:
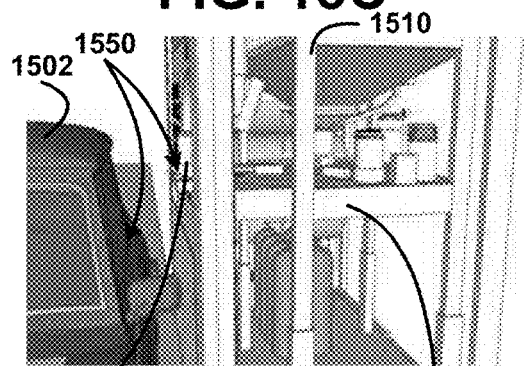
FIG. 15E shows for illustrative purposes only an example of subcompact car at high drive-thru service window of one embodiment.

Subcompact Car at High Drive-Thru Service Window:

FIG. 15E shows for illustrative purposes only an example of subcompact car at high drive-thru service window of one embodiment. FIG. 15E shows the subcompact car 1502 pulled up to pick-up the customized beverage cup on serving counter surface at high adjusted height 1532. A drive-thru intelligent beverage kiosk with walls removed for illustration purposes 1510 shows dispenser height adjuster interior modules at high adjusted height 1542. A fourth height difference from driver side window to beverage cup 1550 makes retrieval of the cup difficult for a driver consumer of one embodiment.

Figure 15F:
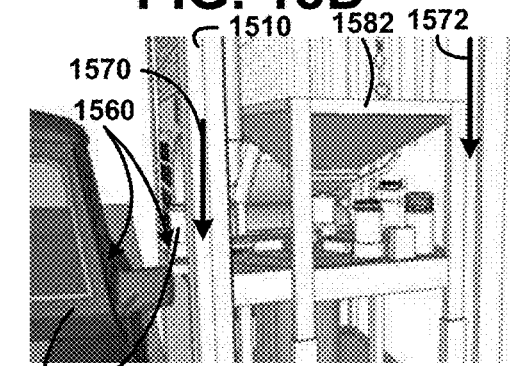
FIG. 15F shows for illustrative purposes only an example of dispenser height adjuster moved to a lower adjusted height of one embodiment.

Dispenser Height Adjuster Moved to a Lower Adjusted Height:

FIG. 15F shows for illustrative purposes only an example of dispenser height adjuster moved to a lower adjusted height of one embodiment. FIG. 15F shows the subcompact car 1502 pulled up to pick-up a customized beverage cup on serving counter surface at a low adjusted height 1580. The drive-thru intelligent beverage kiosk with walls removed for illustration purposes 1510 shows a serving counter surface moved to a lower adjusted height 1570 and interior modules moved to a lower adjusted height 1572. Dispenser height adjuster interior modules at a low adjusted height 1582 continue preparation processes for other customized beverage orders during the height adjustment movements. A fifth height difference from driver side window to beverage cup 1560 shows a more convenient reach for the driver consumer to retrieve the customized beverage cup on serving counter surface at a low adjusted height 1580 of one embodiment.

Figure 16A:
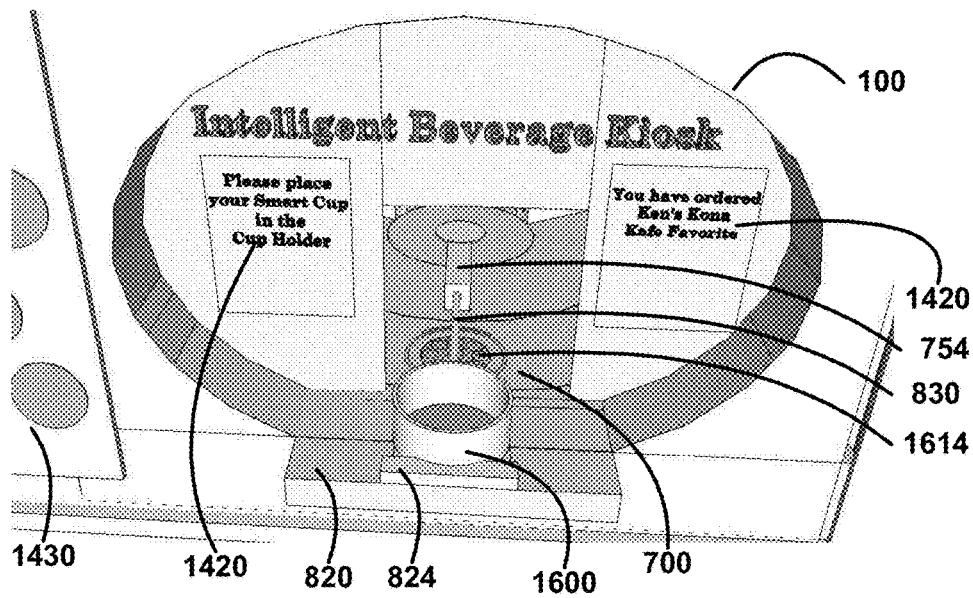
FIG. 16A shows for illustrative purposes only an example of intelligent beverage kiosk ready for member smart cup placement of one embodiment.

Intelligent Beverage Kiosk Ready for Member Smart Cup Placement:

FIG. 16A shows for illustrative purposes only an example of intelligent beverage kiosk ready for member smart cup placement of one embodiment. FIG. 16A shows the intelligent beverage kiosk 100 with a beverage cup holder extended onto serving counter surface 1600 against the cup holder stop 824. Also shown are the serving counter surface 820, actuator rod extended 830, beverage cup conveyor 700, beverage cup conveyor energy induction coils and circuits 1614, beverage cup holder actuator 754 and the user customized beverage ingredients, ingredient portions, temperature and volume touch screen selector 1430. In this example two customer message displays 1420 display a first request to the member "Please place your Smart Cup in the Cup Holder" and a second order confirmation "You have ordered Ken's Kona Kafe Favorite", a customized beverage blend named by the member of one embodiment.

Recording a member customized beverage blend identified by a member chosen name makes it easier for the member to recognize the customized beverage blend without having to recall at the moment specifics of the portioned amounts of the individual ingredients. The intelligent beverage kiosk website database 110 of FIG. 1 automatically adds to the member pre-selected beverage data a member assigned member customized beverage blend name with the unique member number 126 of FIG. 1 appended suffix of one embodiment.

The named member customized beverage blend also provides a simple method for a member to share their customized beverage blend with friends and family. The member may assign names of friends and family to a list of authorized users to access the downloadable pre-selected beverage data 124 of FIG. 1 for a specific member assigned member customized beverage blend suffixed name. The unique member number suffix is not displayed to protect the security of the member profile account 120 of FIG. 1. Adding the unique member number suffix to a blend name aids in identifying a specific customized beverage blend since names alone may be duplicated. In one embodiment for example a celebrity may elect to endorse the intelligent beverage kiosk apparatus and system and provide universal access to a specific customized beverage blend of their selection. In this example the celebrity member customized downloadable pre-selected beverage data suffixed name may be assigned a universal access designator. The universal access designator would allow any member to order from a selection of celebrity endorsed customized blends. The intelligent beverage kiosk website database 110 of FIG. 1 may track those orders and tally the number of orders periodically for each endorsed universal access blends. The tally for a specific celebrity endorsed universal access blend may be used to pay an advertising premium to the endorsing celebrity. The beverage price processor 130 may be used to add an additional price surcharge for each endorsed universal access blend order. The advertising premium paid to the endorsing celebrity may be tiered for example by increases in the amount of advertising premium paid based on monthly tally stepped volumes and the additional price surcharge adjusted automatically in a corresponding manner. Both individual member friends and family accessible customized blends and celebrity endorsed universal access blends may be shared with authorized access users for example by access to a selection screen on the intelligent beverage kiosk website database 110 of FIG. 1, member emails with an access link and posting on other social media outlets of one embodiment.

Figure 16B:
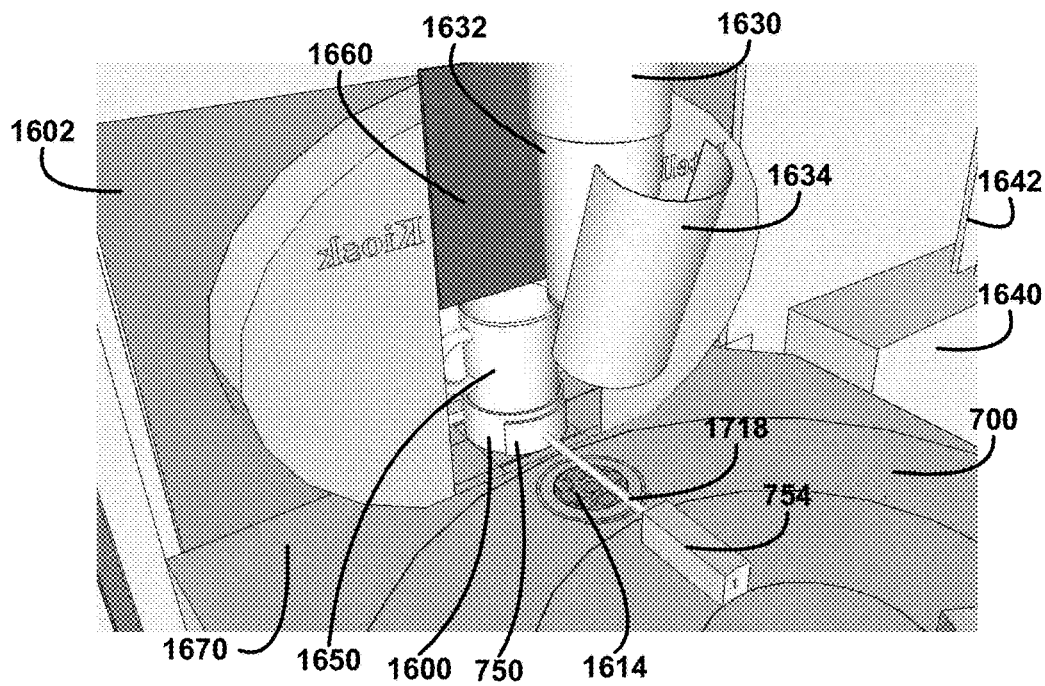
FIG. 16B shows for illustrative purposes only an example of member smart cup placed in cup holder interior view of one embodiment.

Member Smart Cup Placed in Cup Holder Interior View:

FIG. 16B shows for illustrative purposes only an example of member smart cup placed in cup holder interior view of one embodiment. FIG. 16B shows the intelligent beverage kiosk with walls removed for illustration purposes 1602 to show internal views. FIG. 16B shows the beverage cup holder extended onto serving counter surface 1600, beverage cup holder coupling 750, actuator rod extended 830, beverage cup holder actuator 754 and a member placed member smart beverage cup in beverage cup holder 1650. A conveyor adjustable platform module 1670 includes a plurality of beverage cup conveyor energy induction coils and circuits 1614, the beverage cup conveyor 700, a beverage cup conveyor rotating hub 1620, a beverage cup dispenser 1630, a dispensable beverage cup 1632, and a beverage cup dispenser guide 1634. A kiosk serving door opened 1660 is showing the access to the serving counter surface 1600. A kiosk processing panel 1640 and kiosk processing panel ribbon cable 1642 control processing functions in the intelligent beverage kiosk 100 of FIG. 1 of one embodiment.

Figure 17A:
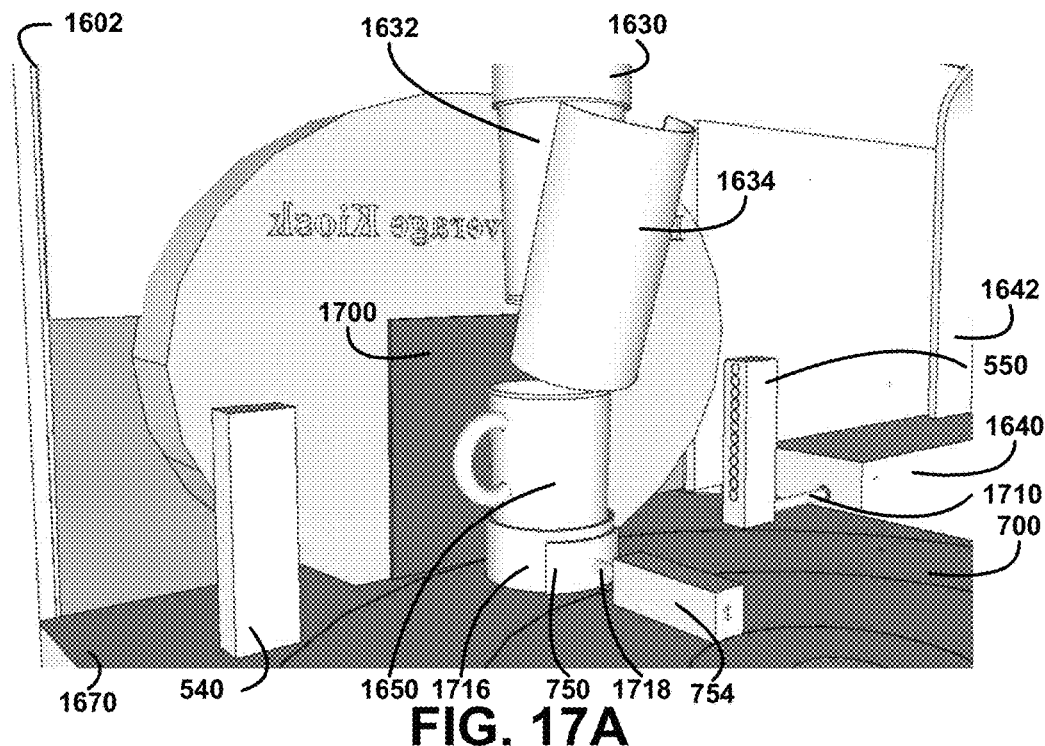
FIG. 17A shows for illustrative purposes only an example of member smart cup retracted onto conveyor of one embodiment.

Member Smart Cup Retracted onto Conveyor:

FIG. 17A shows for illustrative purposes only an example of member smart cup retracted onto conveyor of one embodiment. FIG. 17A shows the intelligent beverage kiosk with walls removed for illustration purposes 1602. FIG. 17A shows the member placed member smart beverage cup in beverage cup holder 1650 having been retracted inside the intelligent beverage kiosk 100 of FIG. 1. The beverage cup holder actuator 754 has operated to move the beverage cup holder coupling 750 with an actuator rod retracted 1718. Also shown are the beverage cup dispenser 1630, dispensable beverage cup 1632 and beverage cup dispenser guide 1634. The kiosk processing panel 1640 has transmitted process instructions through the kiosk processing panel ribbon cable 1642 including for example to make a kiosk serving door closed 1700, move the beverage cup conveyor 700 to a beverage cup holder at indexed position 1716 of one embodiment.

The kiosk processing panel 1640 has transmitted process instructions through The kiosk processing panel 1640 has transmitted process instructions to activate the beverage cup detector apparatus signal transmitter 540 and beverage cup detector apparatus signal receiver 550 to determine the size of the beverage cup of one embodiment.

Figure 17B:
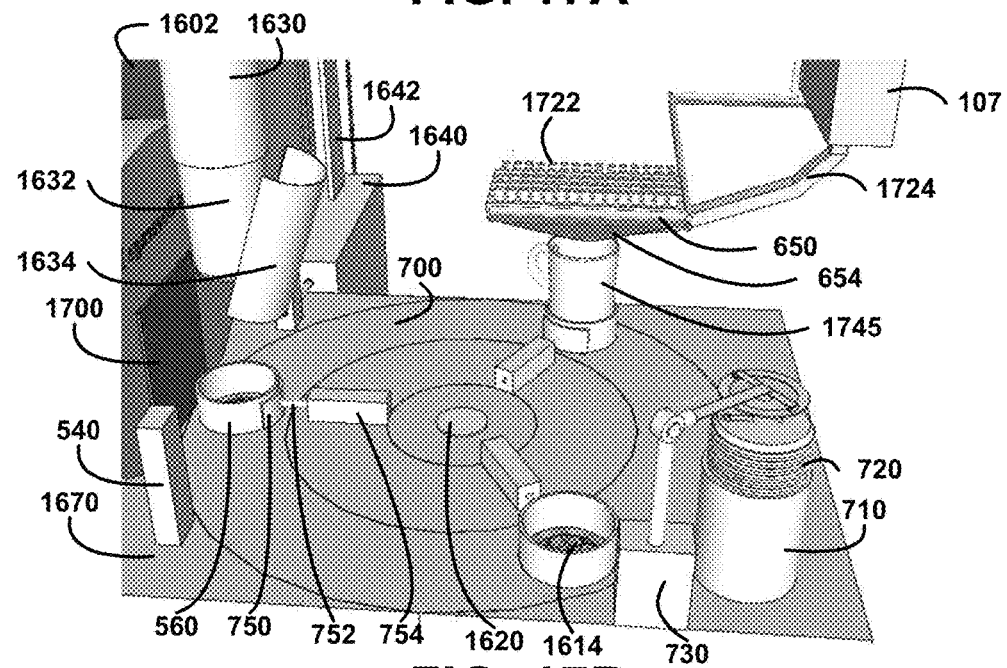
FIG. 17B shows for illustrative purposes only an example of member smart cup positioned at fill station of one embodiment.

Member Smart Cup Positioned at Fill Station:

FIG. 17B shows for illustrative purposes only an example of member smart cup positioned at fill station of one embodiment. FIG. 17B shows the intelligent beverage kiosk with walls removed for illustration purposes 1602. FIG. 17B also shows the beverage cup dispenser 1630, dispensable beverage cup 1632, beverage cup dispenser guide 1634, kiosk processing panel 1640, kiosk processing panel ribbon cable 1642, beverage cup holder coupling 750, beverage cup holder actuator 754, actuator rod 752, beverage cup detector apparatus signal transmitter 540, beverage cup conveyor rotating hub 1620, kiosk serving door closed 1700, beverage cup lid dispenser 710, beverage cup lid 720, and filled cup lid cover applicator 730.

The beverage cup conveyor energy induction coils and circuits 1614 are shown and continue inducing an electrical current to recharge the rechargeable flat batteries 1172 of FIG. 11C during the processing time in the beverage cup holder 560. The beverage cup conveyor 700 has rotated the member placed member smart beverage cup in beverage cup holder 1650 of FIG. 16B to move a beverage cup at fill station position 1745. The conveyor adjustable platform module 1670 has coupled to it the dispenser height adjuster interior modules 1514 of FIG. 15B. FIG. 17B shows the ice maker and dispenser 107, ice fill chute 1724, flavor portion pipe and valves 1722, flavor collection chamber 650 and the cup fill funnel 654. FIG. 17B does not show other dispenser height adjuster interior modules 1514 of FIG. 15B for illustrative clarity of one embodiment.

Figure 17C:
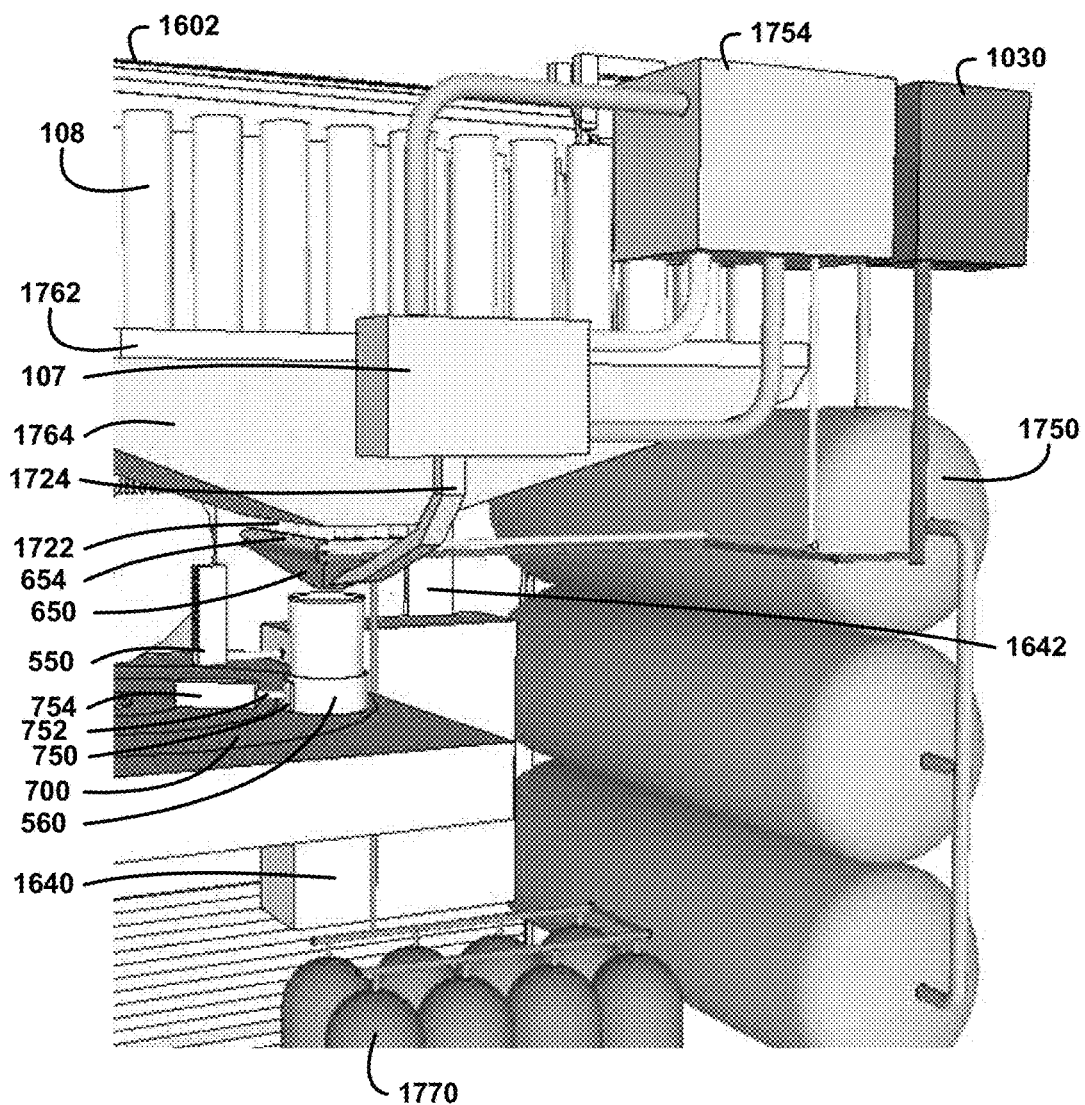
FIG. 17C shows for illustrative purposes only an example of fill cup station modules of one embodiment.

Fill Cup Station Modules:

FIG. 17C shows for illustrative purposes only an example of fill cup station modules of one embodiment. FIG. 17C shows the intelligent beverage kiosk with walls removed for illustration purposes 1602. FIG. 17C shows the kiosk processing panel 1640, kiosk processing panel ribbon cable 1642, carbonated water tanks 1770, beverage cup holder coupling 750, beverage cup holder actuator 754, actuator rod 752, beverage cup holder 560, beverage cup conveyor 700, beverage cup detector apparatus signal receiver 550, flavor portion pipe and valves 1722, flavor collection chamber 650, cup fill funnel 654, ice fill chute 1724, flavor container piping cabinet 1764, ice maker and dispenser 107, beverage supply containers 108, filtered water tank 1750, flavor container platform 1762, electric flash water heater 1030, and cold water chiller 1754. The controlled temperature water dispenser 162 is not shown of one embodiment.

Figure 18:
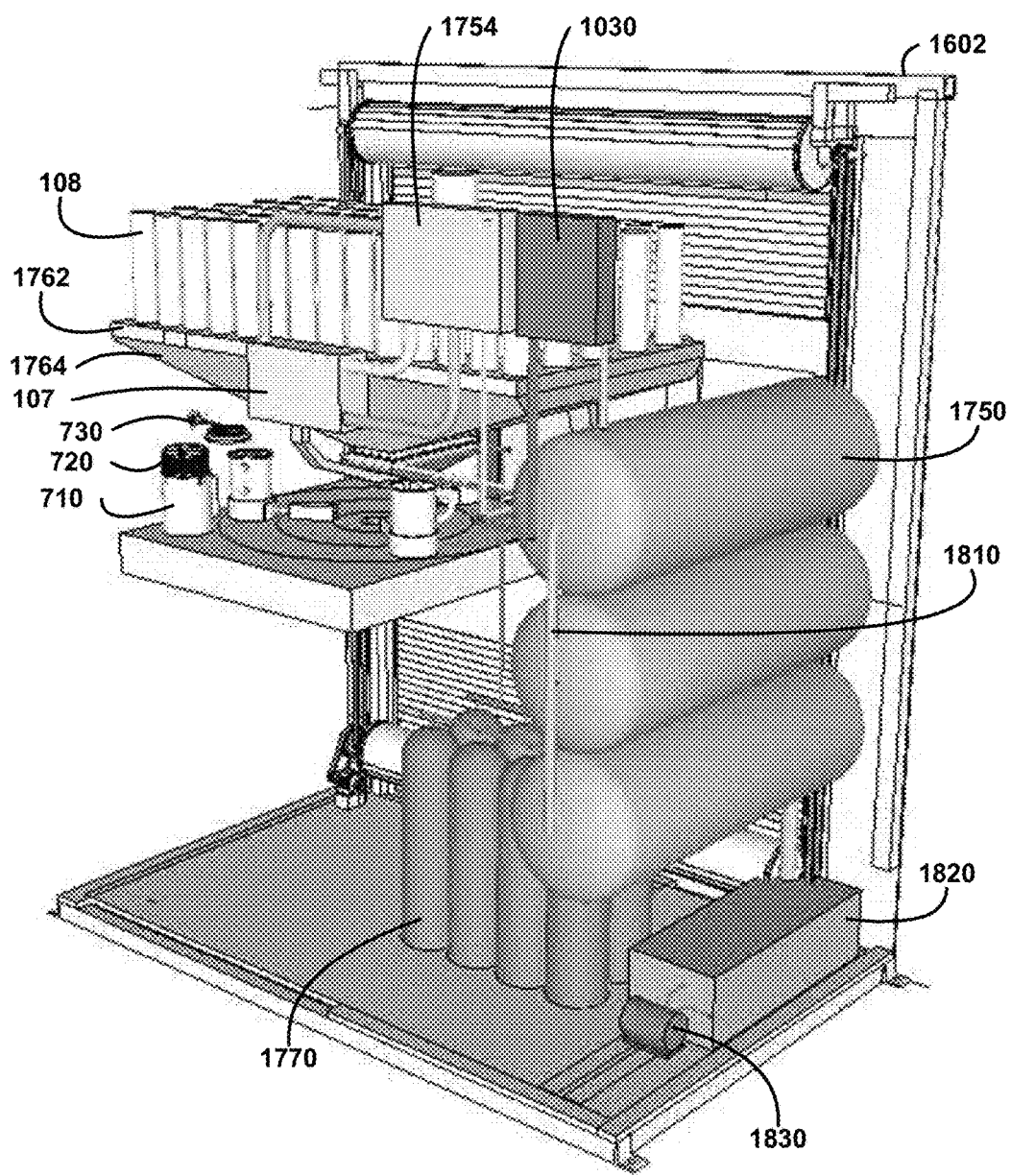
FIG. 18 shows for illustrative purposes only an example of kiosk modules interior view of one embodiment.

Kiosk Modules Interior View:

FIG. 18 shows for illustrative purposes only an example of kiosk modules interior view of one embodiment. FIG. 18 shows the intelligent beverage kiosk with walls removed for illustration purposes 1602. Also shown is the electric flash water heater 1030, cold water chiller 1754, flavor container platform 1762, beverage supply containers 108, flavor container piping cabinet 1764, ice maker and dispenser 107, beverage cup lid dispenser 710, beverage cup lid 720, filled cup lid cover applicator 730, carbonated water tanks 1770, filtered water tank 1750, filtered water tank interconnection piping 1810, filtered treatment filtration water system 1820, and filtered water pump 1830 of one embodiment.

Figure 19A:
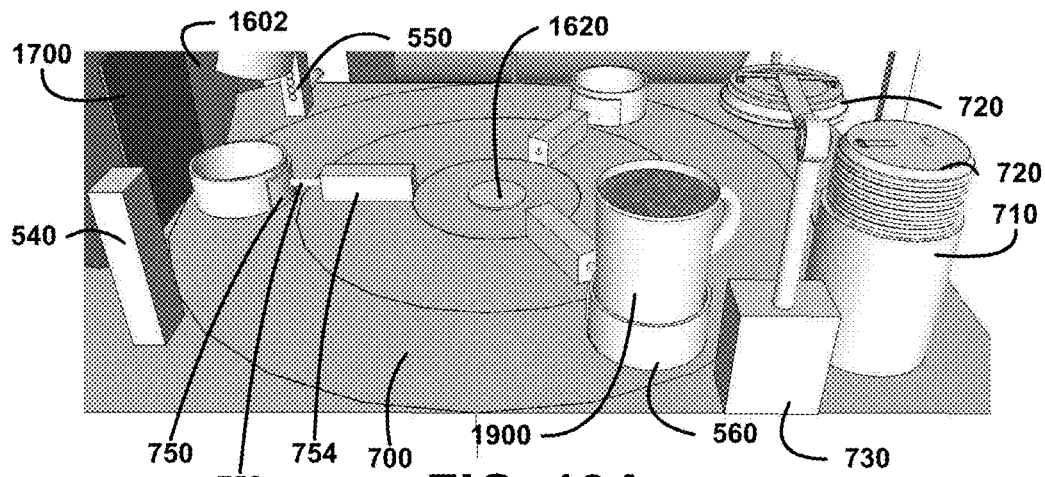
FIG. 19A shows for illustrative purposes only an example of filled member smart beverage cup at lid station of one embodiment.

Filled Member Smart Beverage Cup at Lid Station:

FIG. 19A shows for illustrative purposes only an example of filled member smart beverage cup at lid station of one embodiment. FIG. 19A shows the intelligent beverage kiosk with walls removed for illustration purposes 1602. Also shown is the kiosk serving door closed 1700, beverage cup detector apparatus signal transmitter 540, beverage cup holder coupling 750, beverage cup holder actuator 754, actuator rod 752, beverage cup detector apparatus signal receiver 550, beverage cup conveyor rotating hub 1620, beverage cup lid dispenser 710, beverage cup lid 720, and beverage cup holder 560. The beverage cup conveyor 700 has rotated a filled beverage cup 1900 to a lid station position. The filled cup lid cover applicator 730 is shown picking up lid and moving to filled beverage cup of one embodiment.

Figure 19B:
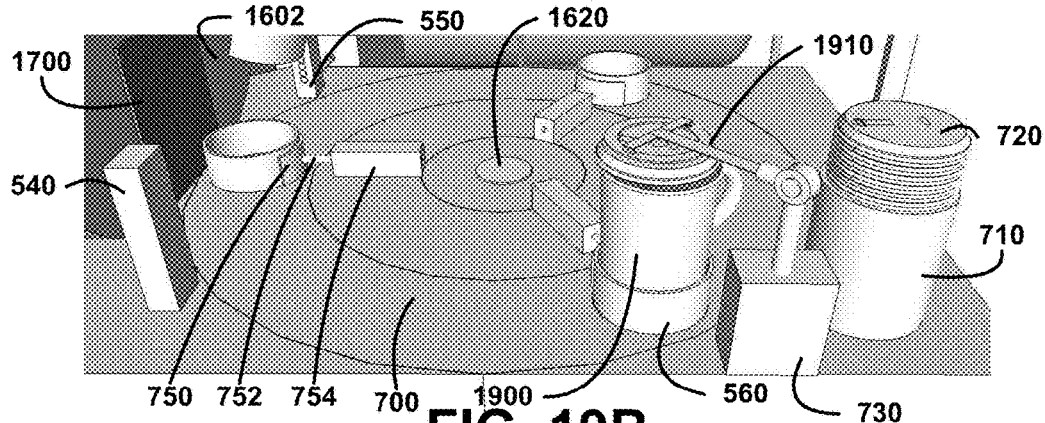
FIG. 19B shows for illustrative purposes only an example of cup lid positioned over cup of one embodiment.

Cup Lid Positioned Over Cup:

FIG. 19B shows for illustrative purposes only an example of cup lid positioned over cup of one embodiment. FIG. 19B shows the intelligent beverage kiosk with walls removed for illustration purposes 1602. kiosk serving door closed 1700, beverage cup detector apparatus signal transmitter 540, beverage cup holder coupling 750, beverage cup holder actuator 754, actuator rod 752, beverage cup detector apparatus signal receiver 550, beverage cup conveyor 700, beverage cup conveyor rotating hub 1620, beverage cup lid dispenser 710, beverage cup lid 720, beverage cup holder 560, and filled beverage cup 1900. The processing shows a filled cup lid cover applicator lowering lid to filled beverage cup 1910 of one embodiment.

Figure 19C:
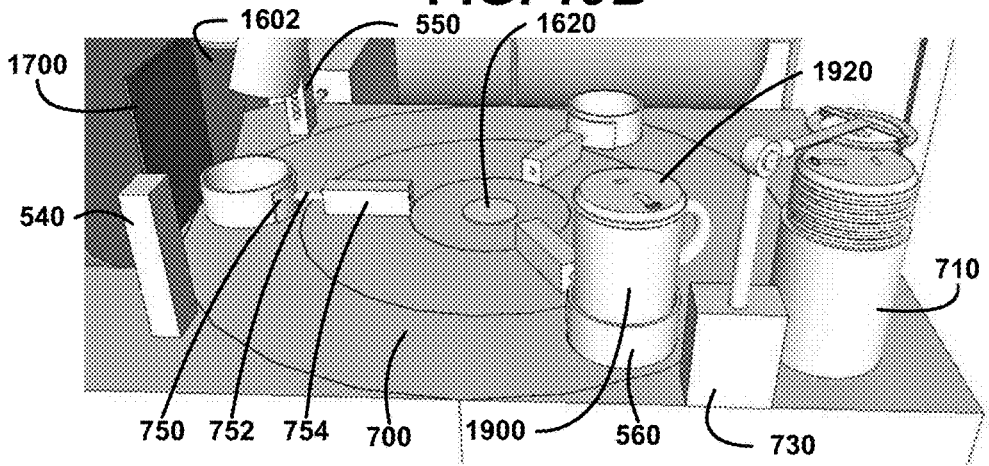
FIG. 19C shows for illustrative purposes only an example of lid snapped onto member smart beverage cup of one embodiment.

Lid Snapped onto Member Smart Beverage Cup:

FIG. 19C shows for illustrative purposes only an example of lid snapped onto member smart beverage cup of one embodiment. FIG. 19C shows the intelligent beverage kiosk with walls removed for illustration purposes 1602. Also shown is the kiosk serving door closed 1700, beverage cup detector apparatus signal transmitter 540, beverage cup holder coupling 750, beverage cup holder actuator 754, actuator rod 752, beverage cup detector apparatus signal receiver 550, beverage cup conveyor 700, beverage cup conveyor rotating hub 1620, beverage cup lid dispenser 710, beverage cup lid 720, beverage cup holder 560, and filled beverage cup 1900. A lid snapped on filled beverage cup 1920 covers the beverage cup of one embodiment.

Figure 20A:
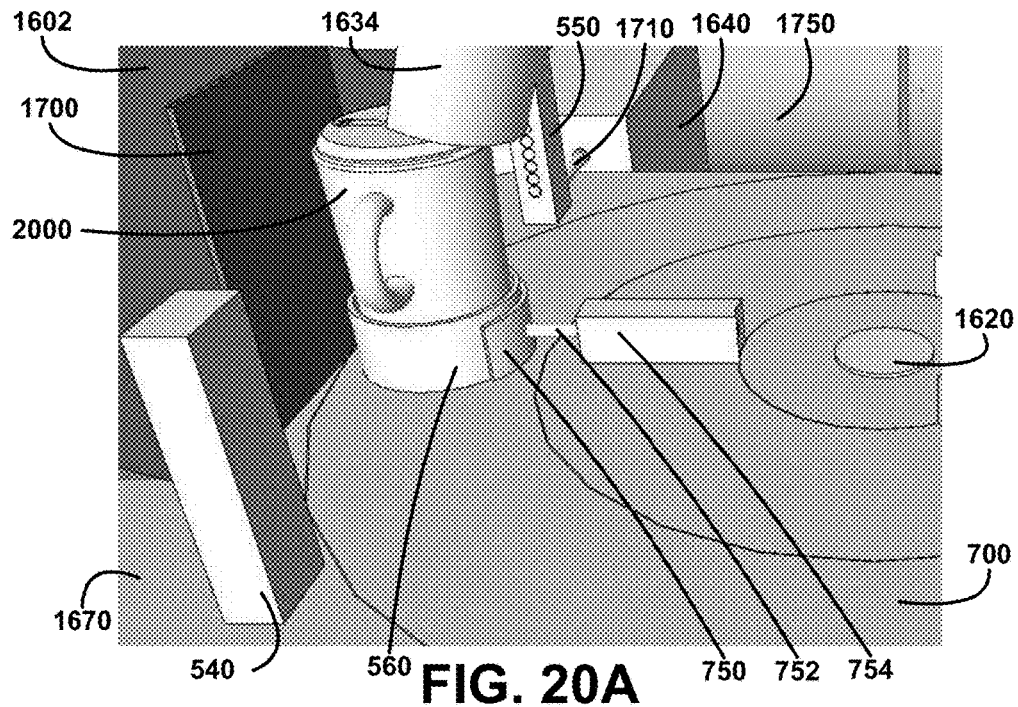
FIG. 20A shows for illustrative purposes only an example of filled member smart beverage cup positioned for servicing of one embodiment.

Filled Member Smart Beverage Cup Positioned for Servicing:

FIG. 20A shows for illustrative purposes only an example of filled member smart beverage cup positioned for servicing of one embodiment. FIG. 20A shows the intelligent beverage kiosk with walls removed for illustration purposes 1602. Also shown is the kiosk serving door closed 1700, beverage cup detector apparatus signal transmitter 540, beverage cup detector apparatus signal receiver 550, conveyor adjustable platform module 1670, beverage cup holder 560, beverage cup holder coupling 750, beverage cup holder actuator 754, actuator rod 752, beverage cup conveyor 700, beverage cup conveyor rotating hub 1620, filtered water tank 1750, kiosk processing panel 1640, beverage cup detector apparatus signal receiver coupling cables 1710, and beverage cup dispenser guide 1634. A filled beverage cup with lid secured at the indexed position 2000 ready for serving of one embodiment.

Figure 20B:
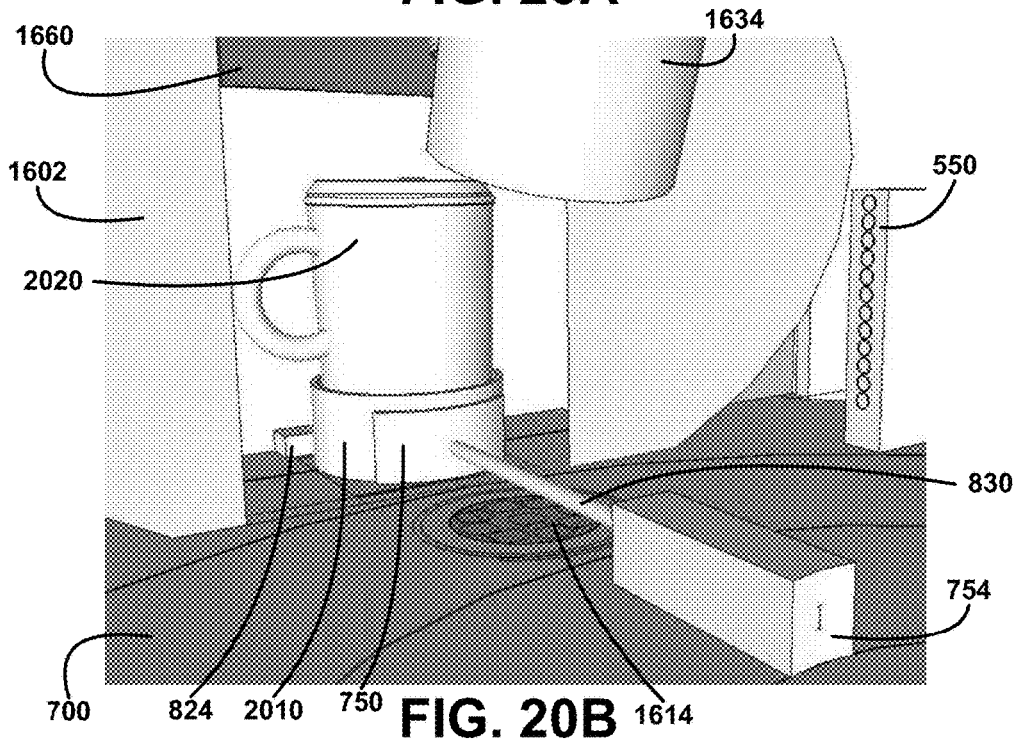
FIG. 20B shows for illustrative purposes only an example of filled member smart beverage cup extended to serve of one embodiment.

Filled Member Smart Beverage Cup Extended to Serve:

FIG. 20B shows for illustrative purposes only an example of filled member smart beverage cup extended to serve of one embodiment. FIG. 20B shows the intelligent beverage kiosk with walls removed for illustration purposes 1602. Also shown is the beverage cup conveyor 700, beverage cup holder coupling 750, beverage cup conveyor energy induction coils and circuits 1614, beverage cup holder actuator 754, actuator rod extended 830, beverage cup detector apparatus signal receiver 550, beverage cup dispenser guide 1634, cup holder stop 824, and the kiosk serving door opened 1660. A cup holder with filled beverage cup and lid moved to serving counter surface 2010. The member is able to pick-up a filled beverage cup with snapped lid 2020 of one embodiment.

Figure 21A:
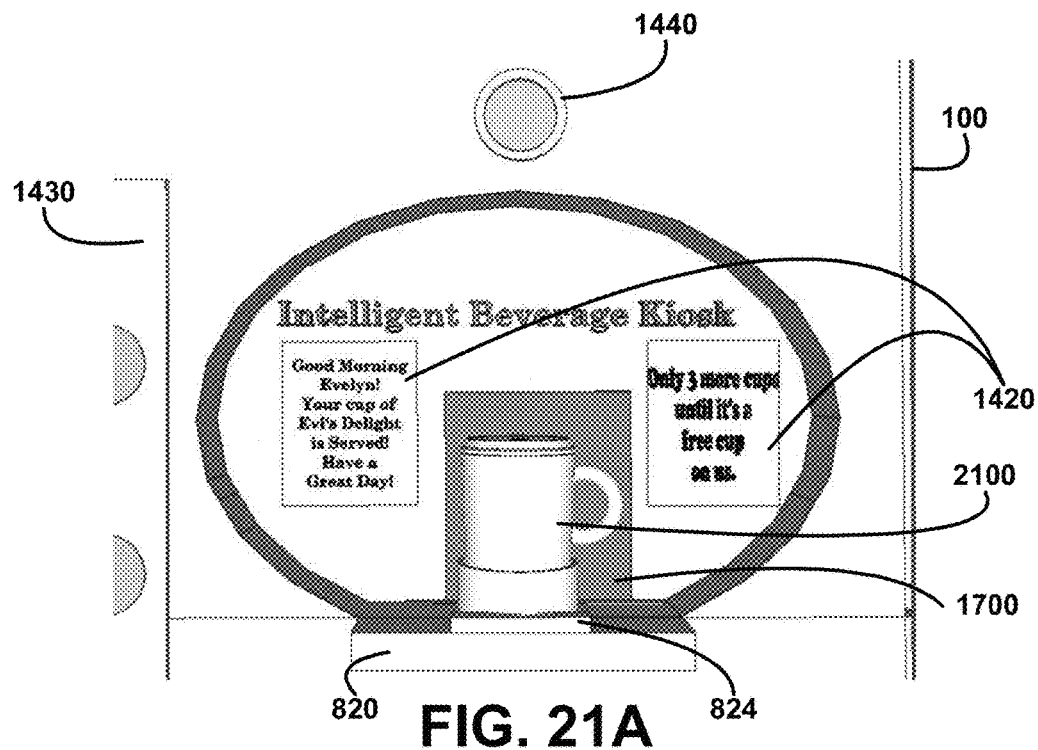
FIG. 21A shows for illustrative purposes only an example of filled member smart beverage cup served of one embodiment.

Filled Member Smart Beverage Cup Served:

FIG. 21A shows for illustrative purposes only an example of filled member smart beverage cup served of one embodiment. FIG. 21A shows the intelligent beverage kiosk 100 with a filled beverage cup with snapped lid ready for member pick-up 2100. Also shown is the kiosk serving door closed 1700, customer message displays 1420, user customized beverage ingredients, ingredient portions, temperature and volume touch screen selector 1430, security camera 1440, cup holder stop 824, and serving counter surface 820 of one embodiment.

Figure 21B:
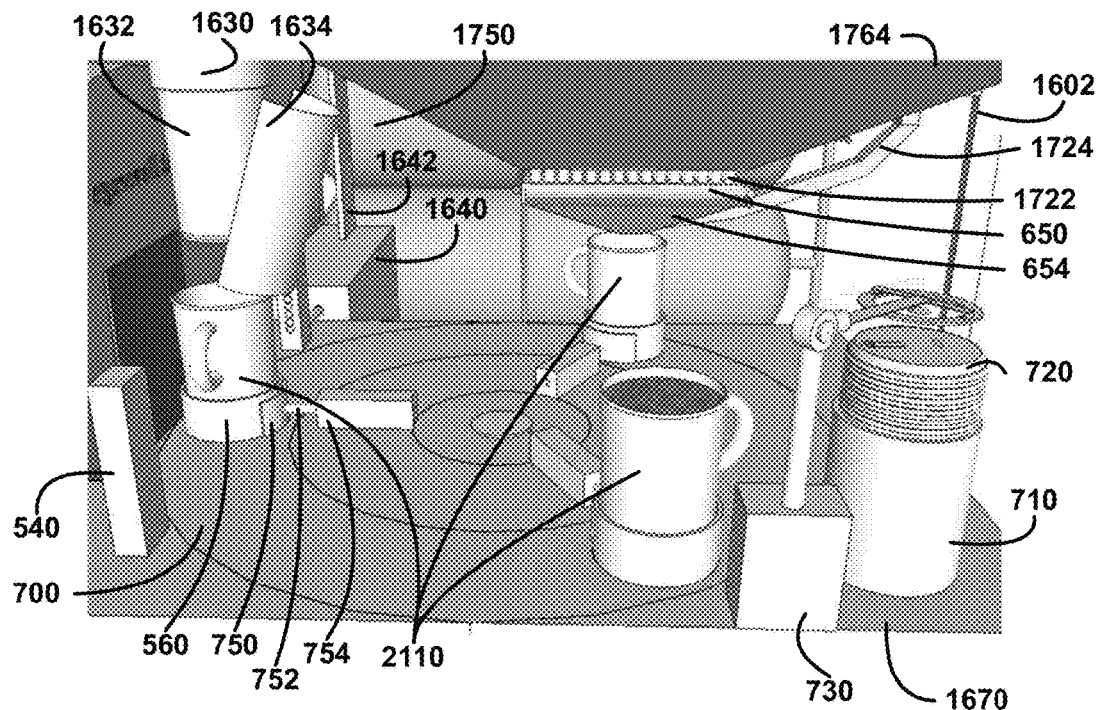
FIG. 21B shows for illustrative purposes only an example of 3 beverage cups being prepared simultaneously of one embodiment.

3 Beverage Cups being Prepared Simultaneously:

FIG. 21B shows for illustrative purposes only an example of 3 beverage cups being prepared simultaneously of one embodiment. FIG. 21B shows the intelligent beverage kiosk with walls removed for illustration purposes 1602. Also shown is the flavor container piping cabinet 1764, filtered water tank 1750, beverage cup dispenser 1630, dispensible beverage cup 1632, beverage cup dispenser guide 1634, kiosk processing panel 1640, kiosk processing panel ribbon cable 1642, beverage cup detector apparatus signal transmitter 540, beverage cup conveyor 700, beverage cup holder 560, beverage cup holder coupling 750, beverage cup holder actuator 754, actuator rod 752, ice fill chute 1724, flavor portion pipe and valves 1722, flavor collection chamber 650, cup fill funnel 654, beverage cup lid dispenser 710, beverage cup lid 720, filled cup lid cover applicator 730, and conveyor adjustable platform module 1670.

The beverage cup conveyor 700 is shown in one embodiment with 3 beverage cup holder 560 positions. FIG. 21B shows 3 beverage cups being prepared simultaneously 2110. In another embodiment the beverage cup conveyor 700 a different number of beverage cup holder 560 positions including a number greater than 3 and additional fill stations to prepare more than one beverage simultaneously.

Figure 22:
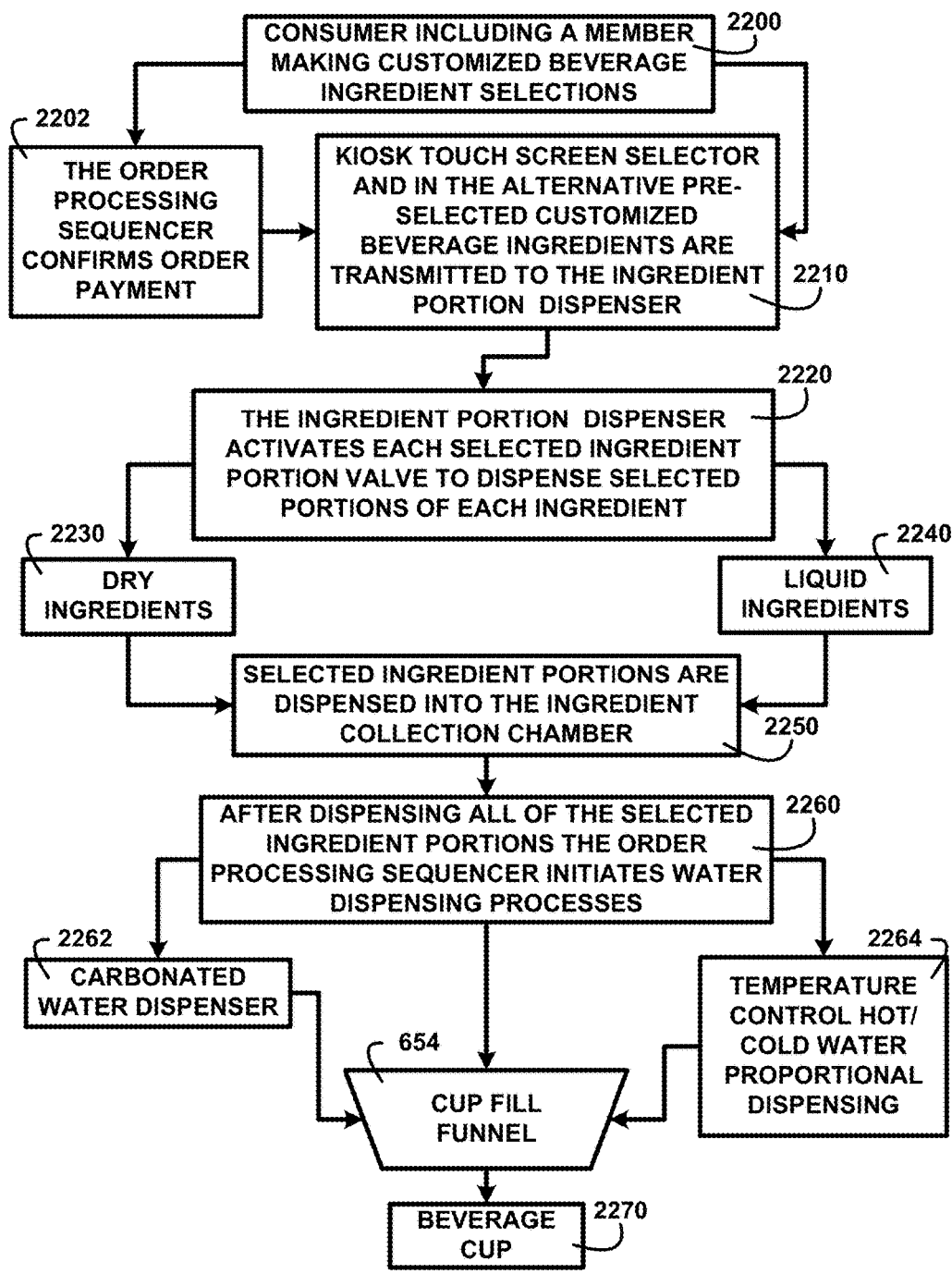
FIG. 22 shows a block diagram of an overview of customized beverage preparation for filling of one embodiment.

Customized Beverage Preparation for Filling:

FIG. 22 shows a block diagram of an overview of customized beverage preparation for filling of one embodiment. FIG. 22 shows a consumer including a member making customized beverage ingredient selections 2200. An order processing sequencer confirms order payment 2202. A kiosk touch screen selector and in the alternative pre-selected customized beverage ingredients are transmitted to the ingredient portion dispenser 2210. An ingredient portion dispenser activates each selected ingredient portion valve to dispense selected portions of each ingredient 2220. Selected portions of each ingredient may include dry ingredients 2230 and liquid ingredients 2240. Selected ingredient portions are dispensed into the ingredient collection chamber 2250.

After dispensing all of the selected ingredient portions the order processing sequencer initiates water dispensing processes 2260 including carbonated water dispenser 163 processes and in the alternative temperature control hot/cold water proportional dispensing 2264 processes. The controlled temperature water dispenser 162 dispenses portions of hot and cold water to blend temperature to approximate a selected beverage temperature. The water processes mix the selected ingredients and dispense the blended mixture through the cup fill funnel 654 into a beverage cup 602 of one embodiment.

Figure 23:
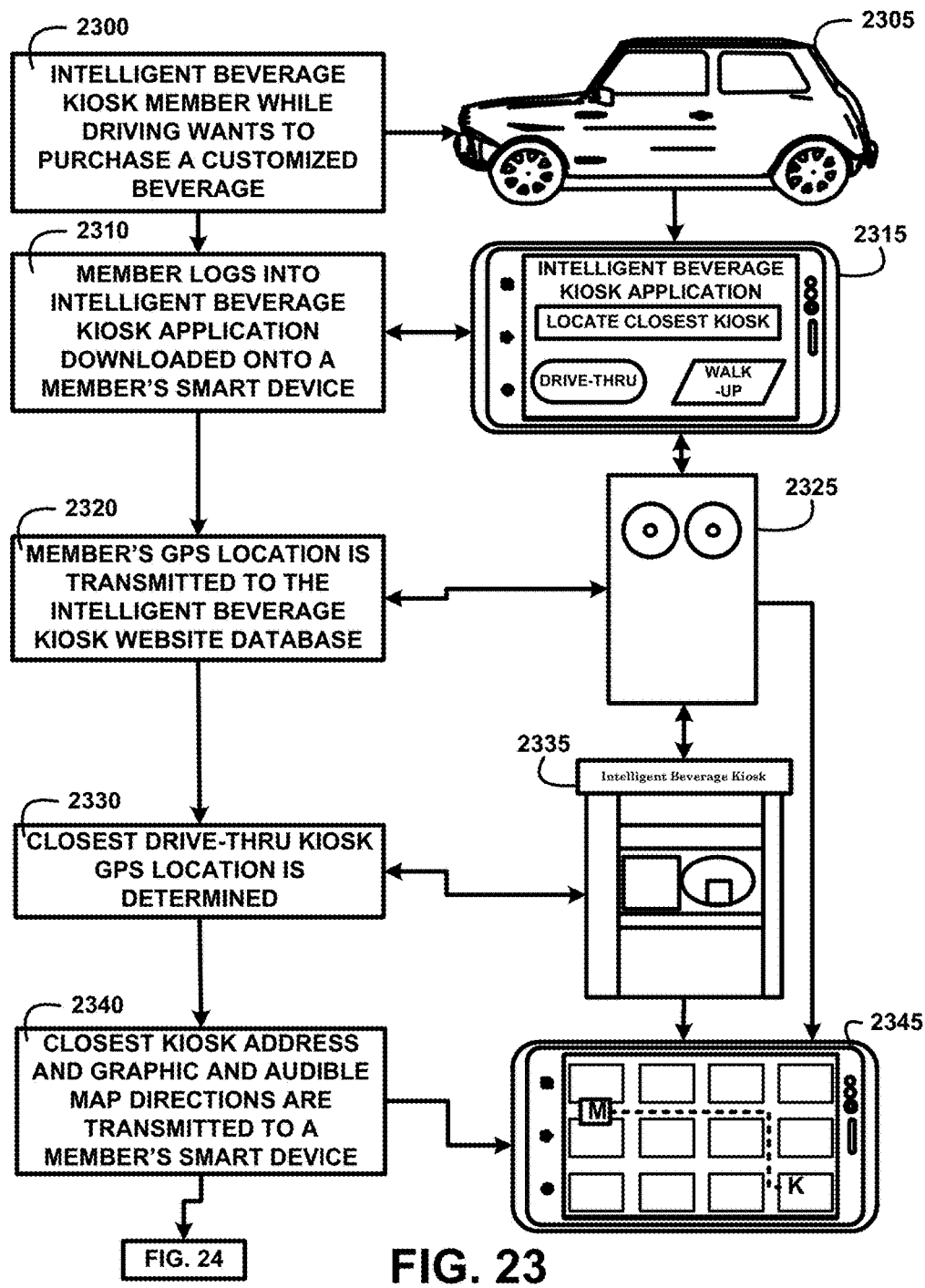
FIG. 23 shows for illustrative purposes only an example of intelligent beverage kiosk application of one embodiment.

Intelligent Beverage Kiosk Application:

FIG. 23 shows for illustrative purposes only an example of intelligent beverage kiosk application of one embodiment. FIG. 23 shows where an intelligent beverage kiosk member while driving wants to purchase a customized beverage 2300. A member driving in a vehicle 2305 when a member logs into intelligent beverage kiosk application downloaded onto a member's smart device 2310. The member intelligent beverage kiosk application queries the database to locate closest kiosk and a member selects drive-thru or walk-up 2315. A member's GPS location is transmitted to the intelligent beverage kiosk website database 2320.

An intelligent beverage kiosk website database calculates the distance from member's GPS location to a closest kiosk GPS coordinates 2325. A closest drive-thru kiosk GPS location is determined 2330. Closest kiosk location data is retrieved 2335 and a closest kiosk address and graphic and audible map directions are transmitted to a member's smart device 2340. An intelligent beverage kiosk application displays driving directions on member's smart device 2345. An intelligent beverage kiosk application can be configured to create audible selections, kiosk address and driving instructions, customized beverage blend selections, payment method selections and ordering selections and respond to a member's voice responses to enable the member to drive in a hands free communication environment of one embodiment. The process continues as described in FIG. 24

Figure 24:
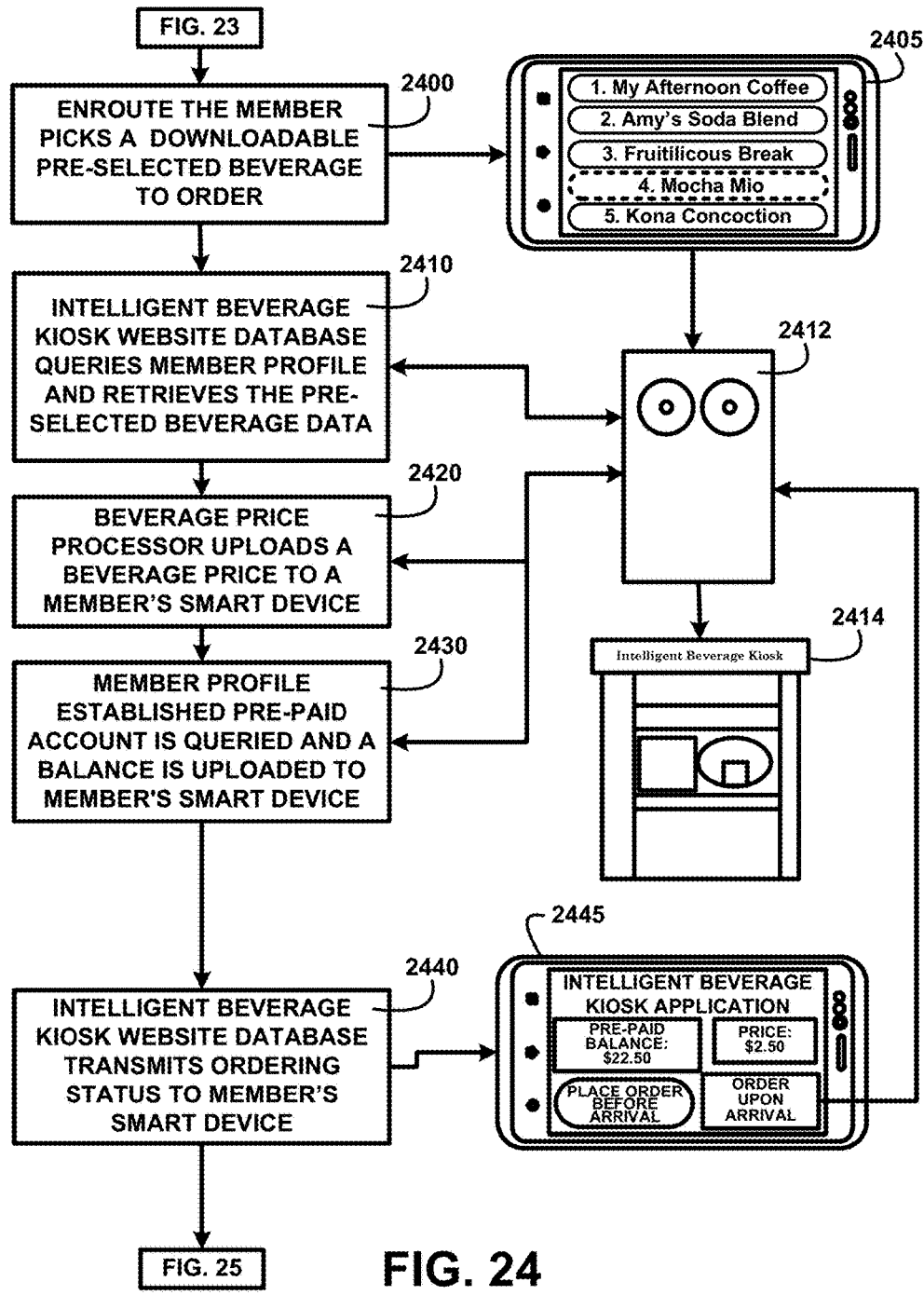
FIG. 24 shows for illustrative purposes only an example of intelligent beverage kiosk application beverage ordering of one embodiment.

Intelligent Beverage Kiosk Application Beverage Ordering:

FIG. 24 shows for illustrative purposes only an example of intelligent beverage kiosk application beverage ordering of one embodiment. FIG. 24 shows continuing from FIG. 23 where en route the member picks a downloadable pre-selected beverage to order 2400. A member's pre-selected beverage selection is transmitted from member's smart device to the intelligent beverage kiosk website database 2405. An intelligent beverage kiosk website database queries member profile and retrieves the pre-selected beverage data 2410 of one embodiment.

The intelligent beverage kiosk website database downloads the pre-selected beverage data to the closest kiosk selected by the member 2412. The closest kiosk 2414 will await an ordering selection from the member before placing the order in the queue. A beverage price processor uploads a beverage price to a member's smart device 2420. A member profile established pre-paid account is queried and a balance is uploaded to member's smart device 2430. The beverage price and pre-paid account balance is displayed on the member's smart device. An intelligent beverage kiosk website database transmits ordering status to member's smart device 2440. An intelligent beverage kiosk application displays ordering status to member's smart device including price, pre-paid balance, and whether the member wants to place order before arrival or order upon arrival 2445 of one embodiment. A continuation of processing is described in FIG. 25.

Figure 25:
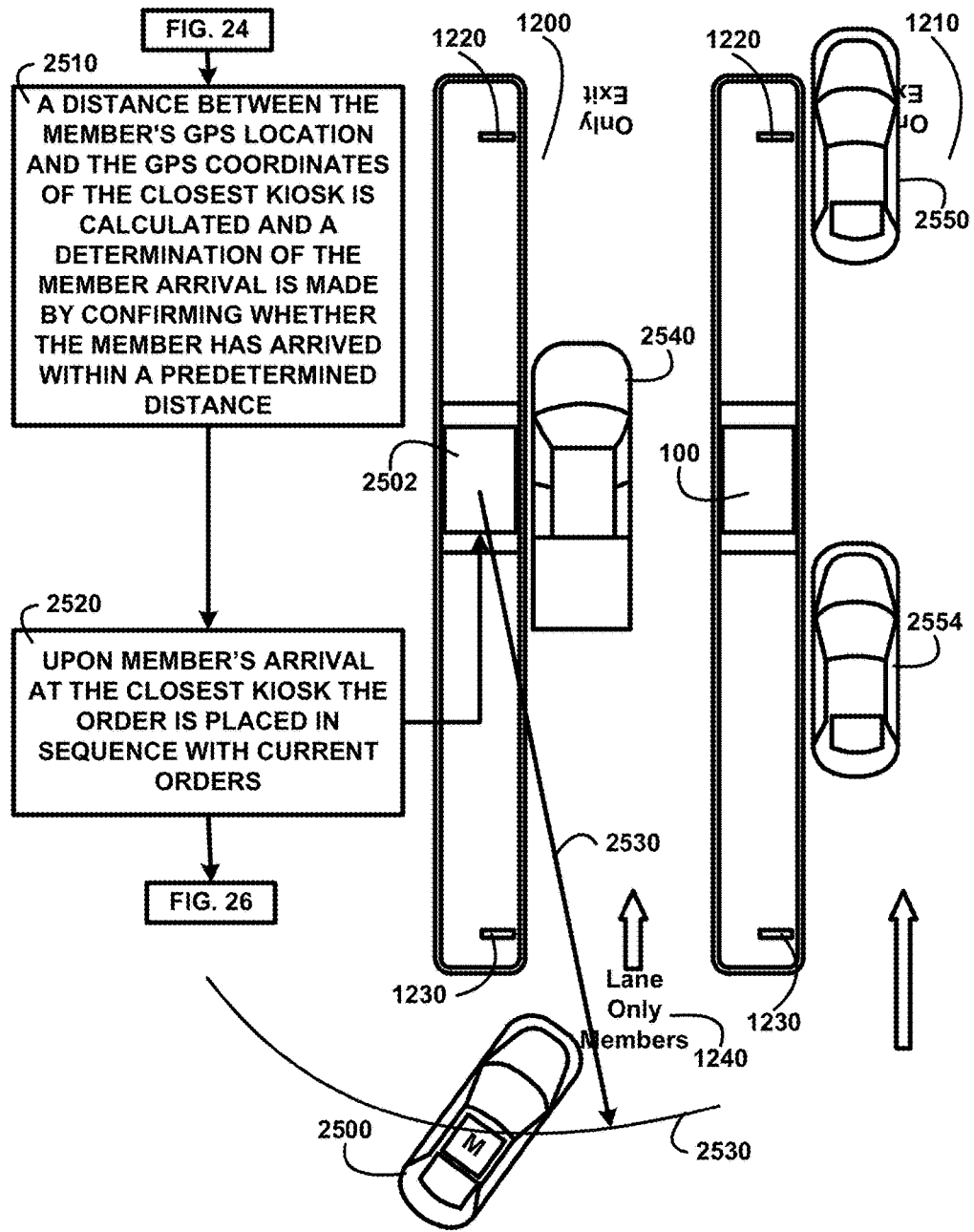
FIG. 25 shows for illustrative purposes only an example of member application drive-thru ordering of one embodiment.

Member Application Drive-Thru Ordering:

FIG. 25 shows for illustrative purposes only an example of member application drive-thru ordering of one embodiment. FIG. 25 shows a continuation from FIG. 24 wherein a distance between the member's GPS location and the GPS coordinates of the closest kiosk is calculated and a determination of the member arrival is made by confirming whether the member has arrived within a predetermined distance 2510. Upon member's arrival at the closest kiosk the order is placed in sequence with current orders 2520. A member's GPS location determines when member has arrived and is within a predetermined distance 2500. A predetermined distance 2530 can be for example a distance from the closest drive-thru kiosk 2502 to the corresponding entrance to the members only lane.

In one embodiment a member orders upon arrival and the order is transmitted to closest drive-thru kiosk 2500. FIG. 25 also shows an intelligent beverage kiosk 100, members only lane 1240, lane entrance sign and WIFI module 1230, exit only sign and WIFI module 1220, kiosk member drive thru access 1200, kiosk non-member drive thru access 1210, another member vehicle picking up served beverage cup 2540, non-member vehicle exiting drive-thru and order pick-up signal being recorded 2550 and a non-member driving up to order using kiosk touch screen selector 2554 of one embodiment. A description of the continuing processes is shown in FIG. 26.

Figure 26:
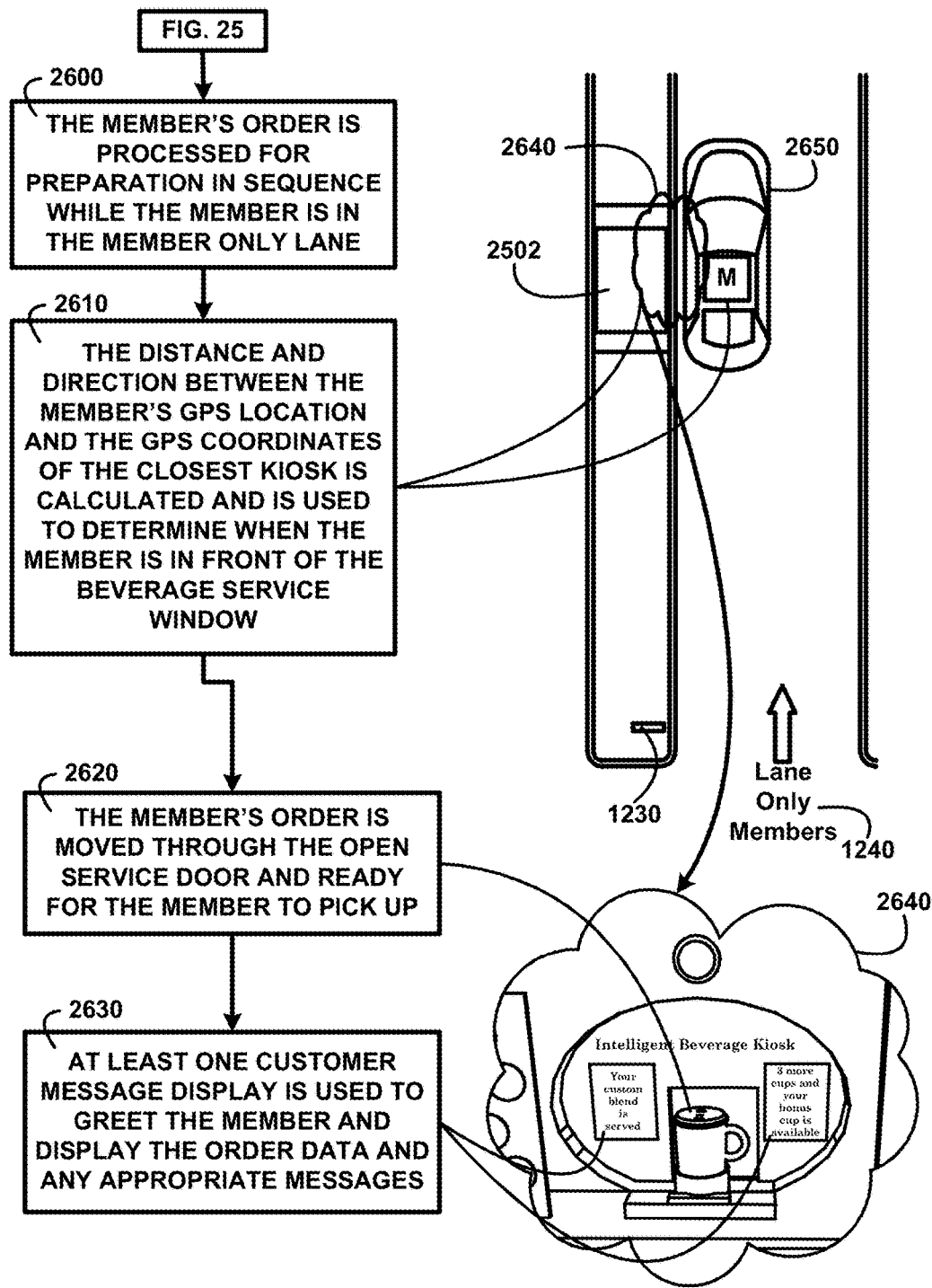
FIG. 26 shows for illustrative purposes only an example of member application beverage pickup of one embodiment.

Member Application Beverage Pickup:

FIG. 26 shows for illustrative purposes only an example of member application beverage pickup of one embodiment. FIG. 26 shows continuing from FIG. 25 the member's order is processed for preparation in sequence while the member is in the member only lane 2600. The distance and direction between the member's GPS location and the GPS coordinates of the closest kiosk is calculated and is used to determine when the member is in front of the beverage service window 2610. A member's order is ready for pick-up when arriving at a serve station 2640. The member's order is moved through the open service door and ready for the member to pick up 2620. At least one customer message display is used to greet the member and display the order data and any appropriate messages 2630. A member picks up order 2650 and is recorded as the member exits the members only lane 1240 of closest drive-thru kiosk 2502 of one embodiment.

Figure 27A:
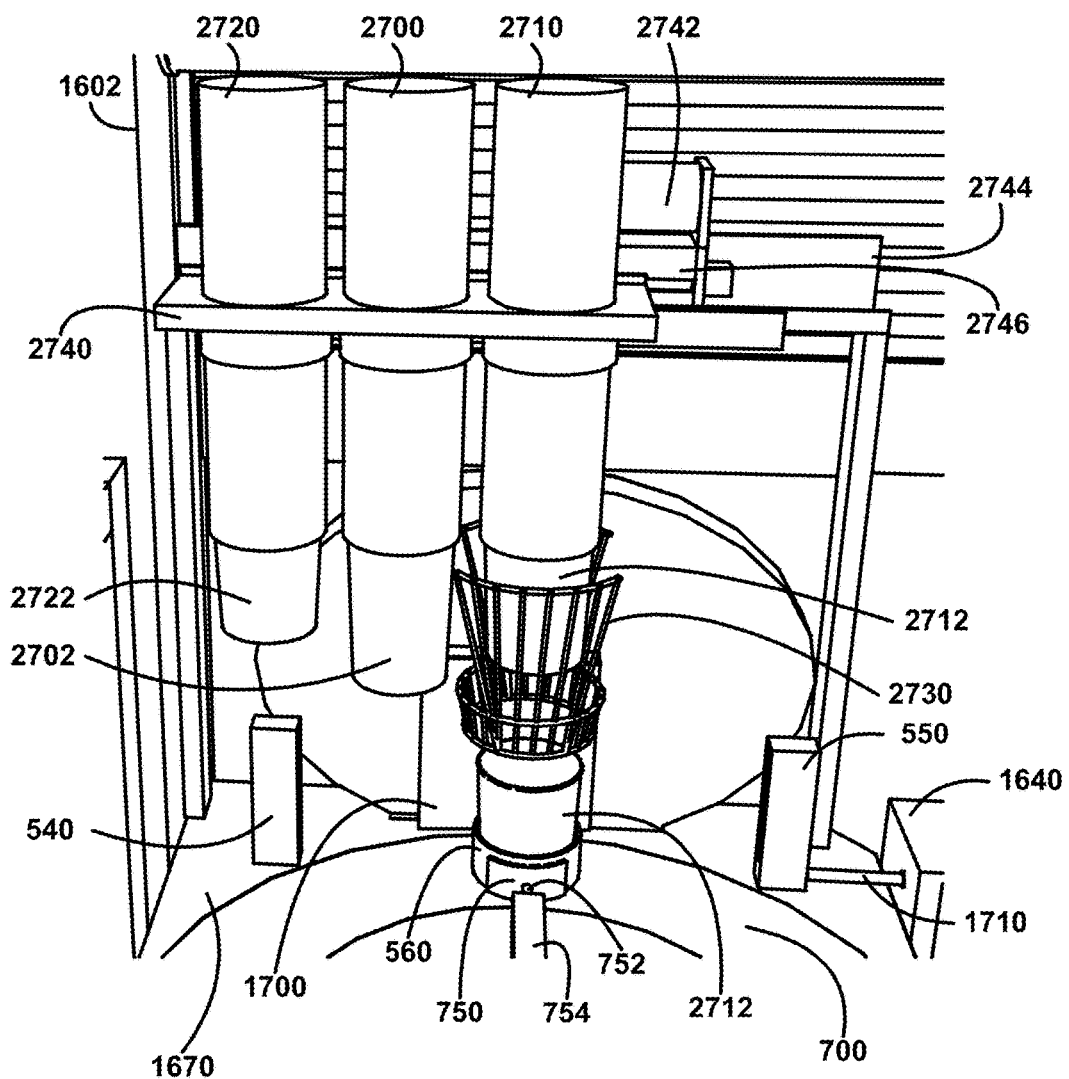
FIG. 27A shows for illustrative purposes only an example of 3 cup size dispenser of one embodiment.

3 Cup Size Dispenser:

FIG. 27A shows for illustrative purposes only an example of 3 cup size dispenser of one embodiment. FIG. 27A shows the intelligent beverage kiosk with walls removed for illustration purposes 1602. FIG. 27A also shows the beverage cup detector apparatus signal transmitter 540, beverage cup conveyor 700, beverage cup holder 560, beverage cup holder coupling 750, beverage cup holder actuator 754, actuator rod 752, beverage cup detector apparatus signal receiver 550, kiosk serving door closed 1700, kiosk processing panel 1640, conveyor adjustable platform module 1670, and beverage cup detector apparatus signal receiver coupling cables 1710.

In one embodiment the intelligent beverage kiosk 100 of FIG. 1 includes a 3 beverage cup size sliding platform 2740. The 3 beverage cup size sliding platform 2740 includes a cup selector linear actuator 2746, cup selector linear actuator bracket 2744, and cup selector linear actuator solenoid 2742. The 3 beverage cup size sliding platform 2740 is configured to include a large size beverage cup dispenser 2700, medium size beverage cup dispenser 2710, and a small size beverage cup dispenser 2720. The large size beverage cup dispenser 2700 dispenses a large size beverage cup 2702 corresponding to a consumer selection. The medium size beverage cup dispenser 2710 dispenses a medium size beverage cup 2712 corresponding to a consumer selection. The small size beverage cup dispenser 2720 dispenses a small size beverage cup 2722 corresponding to a consumer selection. Dispensed cups drop through a slotted beverage cup dispenser guide 2730 to a cup holder below of one embodiment.

Figure 27B:
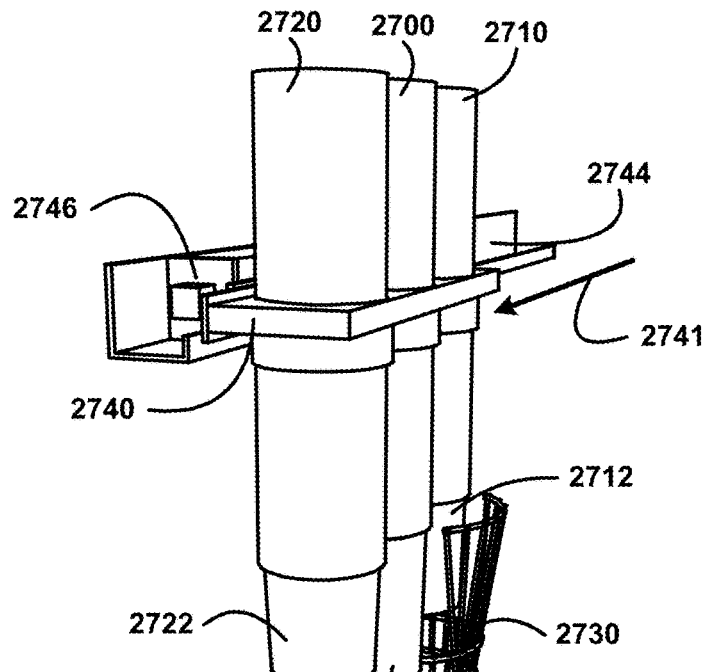
FIG. 27B shows for illustrative purposes only an example of 3 cup size dispenser operation of one embodiment.

3 Cup Size Dispenser Operation:

FIG. 27B shows for illustrative purposes only an example of 3 cup size dispenser operation of one embodiment. FIG. 27B shows the 3 beverage cup size sliding platform 2740, cup selector linear actuator 2746, cup selector linear actuator bracket 2744, large size beverage cup dispenser 2700, medium size beverage cup dispenser 2710, small size beverage cup dispenser 2720, large size beverage cup 2702, medium size beverage cup 2712, small size beverage cup 2722, and slotted beverage cup dispenser guide 2730. A cup selector linear actuator slides in first direction to dispense a medium size beverage cup 2741 of one embodiment.

Figure 27C:
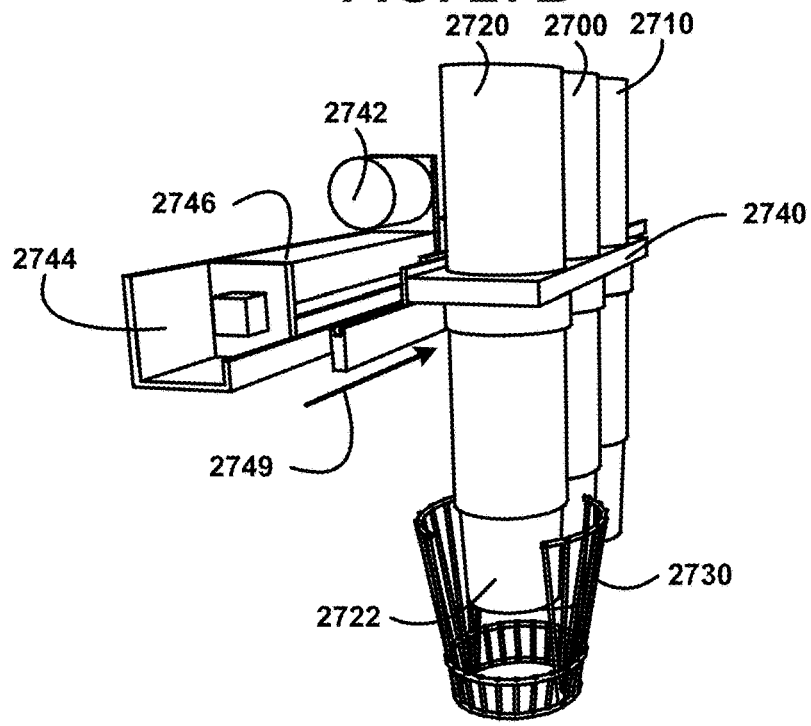
FIG. 27C shows for illustrative purposes only an example of 3 cup size dispenser cup dispensing of one embodiment.

3 Cup Size Dispenser Cup Dispensing:

FIG. 27C shows for illustrative purposes only an example of 3 cup size dispenser cup dispensing of one embodiment. FIG. 27C shows the 3 beverage cup size sliding platform 2740, cup selector linear actuator 2746, cup selector linear actuator bracket 2744, cup selector linear actuator solenoid 2742, large size beverage cup dispenser 2700, medium size beverage cup dispenser 2710, small size beverage cup dispenser 2720, large size beverage cup 2702, medium size beverage cup 2712, small size beverage cup 2722, and slotted beverage cup dispenser guide 2730. A cup selector linear actuator slides in second direction to dispense a small size beverage cup 2749. Not shown is a beverage cup drop actuator inside each beverage cup dispenser to dislodge and drop the selected cup size into the slotted beverage cup dispenser guide 2730 of one embodiment.

Figure 28A:
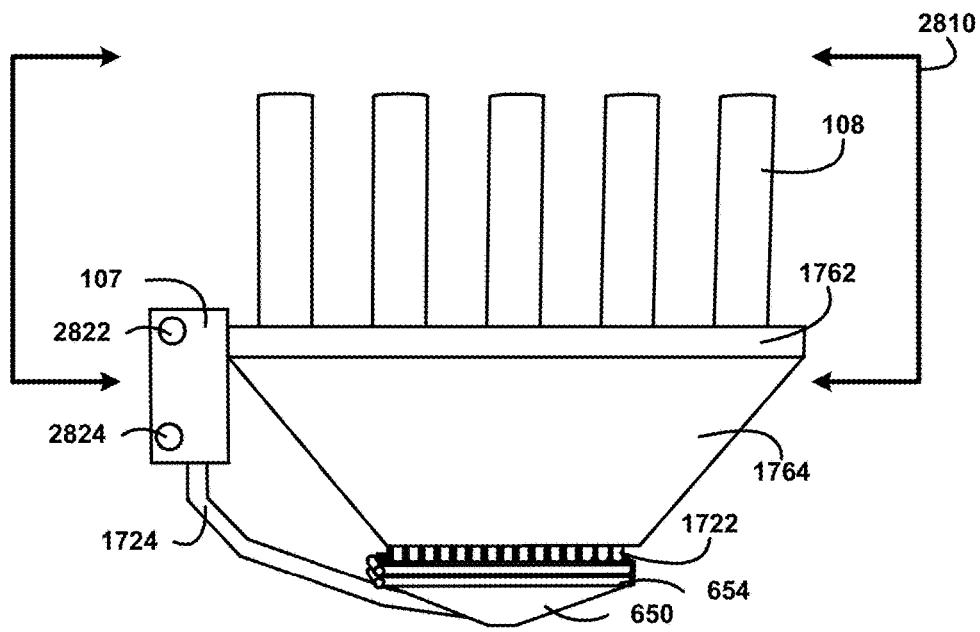
FIG. 28A shows for illustrative purposes only an example of beverage ingredient portioning modules of one embodiment.

Beverage Ingredient Portioning Modules:

FIG. 28A shows for illustrative purposes only an example of beverage ingredient portioning modules of one embodiment. FIG. 28A shows the flavor portion pipe and valves 1722, flavor collection chamber 650, cup fill funnel 654, ice fill chute 1724, flavor container piping cabinet 1764, ice maker and dispenser 107, beverage supply containers 108, cold water chiller inlet 2822, flavor container platform 1762, and ice maker melt outlet 2824. Cross section arrows 2810 show the area of a cross section view in FIG. 28B of one embodiment.

Figure 28B:
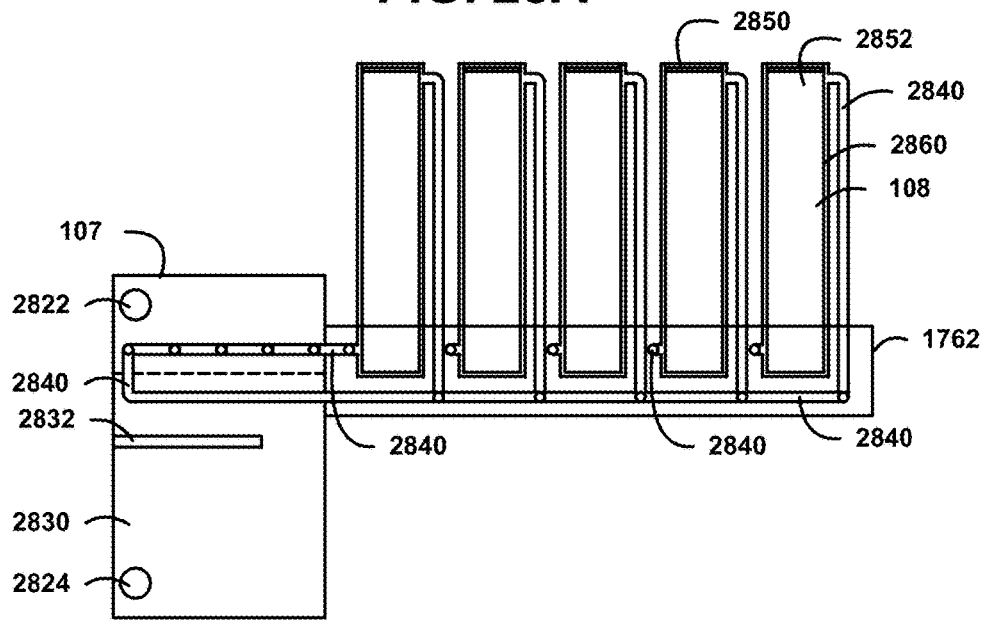
FIG. 28B shows for illustrative purposes only an example of beverage ingredient portioning modules cross section of one embodiment.

Beverage Ingredient Portioning Modules Cross Section:

FIG. 28B shows for illustrative purposes only an example of beverage ingredient portioning modules cross section of one embodiment. FIG. 28B shows the flavor portion pipe and valves 1722, flavor collection chamber 650, cup fill funnel 654, ice fill chute 1724, flavor container piping cabinet 1764, ice maker and dispenser 107, beverage supply containers 108, cold water chiller inlet 2822, flavor container platform 1762, ice maker melt outlet 2824, ice maker apparatus 2832, and ice bin 2830. FIG. 28B shows a cross section view of refrigerated fluid circulation piping 2840, a container cap 2850, an ingredient supply compartment 2852 and a refrigerated fluid circulation container envelope 2860 of one embodiment.

Refrigerated Ingredient Container Module:

FIG. 29A shows for illustrative purposes only an example of refrigerated ingredient container module of one embodiment. FIG. 29A shows the flavor container platform 1762 and ice maker and dispenser 107. The ice maker and dispenser 107 provide a source of refrigeration to chill a fluid. A refrigerated fluid circulation piping chilled fluid 2900 is used to maintain a refrigerated temperature of ingredients stored in at least one refrigerated beverage supply container 108 of FIG. 1 coupled to the flavor container platform 1762 for example coffee creamer, dairy ingredients, fruit juices and other ingredients required by local health agencies to be maintained at a refrigerated temperature. A refrigerated beverage supply container 108 of FIG. 1 includes a beverage supply container exterior casing 2920 and a beverage supply container interior casing 2922 to form a refrigerated fluid circulating inside container envelope 2930.

The refrigerated fluid circulation piping chilled fluid 2900 is piped into the refrigerated fluid circulating inside container envelope 2930 and comes into direct contact with the beverage supply container interior casing 2922. Heat from the ingredient inside the beverage supply container interior casing 2922 is conducted through the interior casing wall into the fluid. Heat is extracted from stored beverage ingredients that are refrigerated. The extracted heat is absorbed by the chilled fluid. The refrigerated fluid circulation piping heat absorbed fluid 2910 is circulated back to the ice maker and dispenser 107 where the heat is extracted and the fluid re-chilled and re-circulated of one embodiment.

Ingredient Container Sizing:

FIG. 29B shows for illustrative purposes only an example of ingredient container sizing of one embodiment. FIG. 29B shows the ice maker and dispenser 107 and flavor container platform 1762. Coupled to the flavor container platform 1762 are a first beverage ingredient container 2950 and a second beverage ingredient container 2970. The second beverage ingredient container 2970 is greater in size than the first beverage ingredient container 2950. The second beverage ingredient container 2970 may be used to store bulky ingredients for example dry ingredients and ingredients that are selected often creating a greater demand to be supplied of one embodiment.

Figure 30:
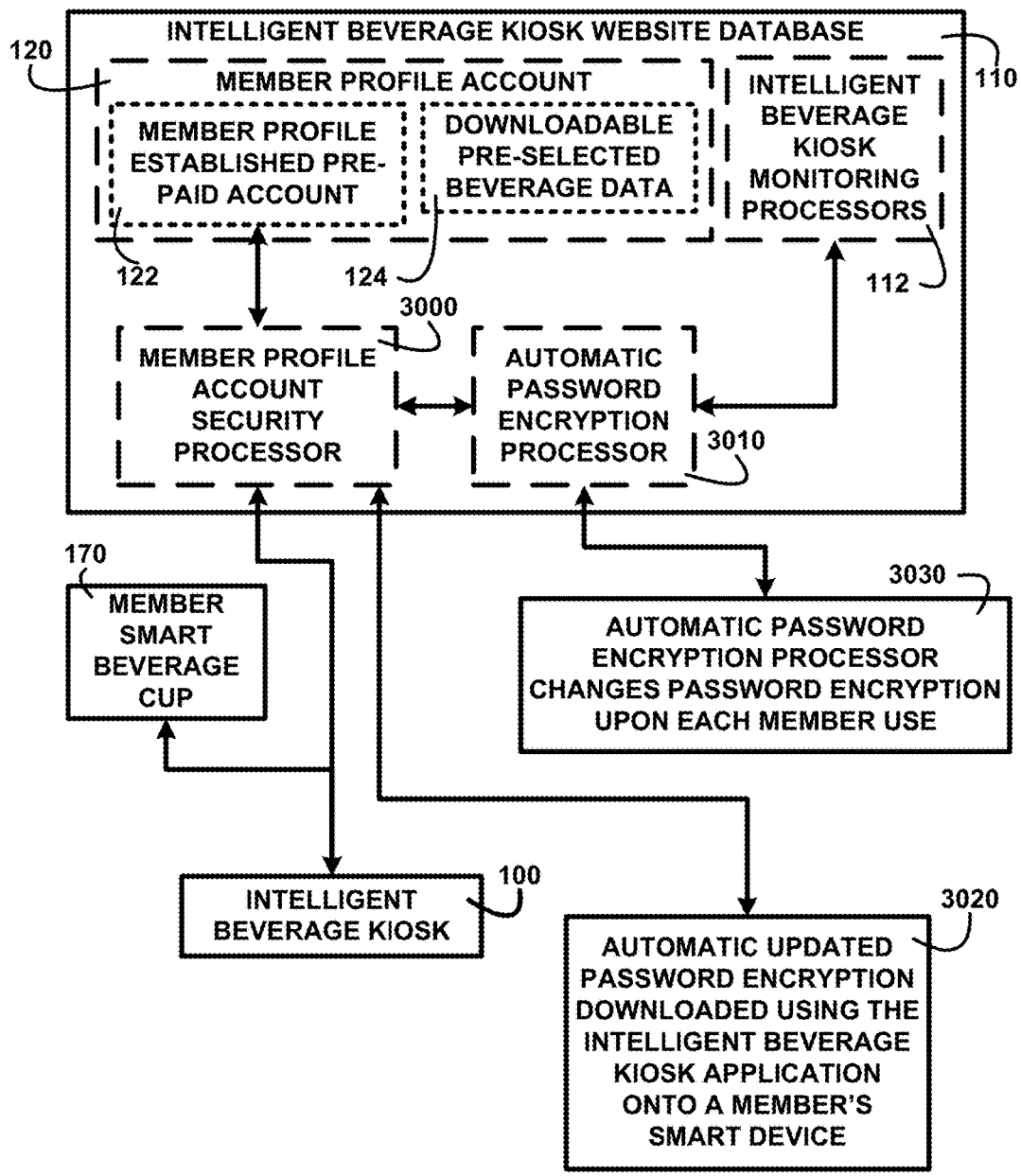
FIG. 30 shows for illustrative purposes only an example of member profile account security processor of one embodiment.

Member Profile Account Security Processor:

FIG. 30 shows for illustrative purposes only an example of member profile account security processor of one embodiment. FIG. 30 shows the intelligent beverage kiosk website database 110 and data stored including member profile account 120, member profile established pre-paid account 122, and downloadable pre-selected beverage data 124. The intelligent beverage kiosk website database 110 includes intelligent beverage kiosk monitoring processors 112. The intelligent beverage kiosk website database 110 includes a member profile account security processor 3000 and an automatic password encryption processor 3010.

An automatic password encryption processor changes password encryption upon each member use 3030. The member does not change their password. The password used by a member to login is transmitted in an encrypted format. Interception of the password encrypted format could be used to gain unauthorized use of the member profile account data.

Changing the encryption of the password reduces the opportunity to use an intercepted password encrypted format since the password encryption is automatically changed upon each member's use for login. To maintain a member's accessibility to login the changed password encryption is downloaded to the member smart beverage cup 170 while being processed in the intelligent beverage kiosk 100. An automatic updated password encryption is downloaded using the intelligent beverage kiosk application onto a member's smart device 3020 of one embodiment.

Figure 31:
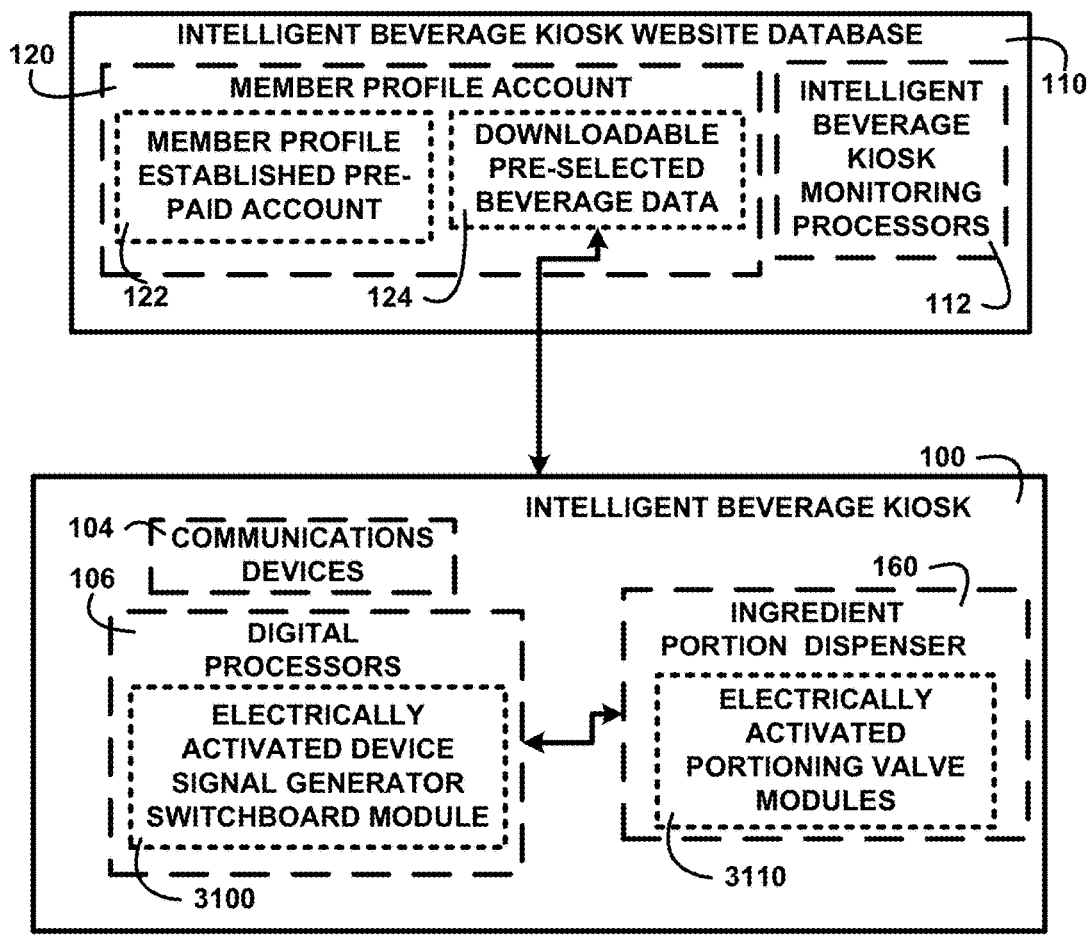
FIG. 31 shows for illustrative purposes only an example of intelligent beverage kiosk digitally operated modules of one embodiment.

Intelligent Beverage Kiosk Digitally Operated Modules:

FIG. 31 shows for illustrative purposes only an example of intelligent beverage kiosk digitally operated modules of one embodiment. FIG. 31 shows the intelligent beverage kiosk website database 110, member profile account 120, member profile established pre-paid account 122, downloadable pre-selected beverage data 124 and intelligent beverage kiosk monitoring processors 112. The intelligent beverage kiosk website database 110 communicates with the intelligent beverage kiosk 100 transferring member data including downloadable pre-selected beverage data 124 using communications devices 104 in the intelligent beverage kiosk 100.

Downloadable pre-selected beverage data 124 is stored in intelligent beverage kiosk 100 digital processors 106. The digital processors 106 are configured to couple to an electrically activated device signal generator switchboard module 3100. Signals transmitted from the digital processors 106 to the electrically activated device signal generator switchboard module 3100 which is coupled to each ingredient portion dispenser 160.

At least one electrically activated portioning valve modules 3110 is coupled to each ingredient portion dispenser 160 and activated upon receipt of one or more signals transmitted through the electrically activated device signal generator switchboard module 3100 to open and close the electrically activated portioning valve modules 3110 to portion out selected ingredients in conformance with the downloadable pre-selected beverage data 124 of one embodiment.

Figure 32:
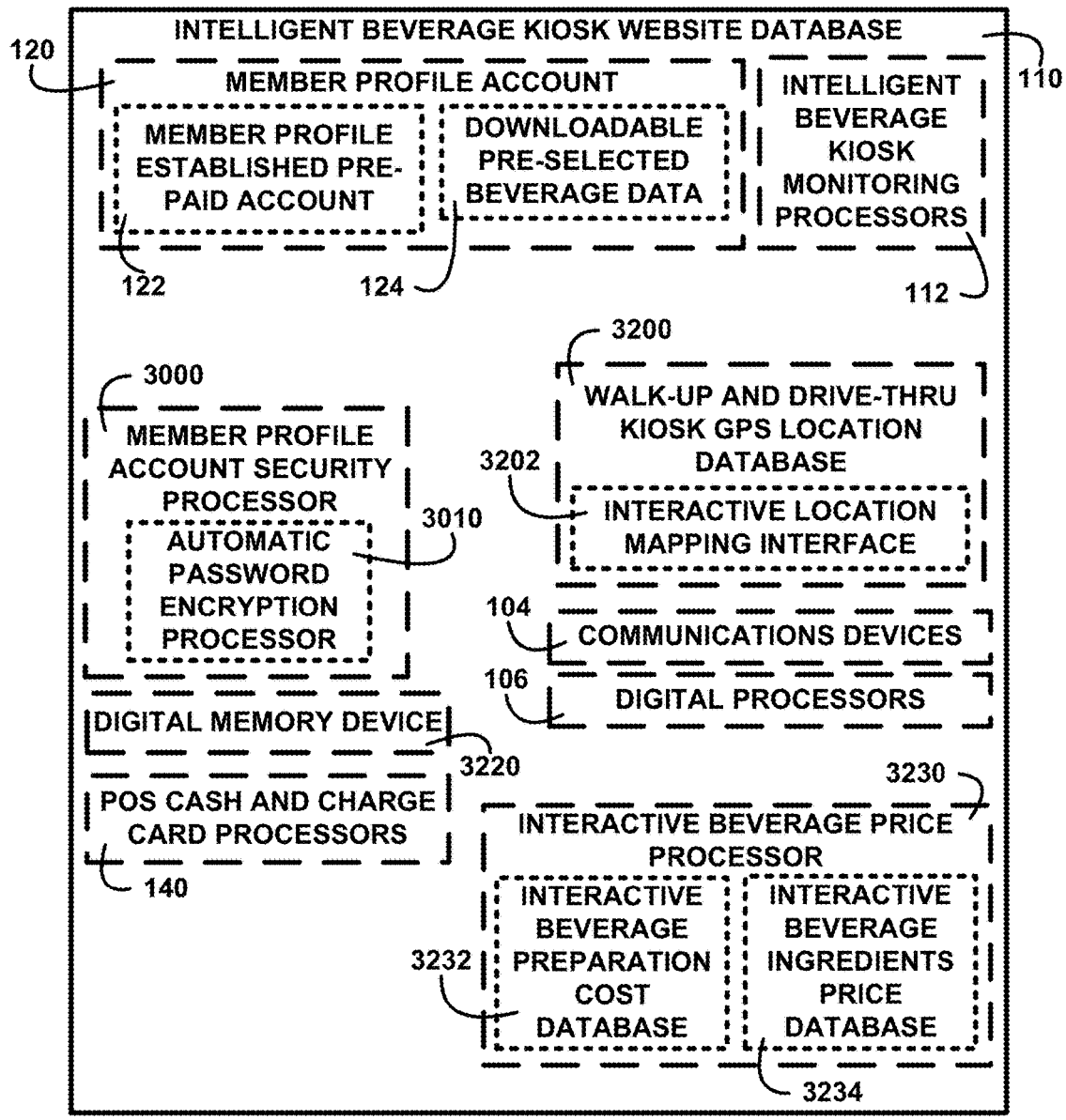
FIG. 32 shows for illustrative purposes only an example of walk-up and drive-thru kiosk GPS location database of one embodiment.

Walk-Up and Drive-Thru Kiosk GPS Location Database:

FIG. 32 shows for illustrative purposes only an example of walk-up and drive-thru kiosk GPS location database of one embodiment. FIG. 32 shows the intelligent beverage kiosk website database 110, member profile account 120, member profile established pre-paid account 122, downloadable pre-selected beverage data 124, intelligent beverage kiosk monitoring processors 112, member profile account security processor 3000, and automatic password encryption processor 3010.

The intelligent beverage kiosk website database 110 is configured to include at least one digital memory device 3220, POS cash and charge card processors 140, a walk-up and drive-thru kiosk GPS location database 3200, an interactive location mapping interface 3202, communications devices 104 including for example WIFI, cellular, encrypted, satellite based, and other communication formatted devices.

The intelligent beverage kiosk website database 110 is configured to include digital processors 106, interactive beverage price processor 3230, interactive beverage preparation cost database 3232 and an interactive beverage ingredients price database 3234. The digital processors 106 perform calculation processes to build beverage pricing using the interactive beverage price processor 3230.

The intelligent beverage kiosk website database 110 performs dynamic analysis of interactive beverage preparation cost database 3232 and interactive beverage ingredients price database 3234 data, ingredient demand from sales, ingredient use determinations, and performs forecasting of ingredient future prices based on algorithms using the previously described data and include agricultural forecasting data, distribution supply and demand trends and regional factors. Future regional sales demand forecasting is also analyzed using algorithms using population growth and demographic trends, socio-economic factors and transportation growth data of one embodiment.

Figure 33:
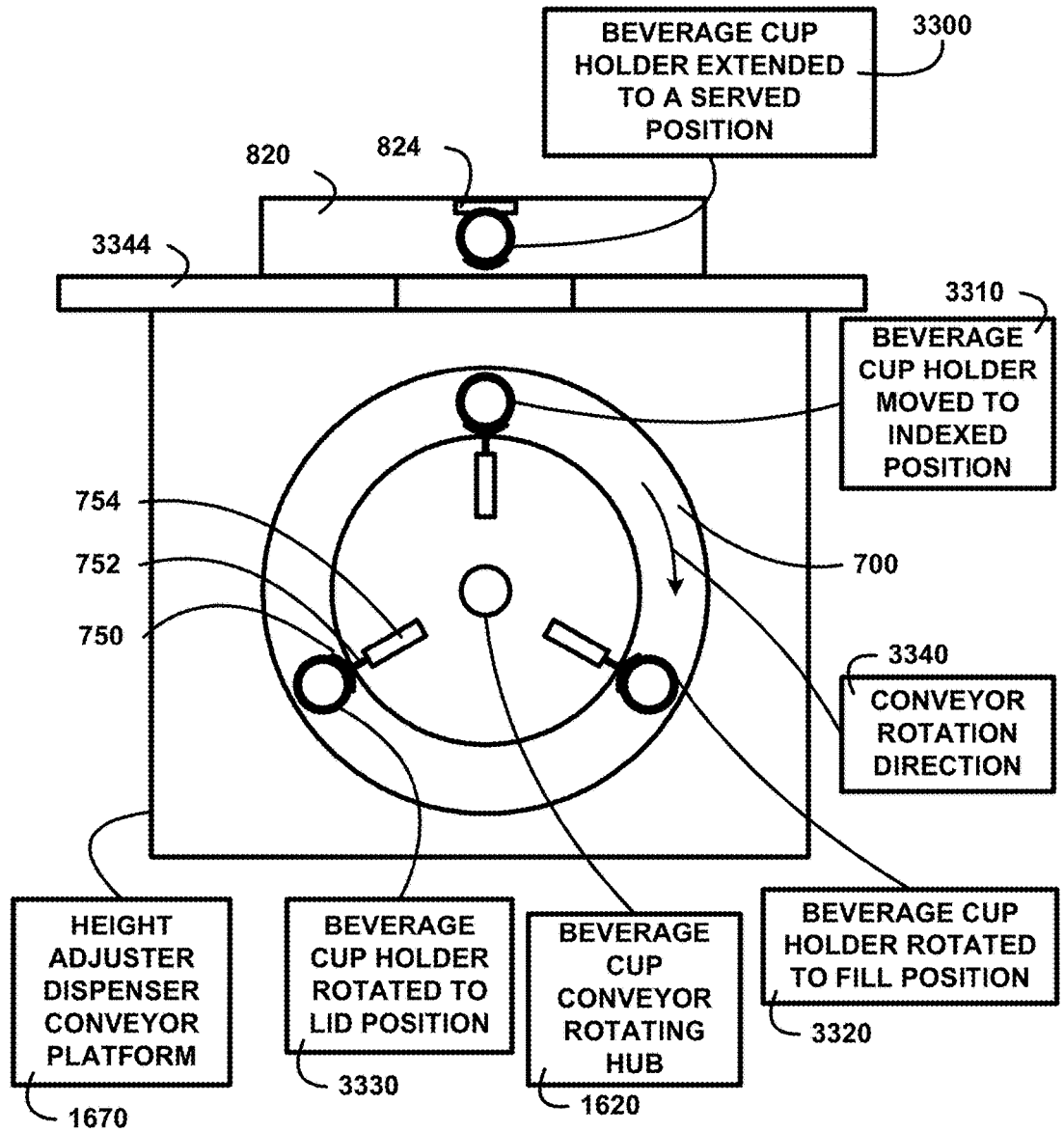
FIG. 33 shows for illustrative purposes only an example of beverage cup station positions of one embodiment.

Beverage Cup Station Positions:

FIG. 33 shows for illustrative purposes only an example of beverage cup station positions of one embodiment. FIG. 33 shows a beverage cup holder extended to a served position 3300. The beverage cup holder 560 of FIG. 5 is against the cup holder stop 824 on the serving counter surface 820 located on an adjustable height kiosk front face 3344. FIG. 33 shows the cup holder conveyor 700, beverage cup holder coupling 750, beverage cup holder actuator 754, and actuator rod 752. Also shown is a beverage cup holder moved to indexed position 3310. A conveyor rotation direction 3340 indicates the sequence of processing at each of the preparation station positions including a beverage cup holder rotated to fill position 3320 of one embodiment.

The conveyor rotation direction 3340 is created by the beverage cup conveyor rotating hub 1620. The conveyor rotation on the height adjuster dispenser conveyor platform 1670 produces a beverage cup holder rotated to lid position 3330 after the fill position. The positioning returns a cup holder to the indexed position wherein the cup holder can again be positioned to the served position of one embodiment.

Figure 34A:
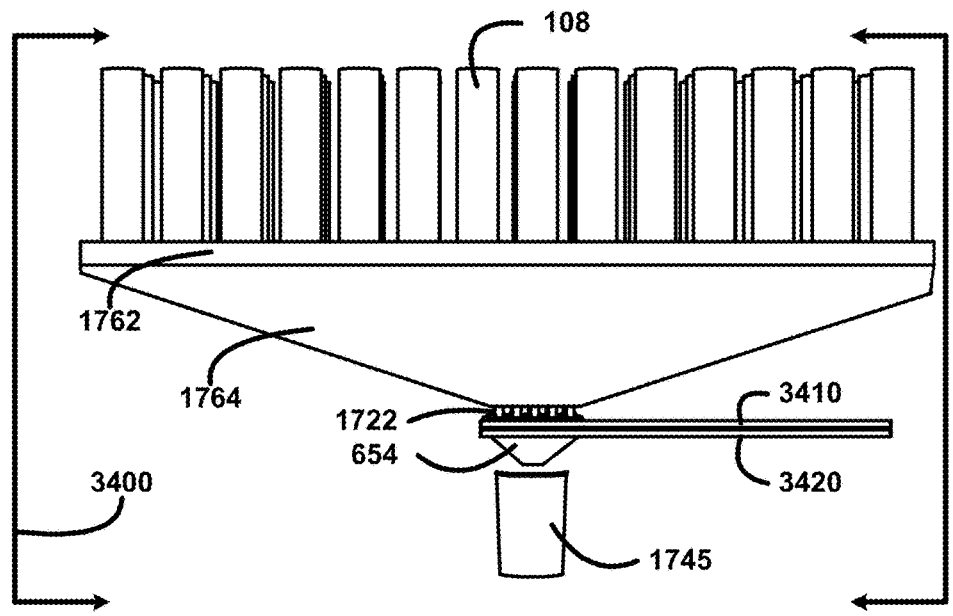
FIG. 34A shows for illustrative purposes only an example of flavor container piping cabinet of one embodiment.

Flavor Container Piping Cabinet:

FIG. 34A shows for illustrative purposes only an example of flavor container piping cabinet of one embodiment. FIG. 34A shows cross section arrows 3400 indicating the area for a cross section of the beverage supply containers 108, flavor container platform 1762, flavor container piping cabinet 1764, flavor portion pipe and valves 1722, cup fill funnel 654, beverage cup at fill station position 1745, hot water supply 3410 and cold water supply 3420 of one embodiment.

Figure 34B:
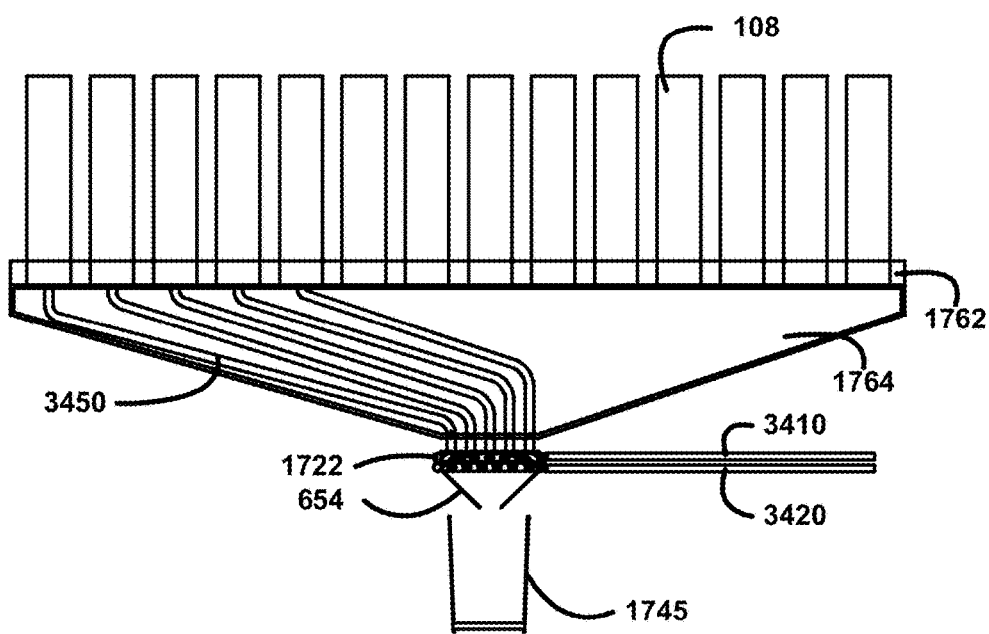
FIG. 34B shows for illustrative purposes only an example of flavor container piping cabinet cross section of one embodiment.
Figure 35:
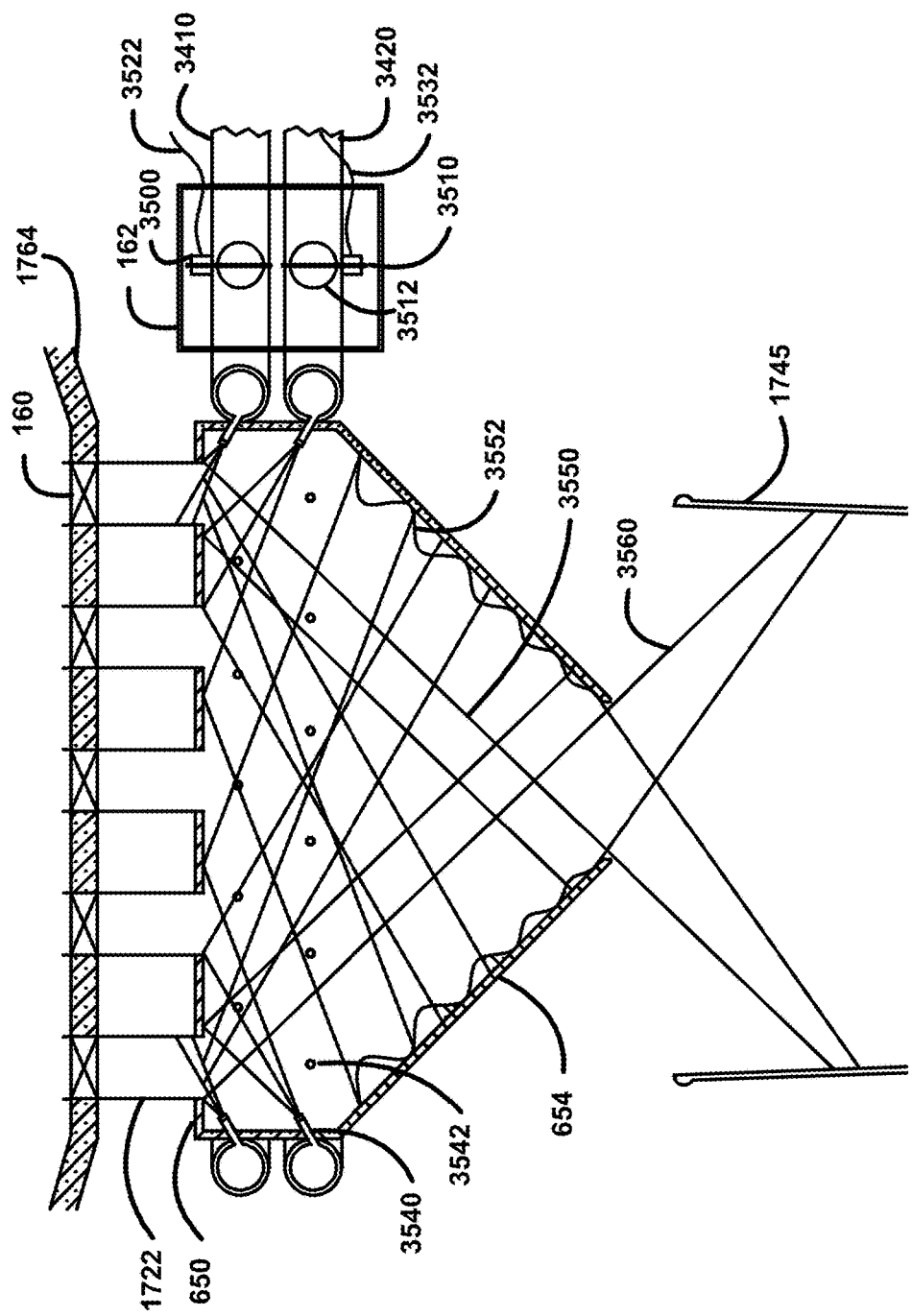
FIG. 35 shows for illustrative purposes only an example of beverage blending process of one embodiment.

Flavor Container Piping Cabinet Cross Section:

FIG. 34B shows for illustrative purposes only an example of flavor container piping cabinet cross section of one embodiment. FIG. 34B shows a cross section view of beverage supply containers 108, flavor container platform 1762, flavor container piping cabinet 1764, flavor portion pipe and valves 1722, cup fill funnel 654, beverage cup at fill station position 1745, hot water supply 3410, cold water supply 3420, and flavor portion pipe 3450, Beverage Blending Process:

FIG. 35 shows for illustrative purposes only an example of beverage blending process of one embodiment. FIG. 35 shows the ingredient portion dispenser 160, controlled temperature water dispenser 162, flavor container piping cabinet 1764, ingredient collection chamber 650, flavor portion pipe and valves 1722, cup fill funnel 654, beverage cup at fill station position 1745, hot water supply 3410, cold water supply 3420, portion valve actuator 3500, portion valve actuator shaft 3510, portion valve 3512, hot water supply portion circuit 3522, cold water supply portion circuit 3532, water supply injector valve 3540, and water supply injector valve side wall view 3542. FIG. 35 shows injected water mixing 3550 the dispensed ingredients. The injected water creates a turbulent flow that washes ingredients from walls of the ingredient collection chamber 650 and creates a mixed water and ingredient accumulating flow 3552 along the side walls of the cup fill funnel 654. The cup fill funnel 654 directs a mixed water and ingredient flow into beverage cup 3560 of one embodiment.

Figure 36:
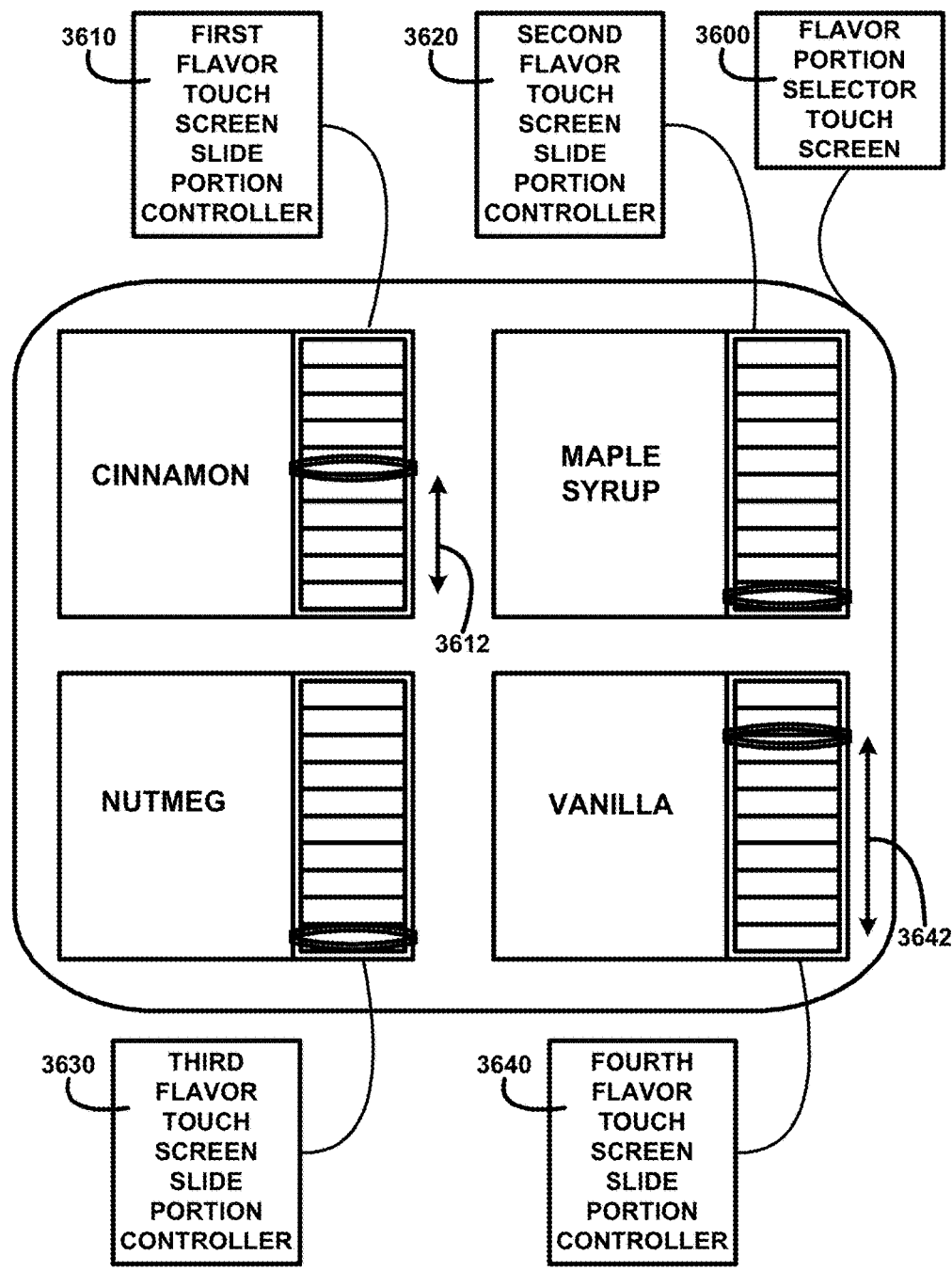
FIG. 36 shows for illustrative purposes only an example of flavor touch screen slide portion controller of one embodiment.

Flavor Touch Screen Slide Portion Controller:

FIG. 36 shows for illustrative purposes only an example of flavor touch screen slide portion controller of one embodiment. FIG. 36 shows a flavor portion selector touch screen 3600 with a display of a first flavor touch screen slide portion controller 3610 for example cinnamon, second flavor touch screen slide portion controller 3620 for example maple syrup, third flavor touch screen slide portion controller 3630 for example nutmeg and a fourth flavor touch screen slide portion controller 3640 for example vanilla. A first flavor touch screen slide portion controller finger movement up and down 3612 selects the portions of the ingredient selected for example 5 portions. A fourth flavor touch screen slide portion controller finger movement up and down 3642 makes a selection of for example 8 portions. The flavor touch screen slide portion controller includes portion gradient markings that range from 0 to 10 portions of one embodiment.

In one embodiment includes a method of an intelligent beverage kiosk system for customized beverage preparation comprising preparing customized beverage selections for meeting a consumer's taste, recording a member's customized beverage selection for reducing member beverage delivery wait time, creating a member smart beverage cup with layered component compartment modules for downloading and ordering a member customized beverage selection, ordering member customized beverage selections using a wireless intelligent beverage kiosk application for reducing ordering time for a customized beverage selection and adjusting intelligent beverage kiosk window height for facilitating beverage delivery for drive-thru vehicle pickup.

An embodiment includes a method of preparing customized beverage selections including preparing user customized beverage ingredients, ingredient portions, temperature and volume. Yet another embodiment shows a method wherein recording a member's customized beverage selection includes recording on an intelligent beverage kiosk website database in a member profile account downloadable pre-selected beverage data, member profile established pre-paid account data and communicating member profile account data to an intelligent beverage kiosk being visited by the member.

One embodiment shows a method wherein creating a member smart beverage cup with layered component compartment modules includes insulated sides, first component compartment layer modules including energy induction coils and circuits, second component compartment layer modules including rechargeable flat batteries, and third component compartment layer modules including radio-frequency identification (RFID), near field communication (NFC) device, GPS location module, flash memory device and a digital processor. A different embodiment shows a method wherein ordering member customized beverage selections using a wireless intelligent beverage kiosk application includes a member using a member smart device with an intelligent beverage kiosk application installed to locate a closest intelligent beverage kiosk, a member choosing pre-selected beverage data, and selecting when to place the pre-selected beverage order.

In one embodiment a method shows wherein adjusting intelligent beverage kiosk window height includes determining an approximate drive-thru vehicle driver's window height, moving a conveyor adjustable platform module, an adjustable height kiosk front face and dispenser height adjuster roll-up sections to a height approximating the determined drive-thru vehicle driver's window height. Another embodiment shows a method wherein adjusting intelligent beverage kiosk window height includes moving a conveyor adjustable platform module including a kiosk processing panel, a kiosk processing panel ribbon cable, at least one beverage cup holder actuator, actuator rod, beverage cup holder and beverage cup holder coupling, a beverage cup conveyor, a beverage cup detector apparatus signal transmitter, a beverage cup detector apparatus signal receiver, flavor portion pipe and valves, a flavor collection chamber, a cup fill funnel, an ice maker and dispenser, an ice fill chute, a flavor container piping cabinet, a plurality of beverage supply containers, a flavor container platform and a controlled temperature water dispenser.

Yet another embodiment shows a method wherein adjusting intelligent beverage kiosk window height includes an adjustable height kiosk front face including at least one intelligent beverage kiosk touch screen display, at least one consumer message display and a serving counter surface. In a different embodiment a method wherein preparing customized beverage selections includes dispensing ice for cold beverages and dispensing a customized beverage temperature using a controlled temperature water dispenser wherein portions of hot and cold water dispensed are determined to control the blended portions temperature for hot beverages and wherein a volume of beverage dispensed is determined using a beverage cup detector apparatus used to determine a beverage cup size. One embodiment shows a method wherein preparing customized beverage selections includes dispensing customized beverage ingredients in customized ingredient portions using a kiosk processing panel electrically activated device signal generator switchboard module to operate electrically activated portioning valve modules to dispense the selected customized beverage ingredients in the customized ingredient portions.

One embodiment shows an apparatus for preparing customized beverage selections to serve consumers, comprising an intelligent beverage kiosk configured for preparing customized beverage selections including user customized beverage ingredients, ingredient portions, temperature and volume, a plurality of dispenser height adjuster roll-up sections configured for determining an approximate drive-thru vehicle driver's window height and adjusting a height of a serving counter surface, an adjustable height kiosk front face and a conveyor adjustable platform module to a height approximating the determined drive-thru vehicle driver's window height, a member smart beverage cup configured for recording and transmitting member profile account data including customized beverage selections and an intelligent beverage kiosk website database configured for recording, transmitting and receiving member profile account data; including customized beverage selections and including a member profile account security processor and an automatic password encryption processor.

Another embodiment shows the intelligent beverage kiosk is configured to include a conveyor adjustable platform module including a kiosk processing panel, a kiosk processing panel ribbon cable, at least one beverage cup holder actuator, actuator rod, beverage cup holder and beverage cup holder coupling, a beverage cup conveyor, a beverage cup detector apparatus signal transmitter, a beverage cup detector apparatus signal receiver, flavor portion pipe and valves, a flavor collection chamber, a cup fill funnel, an ice maker and dispenser, an ice fill chute, a flavor container piping cabinet, a plurality of beverage supply containers, a flavor container platform and a controlled temperature water dispenser. Yet another embodiment shows an apparatus wherein the intelligent beverage kiosk website database is configured for recording data, calculating data, making determinations, activating electrical devices, transmitting data to and receiving data from at least one member smart device using an intelligent beverage kiosk application and from a plurality of standalone intelligent beverage kiosks.

An embodiment includes an apparatus wherein the member smart beverage cup is configured to include layered component compartment modules including insulated sides, first component compartment layer modules including energy induction coils and circuits, second component compartment layer modules including rechargeable flat batteries, and third component compartment layer modules including radio-frequency identification (RFID), near field communication (NFC) device, GPS location module, flash memory device and a digital processor. One embodiment shows an apparatus wherein the intelligent beverage kiosk website database is configured for processing automatic member profile account password encryption changes upon each member use of the password and downloading to a member's smart device an updated password encryption of one embodiment.

In another embodiment an apparatus, comprising an intelligent beverage kiosk configured to include a kiosk processing panel wherein the kiosk processing panel is configured for controlling a customized beverage selection preparation process, an order processing sequencer configured for receiving customized beverage selections preparation process signals from the intelligent beverage kiosk processing panel including user customized beverage ingredients, ingredient portions, temperature and volume, a plurality of beverage supply containers configured for dispensing customized beverage ingredients and ingredient portions into a flavor collection chamber, a controlled temperature water dispenser injects portions of hot and cold filtered water to mix customized beverage ingredient portions and dispense the prepared customized beverage into a beverage and a filled cup lid cover applicator configured to receive a signal from the order processing sequencer to snap a lid on a filled beverage cup wherein the order processing sequencer processes serving the filled beverage cup with a lid cover to a consumer on a serving counter surface. In one embodiment the order processing sequencer is configured for positioning a beverage cup for preparation processes using a beverage cup conveyor. In yet another embodiment the plurality of beverage supply containers are configured to dispense customized beverage ingredient portions to into a flavor collection chamber using order processing sequencer activated flavor portion pipe and valves coupled to an electrically activated device signal generator switchboard module. A different embodiment shows an apparatus wherein the controlled temperature water dispenser injects portions of hot and cold filtered water to blend a customized beverage temperature. Another embodiment includes an apparatus wherein the intelligent beverage kiosk is configured to include at least one intelligent beverage kiosk touch screen display for a consumer to make customized beverage selections.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method of an intelligent beverage kiosk system for customized beverage preparation, comprising:
    storing a member profile account including a member password In an intelligent beverage kiosk website database;
    changing the encryption of the password upon each member's use for login for reducing the opportunity for interception of the password and unauthorized access and use of the member profile account data;
    recording a member's customized beverage selection identified by a member chosen name for the blend for reducing member beverage delivery wait time including downloadable pre-selected beverage data with a suffixed name and authorized user access;
    ordering member customized beverage selections using a wireless intelligent beverage kiosk application for reducing ordering time for a customized beverage selection;
    using an intelligent beverage kiosk application for transmitting audible map directions, a kiosk address, driving instructions to a closest kiosk, payment method selections and ordering selections including a pre-selected beverage and responding to a member's voice responses for the member to drive in a hands free communication environment;
    awaiting an ordering selection from the member before placing the order in the queue for preparing the member's order upon arrival for serving a member's pre-selected beverage at a member's selected temperature; and
    adjusting intelligent beverage kiosk window heights for facilitating drive-thru vehicle pickup beverage delivery.

2. The method of claim 1, wherein preparing customized beverage selections includes preparing user customized beverage ingredients, ingredient portions, temperature and volume.

3. The method of claim 1, further comprising calculating a distance from member's GPS location to a closest kiosk GPS coordinates using the intelligent beverage kiosk website database and displaying a closest kiosk address retrieved and graphic map directions.

4. The method of claim 1, further comprising transmitting a member's GPS location to the intelligent beverage kiosk website database for querying the intelligent beverage kiosk website database to locate a closest kiosk.

5. The method of claim 1, wherein ordering member customized beverage selections using the wireless intelligent beverage kiosk application includes a member selecting a closest drive-thru or walk-up intelligent beverage kiosk, choosing downloadable pre-selected beverage data, and selecting when to place the pre-selected beverage order.

6. The method of claim 1, wherein adjusting intelligent beverage kiosk window height includes determining an approximate drive-thru vehicle driver's window height, moving a conveyor adjustable platform module, an adjustable height kiosk front face and dispenser height adjuster roll-up sections to a height approximating the determined drive-thru vehicle driver's window height.

7. The method of claim 1, wherein adjusting intelligent beverage kiosk window height includes moving a conveyor adjustable platform module including a kiosk processing panel, a kiosk processing panel ribbon cable, at least one beverage cup holder actuator, actuator rod, beverage cup holder and beverage cup holder coupling, a beverage cup conveyor, a beverage cup detector apparatus signal transmitter, a beverage cup detector apparatus signal receiver, flavor portion pipe and valves, a flavor collection chamber, a cup fill funnel, an ice maker and dispenser, an ice fill chute, a flavor container piping cabinet, a plurality of beverage supply containers, a flavor container platform and a controlled temperature water dispenser.

8. The method of claim 1, wherein adjusting intelligent beverage kiosk window height includes an adjustable height kiosk front face including at least one intelligent beverage kiosk touch screen display, at least one consumer message display and a serving counter surface.

9. The method of claim 1, wherein preparing customized beverage selections includes dispensing ice for cold beverages and dispensing a customized beverage temperature using a controlled temperature water dispenser wherein portions of hot and cold water dispensed are determined to control the blended portions temperature for hot beverages and wherein a volume of beverage dispensed is determined using a beverage cup detector apparatus used to determine a beverage cup size.

10. The method of claim 1, wherein preparing customized beverage selections includes dispensing customized beverage ingredients in customized ingredient portions using a kiosk processing panel electrically activated device signal generator switchboard module to operate electrically activated portioning valve modules to dispense the selected customized beverage ingredients in the customized ingredient portions.

11. An apparatus for preparing customized beverage selections to serve consumers, comprising:
an intelligent beverage kiosk application installed on a member's smart device with GPS location features configured for accessing the member profile account and for ordering at least one pre-selected beverage;
an intelligent beverage kiosk monitoring processor for calculating a distance from a member's GPS location to a closest kiosk GPS coordinates using the intelligent beverage kiosk website database and displaying a closest kiosk address retrieved and graphic map directions;
an intelligent beverage kiosk configured for preparing customized beverage selections including user customized beverage ingredients, ingredient portions, temperature and volume identified by a member chosen name for the blend;
a plurality of dispenser height adjuster roll-up sections configured for determining an approximate drive-thru vehicle driver's window height and adjusting a height of a serving counter surface, an adjustable height kiosk front face and a conveyor adjustable platform module to a height approximating the determined drive-thru vehicle driver's window height; and
an intelligent beverage kiosk website database configured for recording, transmitting and receiving member profile account data including a member password; including customized beverage selections, downloadable pre-selected beverage data with a suffixed name and authorized user access, a beverage price processor, and including a member profile account security processor and an automatic password encryption processor for changing the encryption of the password upon each member's use for login.

12. The apparatus of claim 11, wherein the intelligent beverage kiosk is configured to include a conveyor adjustable platform module including a kiosk processing panel, a kiosk processing panel ribbon cable, at least one beverage cup holder actuator, actuator rod, beverage cup holder and beverage cup holder coupling, a beverage cup conveyor, a beverage cup detector apparatus signal transmitter, a beverage cup detector apparatus signal receiver, flavor portion pipe and valves, a flavor collection chamber, a cup fill funnel, an ice maker and dispenser, an ice fill chute, a flavor container piping cabinet, a plurality of beverage supply containers, a flavor container platform and a controlled temperature water dispenser.

13. The apparatus of claim 11, wherein the intelligent beverage kiosk website database is configured for recording data, calculating data, making determinations, activating electrical devices, transmitting data to and receiving data from at least one member smart device using the intelligent beverage kiosk application and from a plurality of stand-alone intelligent beverage kiosks.

14. The apparatus of claim 11, further comprising the intelligent beverage kiosk application installed on a member's smart device transmitting audible map directions, a kiosk address, driving instructions to a closest kiosk, payment method selections and ordering selections including a downloadable pre-selected beverage and responding to a member's voice responses for the member to drive in a hands free communication environment.

15. The apparatus of claim 11, wherein the dispenser height adjuster roll-up sections include an adjustable height kiosk front face including at least one intelligent beverage kiosk touch screen display, at least one consumer message display and a serving counter surface.

16. An apparatus, comprising:
at least one intelligent beverage kiosk website database configured storing a member profile account including a member password In an intelligent beverage kiosk website database including a member profile established pre-paid account and a downloadable pre-selected beverage data and to include at least one intelligent beverage kiosk monitoring processor including a member profile account security processor and an automatic password encryption processor for changing the encryption of the password upon each member's use for login;
an intelligent beverage kiosk configured to include a kiosk processing panel wherein the kiosk processing panel is configured for controlling a customized beverage selection preparation process;
an order processing sequencer configured for receiving customized beverage selections preparation process signals from the intelligent beverage kiosk processing panel including user customized beverage ingredients, ingredient portions, temperature and volume identified by a member chosen name for the blend;
a plurality of beverage supply containers configured for dispensing customized beverage ingredients and ingredient portions into a flavor collection chamber;
a controlled temperature water dispenser injects portions of hot and cold filtered water to mix customized beverage ingredient portions and dispense the prepared customized beverage into a beverage;
a filled cup lid cover applicator configured to receive a signal from the order processing sequencer to snap a lid on a filled beverage cup wherein the order processing sequencer processes serving the filled beverage cup with a lid cover to a consumer on a serving counter surface; and
an intelligent beverage kiosk application installed on a member smart device configured for ordering a member customized beverage selection and for displaying a closest kiosk address retrieved and graphic map directions.

17. The apparatus of claim 16, wherein the order processing sequencer is configured for positioning a beverage cup for preparation processes using a beverage cup conveyor.

18. The apparatus of claim 16, wherein the plurality of beverage supply containers are configured to dispense customized beverage ingredient portions to into a flavor collection chamber using order processing sequencer activated flavor portion pipe and valves coupled to an electrically activated device signal generator switchboard module.

19. The apparatus of claim 16, wherein the controlled temperature water dispenser injects portions of hot and cold filtered water to blend a customized beverage temperature.

20. The apparatus of claim 16, wherein the intelligent beverage kiosk is configured to include at least one intelligent beverage kiosk touch screen display for a consumer to make customized beverage selections.

* * * * *